United States Patent [19]

Okada et al.

[11] Patent Number: 4,697,887
[45] Date of Patent: Oct. 6, 1987

[54] LIQUID CRYSTAL DEVICE AND METHOD FOR DRIVING THE SAME USING FERROELECTRIC LIQUID CRYSTAL AND FET'S

[75] Inventors: Shinjiro Okada; Yasuyuki Tamura, both of Kawasaki, Japan

[73] Assignee: Canon Kabushiki Kaisha, Tokyo, Japan

[21] Appl. No.: 724,828

[22] Filed: Apr. 18, 1985

[30] Foreign Application Priority Data

| Apr. 28, 1984 | [JP] | Japan | 59-85119 |
| Jun. 11, 1984 | [JP] | Japan | 59-118183 |
| Jun. 11, 1984 | [JP] | Japan | 59-118184 |
| Jun. 11, 1984 | [JP] | Japan | 59-118185 |
| Jun. 11, 1984 | [JP] | Japan | 59-118186 |
| Jun. 11, 1984 | [JP] | Japan | 59-118190 |
| Jun. 19, 1984 | [JP] | Japan | 59-124511 |
| Jun. 19, 1984 | [JP] | Japan | 59-124512 |
| Jun. 19, 1984 | [JP] | Japan | 59-124513 |
| Jun. 19, 1984 | [JP] | Japan | 59-124514 |
| Jun. 19, 1984 | [JP] | Japan | 59-124515 |
| Jun. 19, 1984 | [JP] | Japan | 59-124516 |
| Jun. 19, 1984 | [JP] | Japan | 59-124517 |
| Jun. 19, 1984 | [JP] | Japan | 59-124518 |
| Jun. 19, 1984 | [JP] | Japan | 59-124519 |
| Jun. 22, 1984 | [JP] | Japan | 59-127415 |
| Jun. 22, 1984 | [JP] | Japan | 59-127416 |
| Jun. 22, 1984 | [JP] | Japan | 59-127417 |
| Jun. 22, 1984 | [JP] | Japan | 59-127418 |
| Jun. 22, 1984 | [JP] | Japan | 59-127419 |
| Jun. 26, 1984 | [JP] | Japan | 59-129999 |
| Jun. 26, 1984 | [JP] | Japan | 59-130000 |
| Jun. 26, 1984 | [JP] | Japan | 59-130001 |

[51] Int. Cl.$^4$ ............................................. G02F 1/13
[52] U.S. Cl. ............................... 350/350 S; 350/333
[58] Field of Search ..................... 350/333, 350 S

[56] References Cited

U.S. PATENT DOCUMENTS

| 4,508,429 | 4/1985 | Nagae et al. | 350/350 S X |
| 4,548,476 | 10/1985 | Kaneko | 350/350 S |
| 4,593,978 | 6/1986 | Mourey et al. | 350/350 S X |
| 4,617,646 | 10/1986 | Yang | 350/350 S X |
| 4,634,226 | 1/1987 | Isogai et al. | 350/350 S X |

Primary Examiner—John K. Corbin
Assistant Examiner—Richard F. Gallivan
Attorney, Agent, or Firm—Fitzpatrick, Cella, Harper & Scinto

[57] ABSTRACT

A driving method for a liquid crystal device of the type comprising a plurality of FET's each having a gate and a first and a second terminal other than the gate, a first base plate having therein a plurality of picture element electrodes each corresponding to an FET and connected to the first terminal of the FET, a second base plate having thereon counter electrodes opposite to the picture element electrodes, and a ferroelectric liquid crystal having first and second orientation states and sandwiched between the first and second base plates; the driving method comprising a first phase of forming an electric field between a first terminal and a second terminal of an FET to result in the first orientation state of the ferroelectric liquid crystal, and a second phase of forming an electric field of the polarity opposite to that of the electric field applied in said first phase between a first terminal and a second terminal of an FET to result in the second orientation state of the ferroelectric liquid crystal; the first and second phases being respectively carried out in synchronism with the application of a signal for turning on the gates of the FET's respectively involved in the first and second phases.

51 Claims, 94 Drawing Figures

|  |  |  |
|---|---|---|
| $P_{N,N}$ | $P_{N,N+1}$ | $P_{N,N+2}$ |
| $P_{N+1,N}$ | $P_{N+1,N+1}$ | $P_{N+1,N+2}$ |
| $P_{N+2,N}$ | $P_{N+2,N+1}$ | $P_{N+2,N+2}$ |
F I G. 4
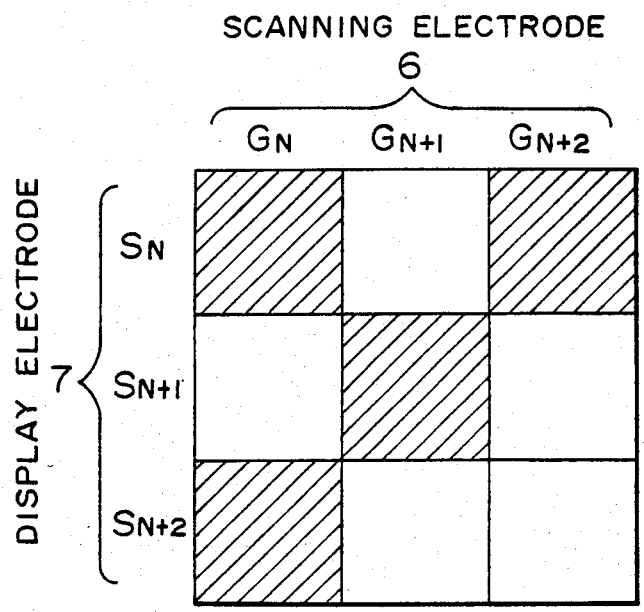
F I G. 5

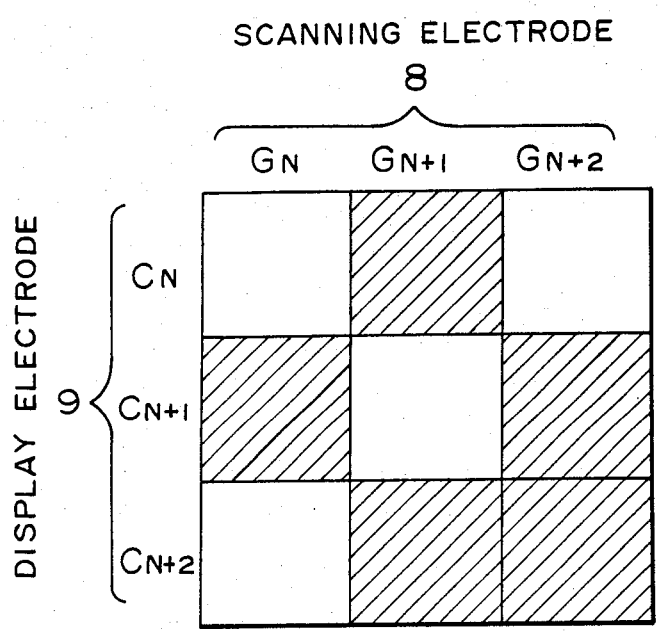
F I G. 9

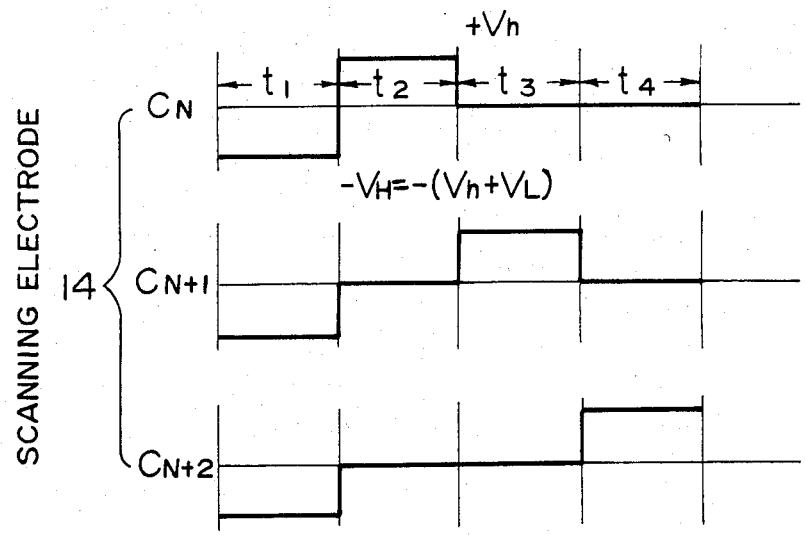
F I G. 51A
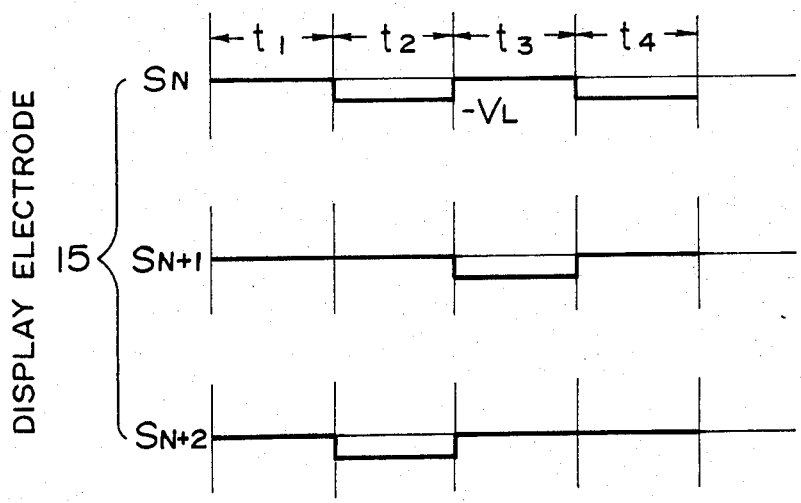
F I G. 51B

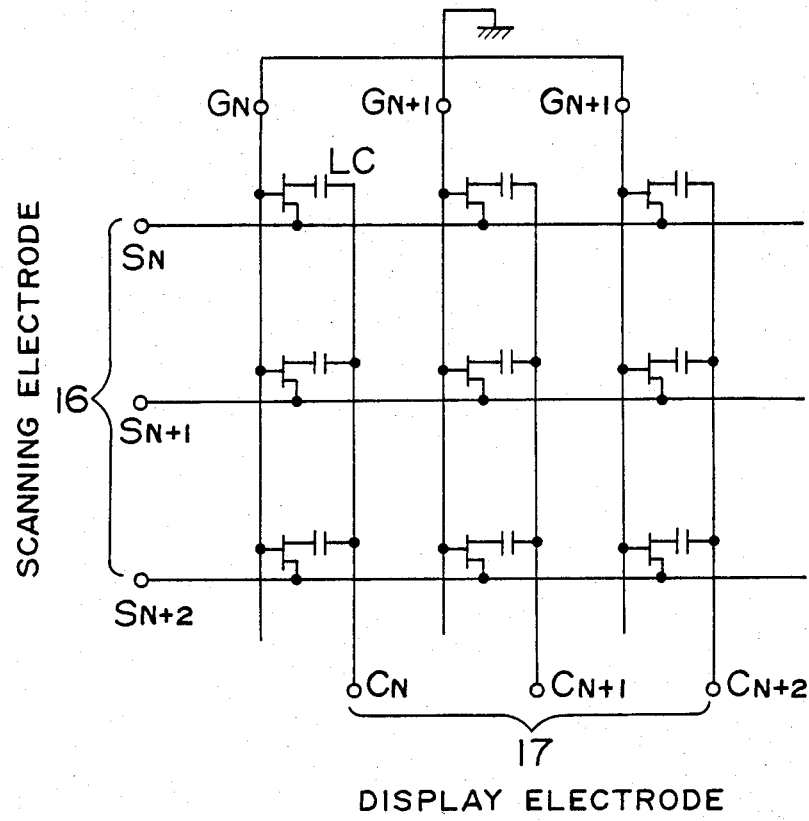
F I G. 52

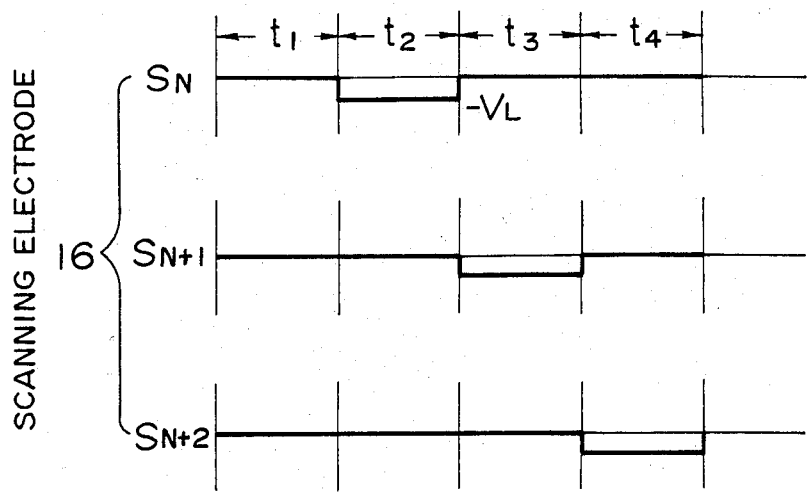
F I G. 54A
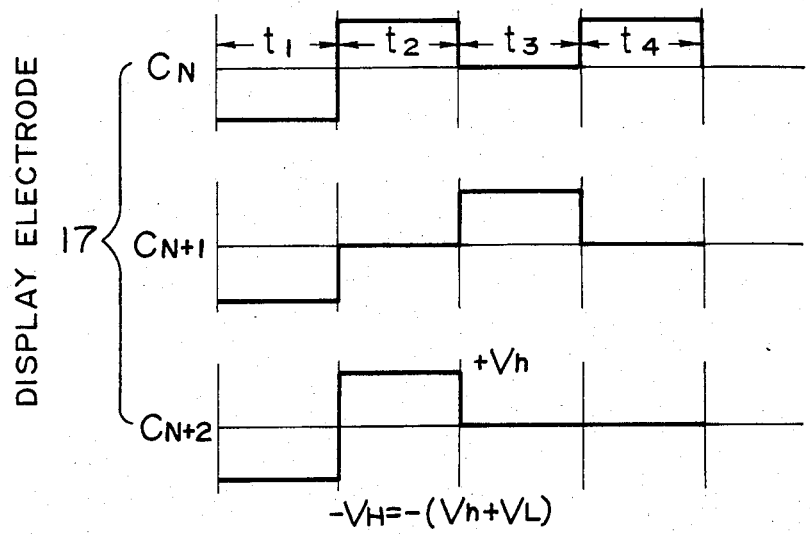
F I G. 54B

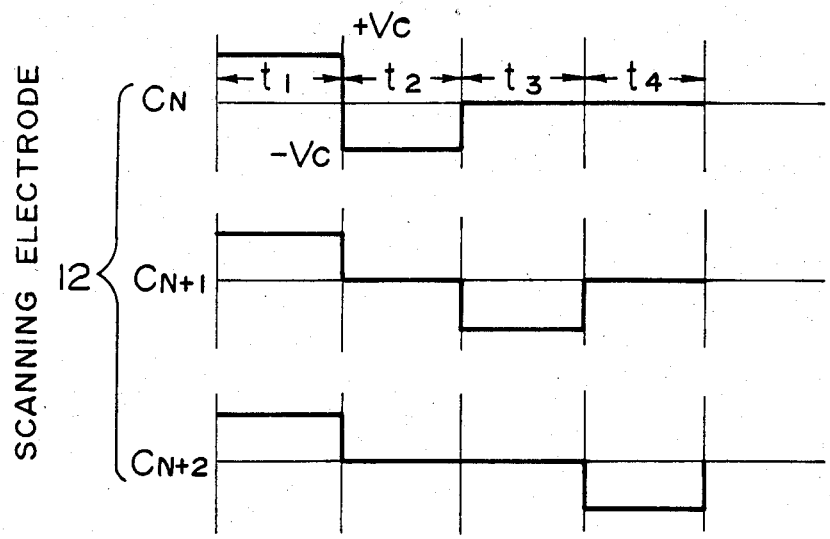
F I G. 55A
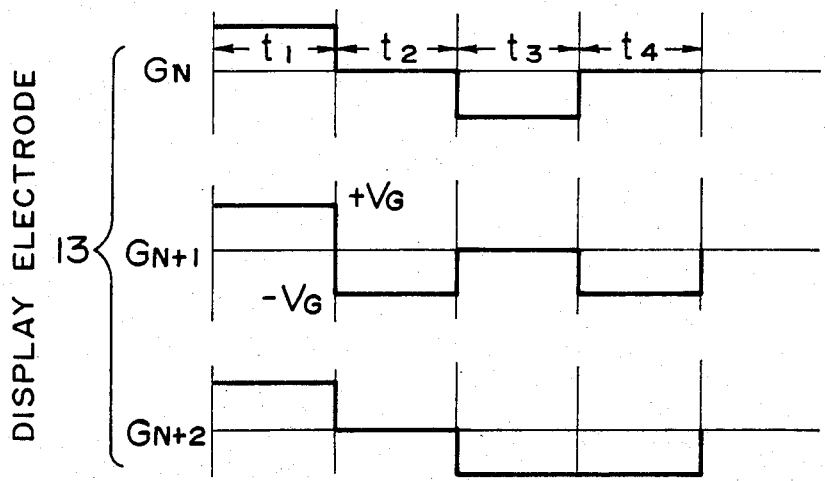
F I G. 55B

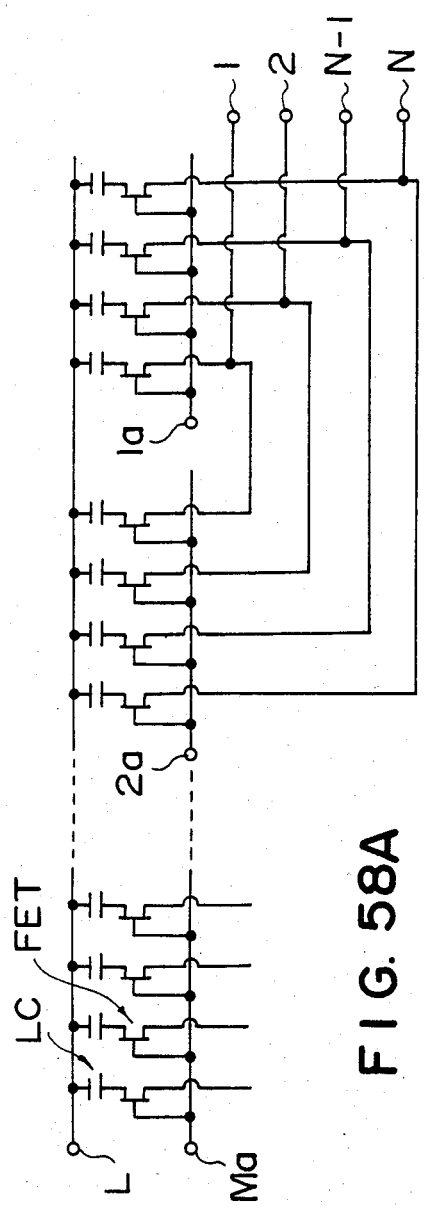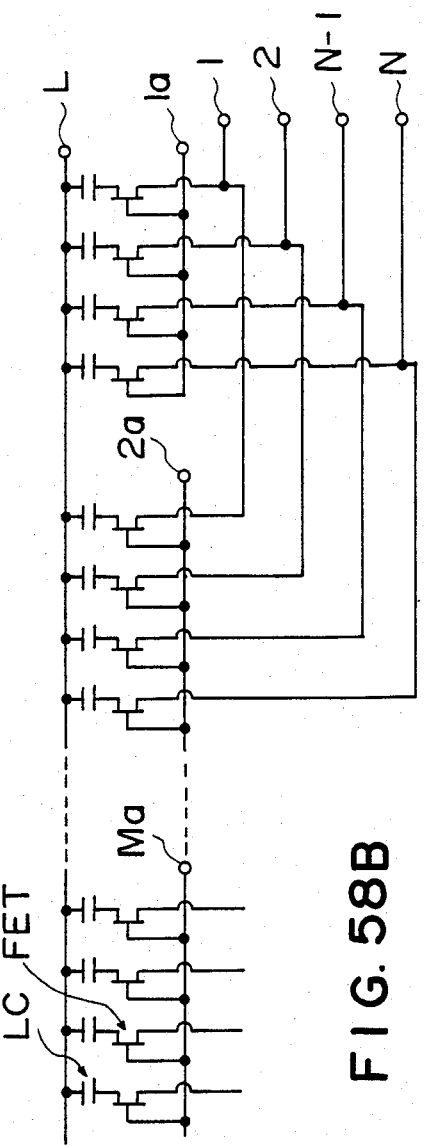
F I G. 58A
F I G. 58B

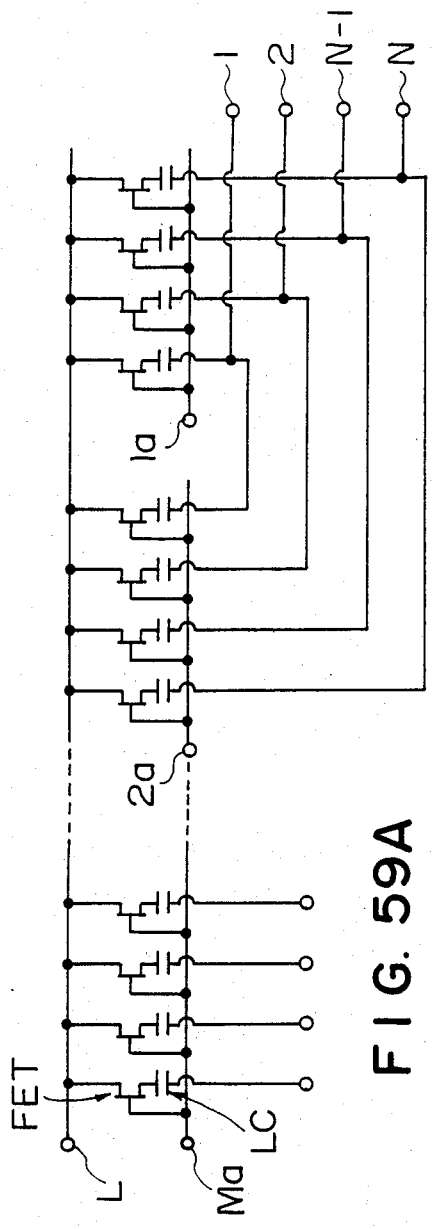
F I G. 59A
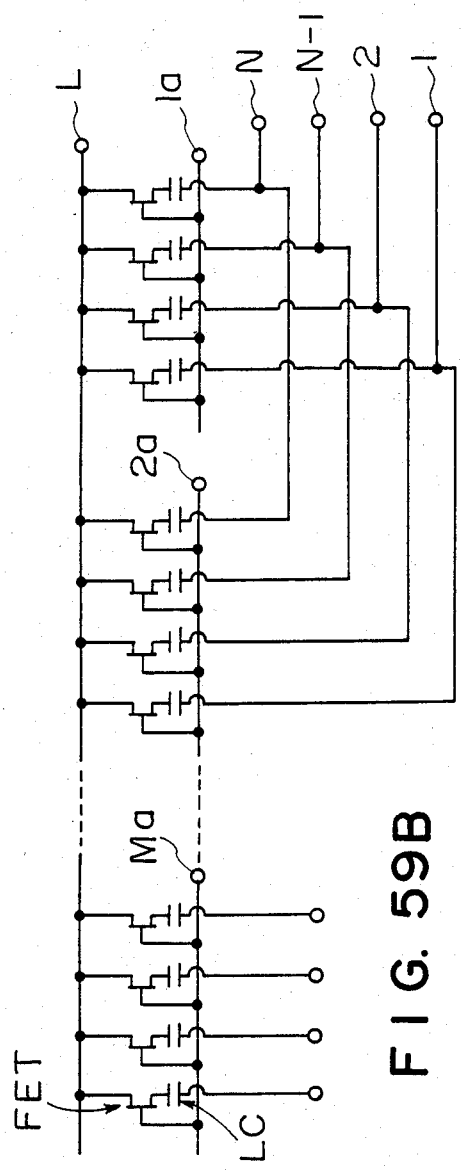
F I G. 59B

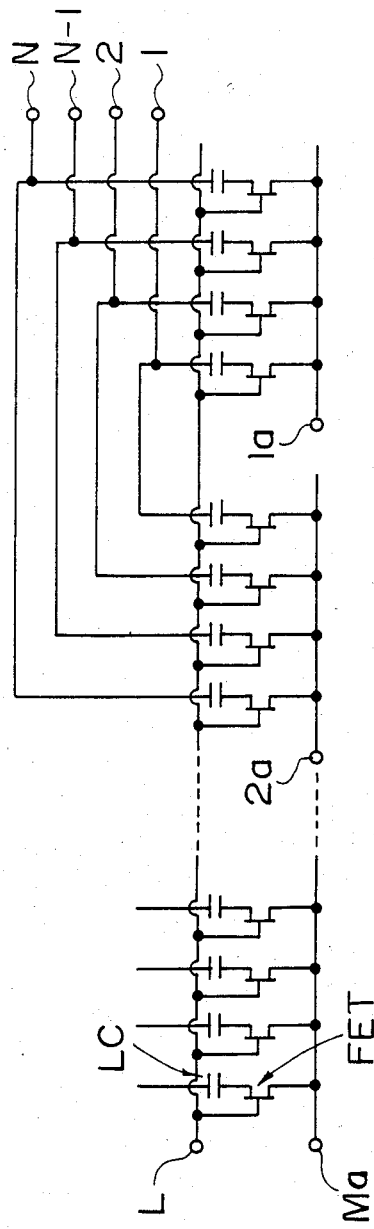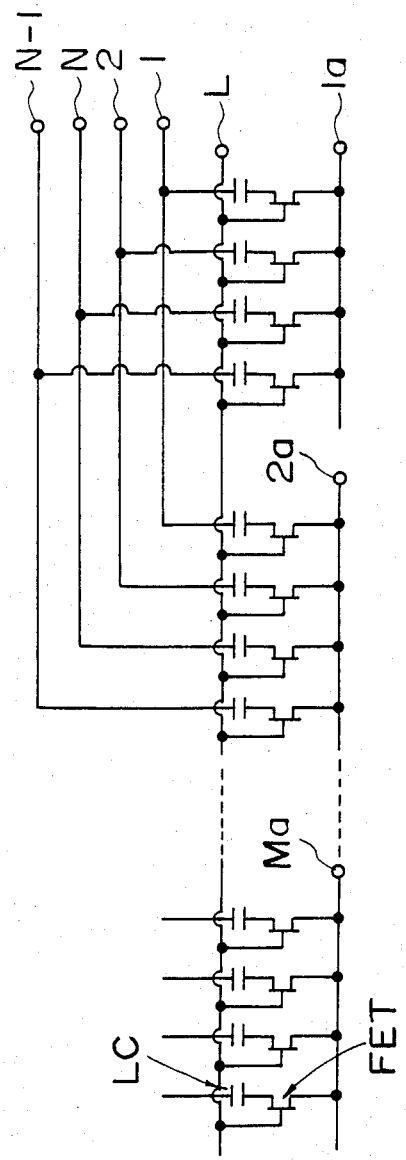
FIG. 62A
FIG. 62B

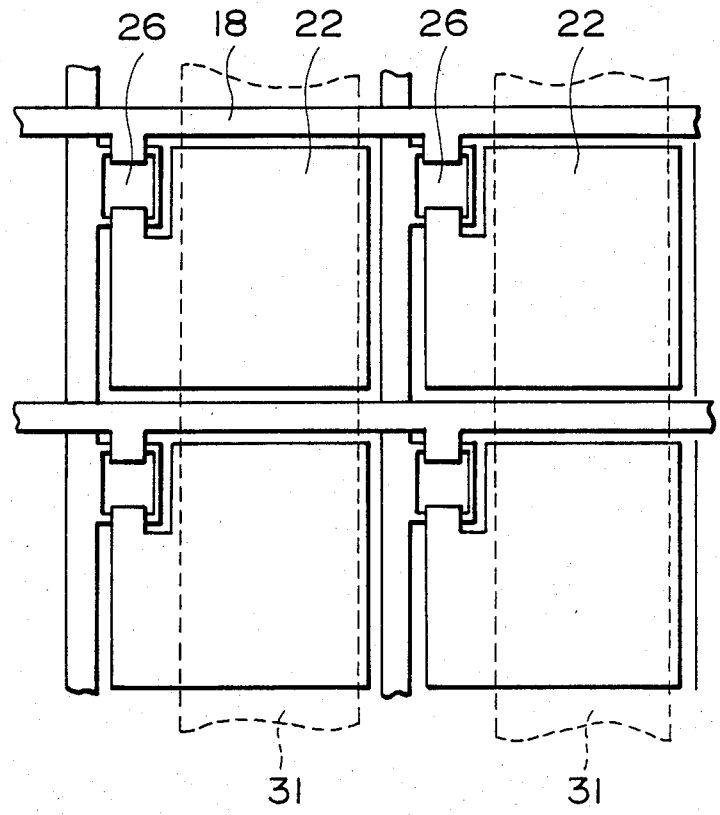
F I G. 64

LIQUID CRYSTAL DEVICE AND METHOD FOR DRIVING THE SAME USING FERROELECTRIC LIQUID CRYSTAL AND FET'S

BACKGROUND OF THE INVENTION

The present invention relates to a method of driving an optical shutter array, an image forming device, etc., using a liquid crystal, and more particularly to a liquid crystal device using a bistable liquid crystal, particularly a ferroelectric liquid crystal and a method for driving the same.

Hitherto, liquid crystal display devices, which are well known, comprise scanning electrodes and data electrodes arranged in a matrix manner, and a liquid crystal compound is filled between the electrodes to form a large number of picture elements thereto to display images or information. These display devices employ a time-sharing or time-division driving method which comprises the steps of selectively applying address signals sequentially and cyclically to the scanning lines, and, in parallel therewith, selectively applying predetermined information signals to the group of signal electrodes in synchronism with the address signals. However, these display devices and the driving method therefor have a serious drawback as will be described below.

Namely, the drawback is that it is difficult to obtain a high density of picture elements or a large image area. Because of relatively high response speed and low power dissipation, among prior art liquid crystals, most of the liquid crystals which have been put into practice as display devices are TN (twisted nematic) type liquid crystals, as shown in "Voltage-Dependent Optical Activity of a Twisted Nematic Liquid Crystal" by M. Schadt and W. Helfrich, Applied Physics Letters, Vol. 18, No. 4 (Feb. 15, 1971) pp. 127–128. In the liquid crystals of this type, molecules of nematic liquid crystal which show positive dielectric anisotropy under no application of an electric field form a structure twisted in the thickness direction of the liquid crystal layers (helical structure), and molecules of these liquid crystals are aligned or oriented parallel to each other in the surfaces of both electrodes. On the other hand, nematic liquid crystals which show positive dielectric anisotropy under application of an electric field are oriented or aligned in the direction of the electric field. Thus, they can cause optical modulation. When display devices of a matrix electrode arrangement are constituted using liquid crystals of this type, a voltage higher than a threshold level required for aligning liquid crystal molecules in the direction perpendicular to electrode surfaces is applied to regions (selected points) where scanning electrodes and signal electrodes are selected at a time, whereas a voltage is not applied to regions (non-selected points) where scanning electrodes and signal electrodes are not selected and, accordingly, the liquid crystal molecules are stably aligned parallel to the electrode surfaces. When linear polarizers arranged in a crossnicol relationship, i.e., with their polarizing axes being substantially perpendicular to each other, are arranged on the upper and lower sides of a liquid crystal cell thus formed, light does not transmit at selected points while it transmits at non-selected points. Thus, the liquid crystal cell can function as an image device.

However, when a matrix electrode structure is constituted, a certain electric field is applied to regions where scanning electrodes are selected and signal electrodes are not selected or regions where scanning electrodes are not selected and signal electrodes are selected (which regions are so called "half-selected points"). If the difference between a voltage applied to the selected points and a voltage applied to the half-selected points is sufficiently large, and a voltage threshold level required for allowing liquid crystal molecules to be aligned or oriented perpendicular to an electric field is set to a value therebetween, the display device normally operates. However, in fact, as the number (N) of scanning lines increases, a time (duty ratio) during which an effective electric field is applied to one selected point, when a whole image area (corresponding to one frame) is scanned, decreases with a ratio of 1/N. For this reason, the larger the number of scanning lines, the smaller is the voltage difference as an effective value applied to a selected point and non-selected points when scanning is repeatedly effected. As a result, this leads to unavoidable drawbacks of lowering of image contrast or occurrence of crosstalk. These phenomena result in problems that cannot be essentially avoided, which appear when a liquid crystal not having bistability (which shows a stable state where liquid crystal molecules are oriented or aligned in a horizontal direction with respect to electrode surfaces, but are oriented in a vertical direction only when an electric field is effectively applied) is driven, i.e., repeatedly scanned, by making use of time storage effect. To overcome these drawbacks, the voltage averaging method, the two-frequency driving method, the multiple matrix method, etc., have already been proposed. However, these methods are not sufficient to overcome the above-mentioned drawbacks. As a result, at present the development of large image area or high packaging density in respect to display elements is delayed because of the fact that it is difficult to sufficiently increase the number of scanning lines.

SUMMARY OF THE INVENTION

An object of the present invention is to provide a novel method of driving a bistable liquid crystal device, particularly a ferroelectric liquid crystal device, which can solve the above-mentioned drawbacks encountered with prior art liquid crystal display devices as stated above.

A more specific object of the present invention is to provide a method of driving a ferroelectric liquid crystal device having a large picture area with a large number of picture elements and capable of displaying images at a high speed by driving a ferroelectric liquid crystal which has a high response speed in response to an applied voltage and a state-memory characteristic involving two states of "bright" and "dark" by means of an active matrix system.

A further object of the present invention is to provide a liquid crystal device adapted for the above driving method.

The driving method for a liquid crystal device according to the invention is for a liquid crystal device of the type comprising a plurality of FET's each having a gate and a first and a second terminal other than the gate, a first base plate having thereon a plurality of picture element electrodes each corresponding to an FET and connected to the first terminal of the FET, a second base plate having thereon counter electrodes opposite to the picture element electrodes, and a ferroelectric liquid crystal having first and second orientation states and sandwiched between the first and second base plates, the driving method comprising a first phase of forming an electric field between a first terminal and a second terminal of an FET to result in the first orientation state of the ferroelectric liquid crystal, and a second phase of forming an electric field of the polarity opposite to that of the electric field applied in said first phase between a first terminal and a second terminal of an FET to result in the second orientation state of the ferroelectric liquid crystal; the first and second phases being respectively carried out in synchronism with the application of a signal for turning on the gates of the FET's respectively involved in the first and second phases.

BRIEF DESCRIPTION OF THE DRAWINGS

FIGS. 3, 8, 18, 21, 24 and 52 are respectively an active matrix circuit diagram used in the method of the present invention;

FIG. 4 is an illustration of corresponding picture elements with their addresses;

FIGS. 5, 9, 16, 19, 22, 25, 30, 32, 36, 40, 50 and 53 are explanatory views illustrating examples of display of corresponding picture elements;

FIGS. 6A, 10A, 12A, 14A, 17A, 20A, 23A, 26A, 28A, 29A, 31A, 34A, 35A, 37A, 38A, 39A, 41A, 42A, 44A, 45A, 46A, 47A, 49A, 51A, 54A, 55A and 56A respectively show waveforms of scanning signals;

FIGS. 6B, 10B, 12B, 14B, 17B, 20B, 23B, 26B, 28B, 29B, 31B, 34B, 35B, 37B, 39B, 41B, 42B, 44B, 45B, 46B, 47B, 49B, 51B, 54B, 55B and 56B respectively show waveforms of display signals;

FIGS. 57–62 respectively illustrate examples of arrangement of an active matrix circuit and picture elements;

FIGS. 64 and 65 are corresponding plan views thereof.

DESCRIPTION OF THE PREFERRED EMBODIMENTS

As a ferroelectric liquid crystal used in a driving method according to the present invention, a material which shows either a first optically stable state or a second optically stable state depending upon an electric field applied thereto, i.e., has bistability with respect to the applied electric field, may be used.

Most preferable ferroelectric liquid crystals having bistability which can be used in the driving method according to the present invention are chiral smectic liquid crystals having ferroelectricity. Particularly, liquid crystals showing chiral smectic C phase (SmC*), H phase (SmH*), I phase (SmI*), J phase (SmJ*), K phase (SmK*), G phase (SmG*) or F phase (SmF*) may suitably be used. These ferroelectric liquid crystals are described in, e.g., "LE JOURNAL DE PHYSIQUE LETTERS" 36 (L-69), 1975 "Ferroelectric Liquid Crystals"; "Applied Physics Letters" 36 (11) 1980, "Submicro Second Bistable Electrooptic Switching in Liquid Crystals", "Solid State Physics" 16 (141), 1981 "Liquid Crystal", etc. Ferroelectric liquid crystals disclosed in these publications may be used in the present invention.

More particularly, examples of ferroelectric liquid crystal compound usable in the method according to the present invention include decyloxybenzylidene-p'-amino-2-methylbutyl cinnamate (DOBAMBC), hexyloxybenzylidene-p'-amino-2-chloropropyl cinnamate (HOBACPC), 4-o-(2-methyl)-butylresorcilidene-4'-octylaniline (MBRA8), etc.

When a device is constituted by using these materials, the device may be supported with a block of copper, etc., in which a heater is embedded in order to realize a temperature condition where the liquid crystal compounds assume a smectic phase.

Figure 1:
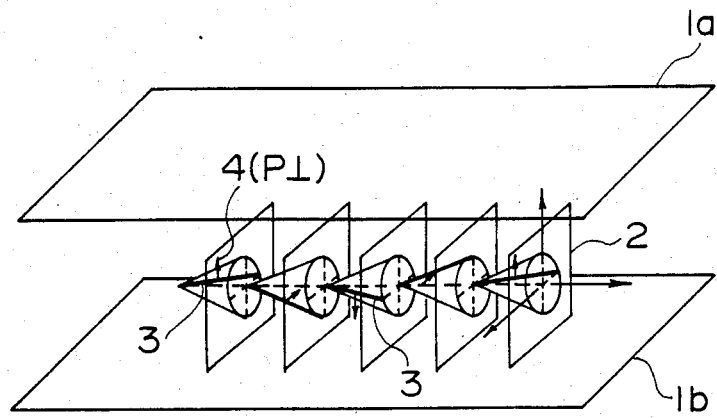
FIGS. 1 and 2 are schematic perspective views illustrating the basic operation principle of a liquid crystal device used in the present invention.
Figure 2:
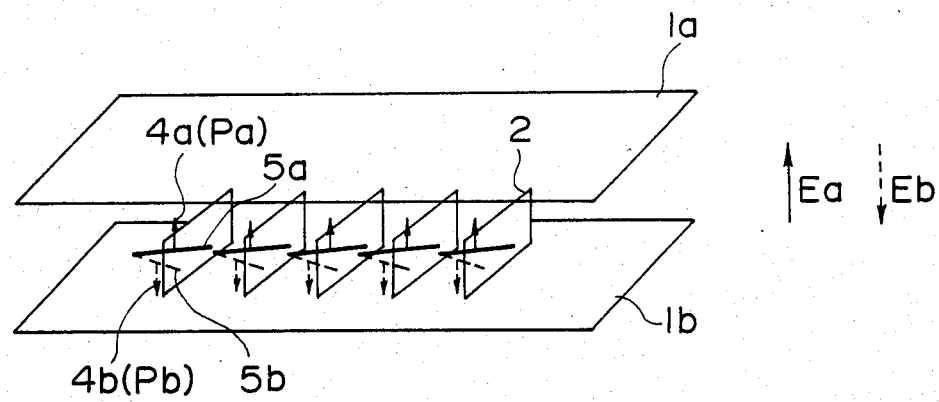

Referring to FIG. 1, there is schematically shown an example of a ferroelectric liquid crystal cell for explanation of the operation thereof. Reference numerals 1a and 1b denote base plates (glass plates) on which a transparent electrode of, e.g., $In_2O_3$, $SnO_2$, ITO (Indium-Tin Oxide), etc., is disposed, respectively. A liquid crystal of an SmC*- or SmH*-phase in which liquid crystal molecular layers 2 are oriented perpendicular to surfaces of the glass plates is hermetically disposed therebetween. A full line 3 shows liquid crystal molecules. Each liquid crystal molecule 3 has a dipole moment (P⊥) 4 in a direction perpendicular to the axis thereof. When a voltage higher than a certain threshold level is applied between electrodes formed on the base plates 1a and 1b, a helical structure of the liquid crystal molecule 3 is loosened or unwound to change the alignment direction of respective liquid crystal molecules 3 so that the dipole moments (P⊥) 4 are all directed in the direction of the electric field. The liquid crystal molecules 3 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device, of which optical characteristics vary depending upon the polarity of an applied voltage. Further, when the thickness of the liquid crystal cell is sufficiently thin (e.g., 1μ), the helical structure of the liquid crystal molecules is loosened even in the absence of an electric field whereby the dipole moment assumes either of the two states, i.e., Pa in an upper direction 4a or Pb in a lower direction 4b as shown in FIG. 2. When electric field Ea or Eb higher than a certain threshold level and different from each other in polarity as shown in FIG. 2 is applied to a cell having the above-mentioned characteristics, the dipole moment is directed either in the upper direction 4a or in the lower direction 4b depending on the vector of the electric field Ea or Eb. In corresponding with this, the liquid crystal molecules are oriented in either of a first stable state 5a or a second stable state 5b.

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 2. When the electric field Ea is applied to the liquid crystal molecules, they are oriented in the first stable state 5a. This state is kept stable even if the electric field is removed. On the other hand, when the electric field Eb of which direction is opposite to that of the electric field Ea is applied thereto, the liquid crystal molecules are oriented to the second stable state 5b, whereby the directions of molecules are changed. This state is also kept stable even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferable that the thickness of the cell is as thin as possible and generally 0.5 to 20μ, particularly 1 to 5μ. A liquid crystal-electrooptical device having a matrix electrode structure in which the ferroelectric liquid crystal of this kind is used is proposed, e.g., in U.S. Pat. No. 4,367,924 by Clark and Lagerwell.

The present invention is based on the knowledge that the drain and the source of an element with a structure of an FET (field effect transistor) such as a TFT (thin film transistor) constituting an active matrix may be used interchangeably, i.e., as a source and a drain, respectively, or vice versa, by applying reverse polarities of voltages. The element constituting an active matrix may be any of amorphous silicon TFT, polycrystalline silicon TFT, etc., as long as it has an FET structure. Further, a bipolar transistor other than an FET may equally be used.

An N-type FET assumes a conductive state when $V_D > V_S$ and a nonconductive state when $V_G < V_S + V_P$, when $V_D$ is a drain voltage, $V_G$ is a gate voltage, $V_S$ is a source voltage and $V_P$ is a threshold voltage between the gate and source.

A P-type FET assumes a conductive state when $V_D < V_S$ and $V_G < V_S + V_P$ and a nonconductive state when $V_G > V_S + V_P$.

In the P-type and N-type, one of the terminals of an FET functions as a drain and the other as a source. Thus, in the N-type, a terminal of a lower voltage functions as a source while in the P-type, a terminal of a higher voltage functions as a source.

For a liquid crystal cell using a ferroelectric liquid crystal, whether a "bright" or "dark" state is formed in response to either positive or negative voltages can be determined as desired by selecting the arrangement of a pair of polarizers disposed on and beneath the cell relative to the major or longer axis of the liquid crystal molecules.

In the present invention, an electric field applied to a liquid crystal cell is controlled by controlling a voltage applied between the terminals of the respective elements of an active matrix, whereby a display is effected. Accordingly, while some embodiments of the driving method for a ferroelectric liquid crystal cell according to the present invention will be explained hereinbelow with reference to the drawings, the voltage levels of respective signals are not limited to those explained in the embodiments, as long as potential differences between the respective signals are relatively retained.

Figure 3:
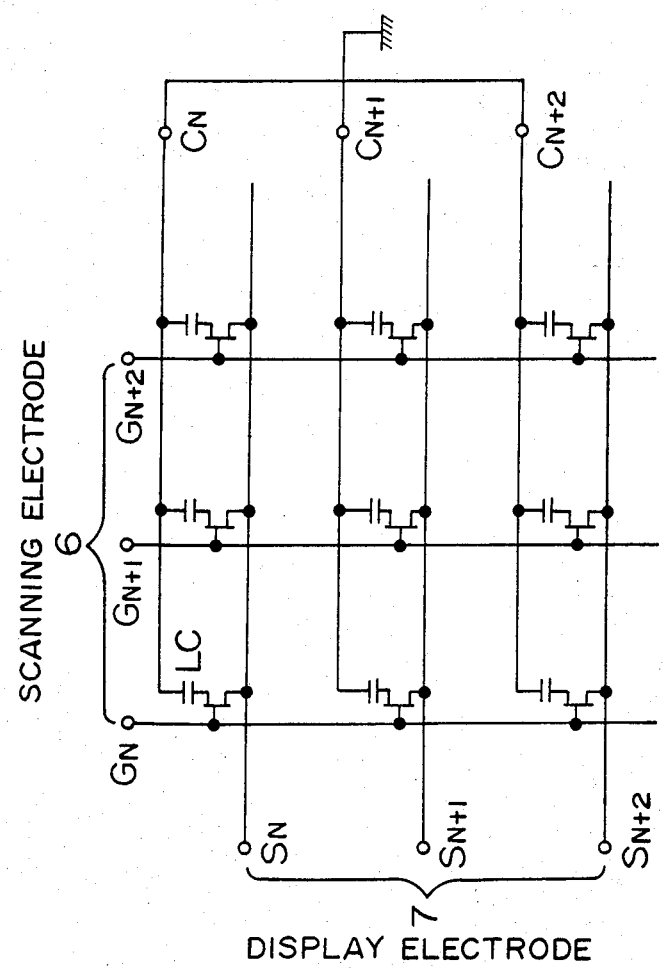

FIG. 3 shows a circuit diagram of an active matrix, FIG. 4 is an explanatory view illustrating the addresses of the corresponding picture elements, and FIG. 5 is an explanatory view illustrating an example of a display of corresponding picture elements.

Referring to FIG. 3, scanning electrodes 6 are connected to gates of FET, and display or signal electrodes 7 are connected to sources or drains of FET, while the counter electrodes are connected electrically in common.

Figure 6A:
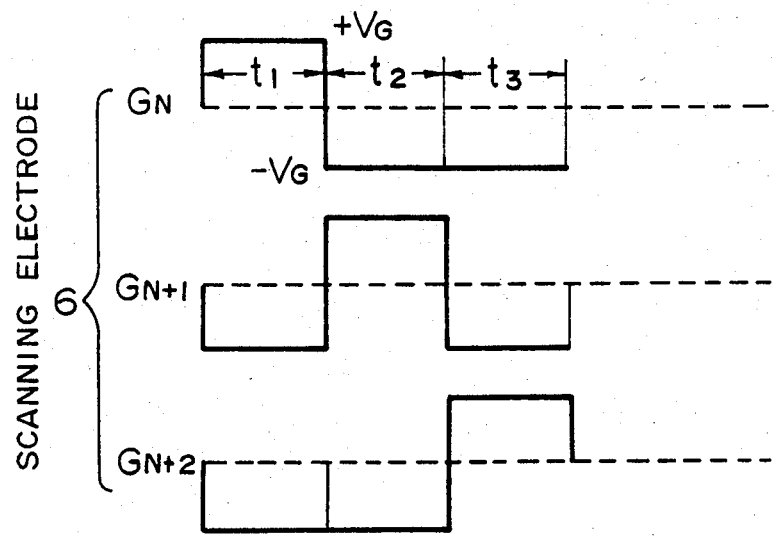
Figure 6B:
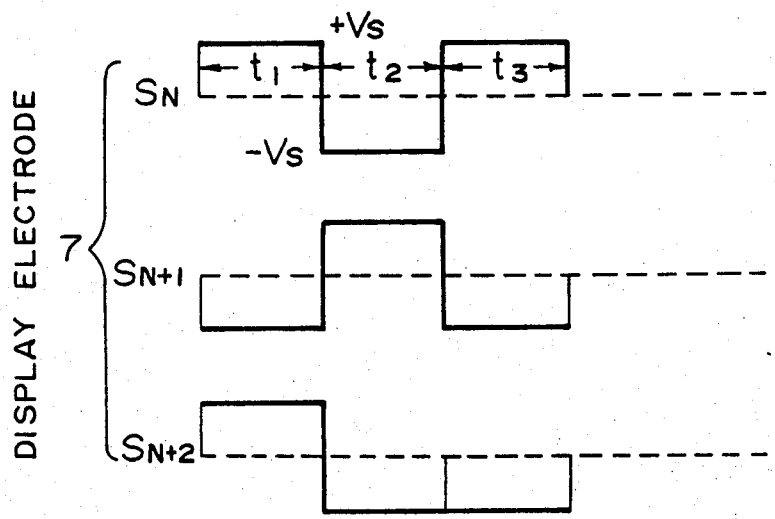

A case where a scanning electrode $G_N$ connected to gates is selected is first explained. FIG. 6A shows scanning signals including an electric signal applied to a scanning electrode $G_N$ selected at phase $t_1$ and electric signals applied to the other scanning electrodes (nonselected scanning electrodes) $G_{N+1}$ and $G_{N+2}$. FIG. 6B shows display signals including electric signals applied to display electrodes $S_N$ and $S_{N+2}$ selected at phase $t_1$ and an electric signal applied to a nonselected display electrodes $S_{N+1}$, each display electrode being connected to a source or drain.

In FIGS. 6A and 6B, the abscissa represent time and the ordinates represent voltages. For example, when a motion picture is displayed, scanning electrodes 6 are sequentially and periodically selected. The electric signal applied to the selected scanning electrode $G_N$ is $+V_G$ at phase (time) $t_1$ and $-V_G$ at phase (time) $t_2$ as shown in FIG. 6A.

On the other hand, an electric signal of $-V_G$ is applied to the other scanning electrodes $G_{N+1}$, $G_{N+2}$ at phase $t_1$ as shown in FIG. 6A. Further, the electric signal applied to the selected display electrode $S_N$, $S_{N+2}$ is $+V_S$ and an electric signal of $-V_S$ is applied to the nonselected display electrode. In the above, respective voltages are set to desired values satisfying the following relationships.

In a case where, on a scanning electrode of m=q line, "dark" state is written on a display electrode of n=1 and "bright" on a display electrode n≠1, simultaneously:

$$V_{Gm} - V_P > V_{LC} + V_C \quad (m=q)$$

$$V_C + V_{LC} < V_{Sn} \quad (n=1)$$

$$V_C - V_{LC} > V_{Sn} \quad (n \neq 1)$$

$$V_{Gm} - V_P < V_{Sn} \quad (m \neq q, n \neq 1)$$

wherein the respective symbols represent the following:
$V_{Gm}$: gate electrode (scanning signal) voltage,
$V_{Sn}$: source electrode (display signal) volage,
$V_C$: counter electrode voltage,
$V_{LC}$: absolute value of threshold voltage of a ferroelectric liquid crystal, and
$V_P$: gate-source threshold voltage.

The above operations are repeated to effect writing through cycles of q=1 to q=N.

Thus, a display can be effected according to image information signals by using a plurality of picture elements formed by a plurality of picture element electrodes and arranged in a plurality of rows and in a plurality of columns, and by using an operation mode which comprises a first phase wherein a selected first group of picture elements are brought to a "bright" state and a second phase wherein a selected second group of picture elements are brought to a "dark" state, the first and the second phase being effected simultaneously and row by row.

Figure 7:
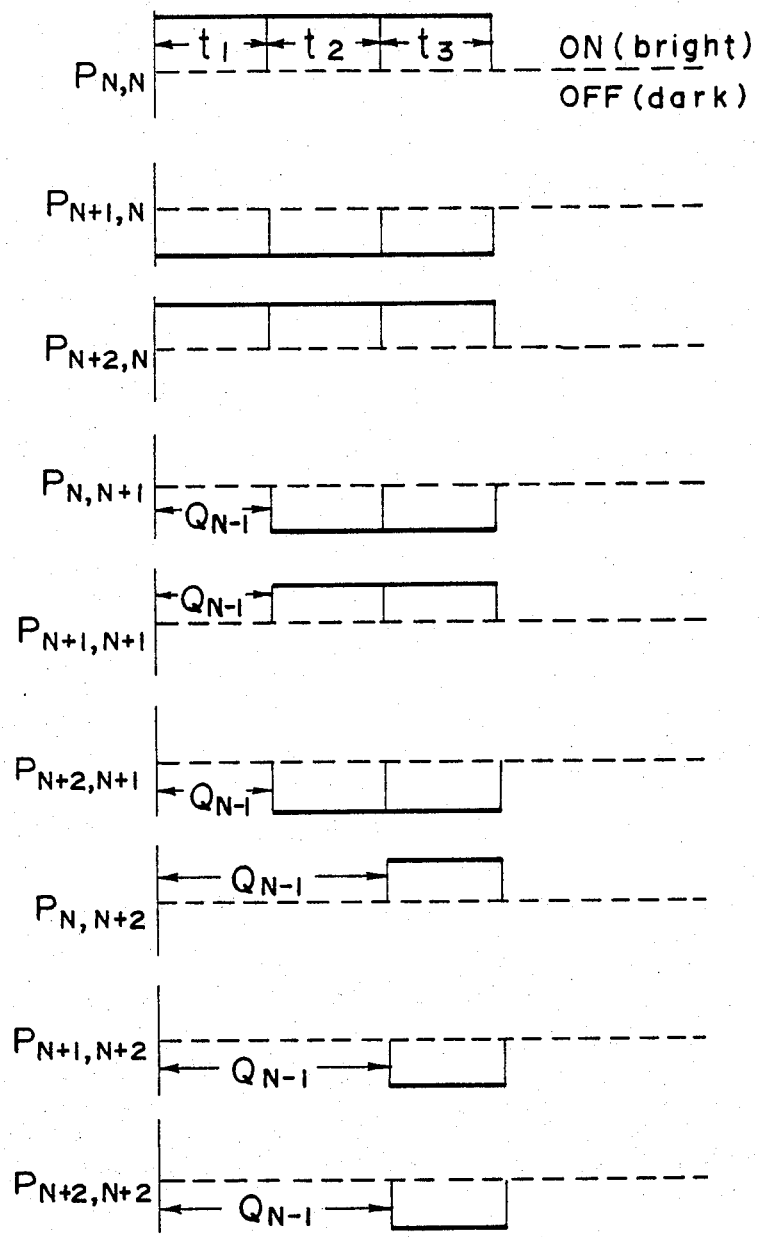
FIGS. 7, 11, 13, 15, 27, 33, 43 and 48 illustrate writing operations for respective picture elements.

A writing operation for the picture elements shown in FIG. 4 by applying such electric signals is illustrated by FIG. 7. As apparent from FIG. 7, a voltage $V_S - V_C$ ($> V_{LC}$) according the threshold voltage $V_{LC}$ is applied to picture elements $P_{N,N}$, $P_{N+2,N}$ on a selected scanning line at phase $t_1$. On the other hand, a voltage $V_S - V_C$ ($< -V_{LC}$) exceeding the threshold voltage $-V_{LC}$ is applied to a picture element $P_{N+1,N}$ on the same scanning line at phase $t_1$. As a result, depending on whether a display electrode is selected or not on a selected scanning electrode, liquid crystal molecules are oriented to the first stable state to form a picture element of ON (bright) state when the display electrode is selected while they are oriented to the second stable state to form a picture element of OFF (dark) state when not selected.

On the other hand, on the nonselected scanning lines, none of the voltages applied to all the picture elements exceeds the threshold voltages as shown in FIG. 7. As a result, liquid crystal molecules in the respective picture elements $P_{N,N+1}$, $P_{N+1,N+1}$, $P_{N+2,N+1}$, $P_{N,N+2}$, $P_{N+1,N+2}$, $P_{N+2,N+2}$ on the nonselected scanning lines do not change their orientation states but retain their orientation states obtained corresponding to the signal state ($Q_{N-1}$) in the previous scanning step. Namely, when a certain scanning electrode line is selected, signals corresponding to the line are written. During a time interval from a time at which writing of signals corresponding to one frame is completed to a time at which the scanning line is selected next after one frame is completed, the signal state of each picture element is maintained. As a result, even if the number of scanning electrode lines is increased, the duty ratio does not substantially change, thus resulting in no decrease in contrast.

Next, a driving operation for a display device is explained. Referring to FIG. 5, among the picture elements formed by intersections of scanning electrodes $G_N$, $G_{N+1}$, $G_{N+2}$, ... and display electrodes $S_N$, $S_{N+1}$, $S_{N+2}$, ..., it is assumed that the hatched picture elements correspond to the "dark" state and the white picture elements correspond to the "bright" state. With respect to the picture elements on the display electrode $S_N$ in FIG. 5, the picture elements corresponding to the scanning electrodes, $G_N$, $G_{N+2}$ are in the dark state and the other picture element are in the bright state. When the scanning electrode $G_N$ is scanned, a voltage exceeding the threshold voltage is applied to the picture elements $P_{N,N}$, $P_{N+2,N}$ so that the picture elements $P_{N,N}$, $P_{N+2,N}$ are switched to one stable state, i.e., the "dark" state regardless of the past states. After that, the picture elements $P_{N,N}$, $P_{N+2,N}$ retain the "dark" state while the scanning electrodes $G_{N+1}$, $G_{N+2}$, ... are scanned.

Examples of specific preferable values for driving a ferroelectric liquid crystal DOBAMBC in the above explained embodiment are enumerated below:

Input frequency $f_0 = 1 \times 10^4 - 1 \times 10^6$ Hz $10 < |V_Gb| < 60$ V (peak value) $0.3 < |V_S| < 10$ V (peak value).

Figure 8:
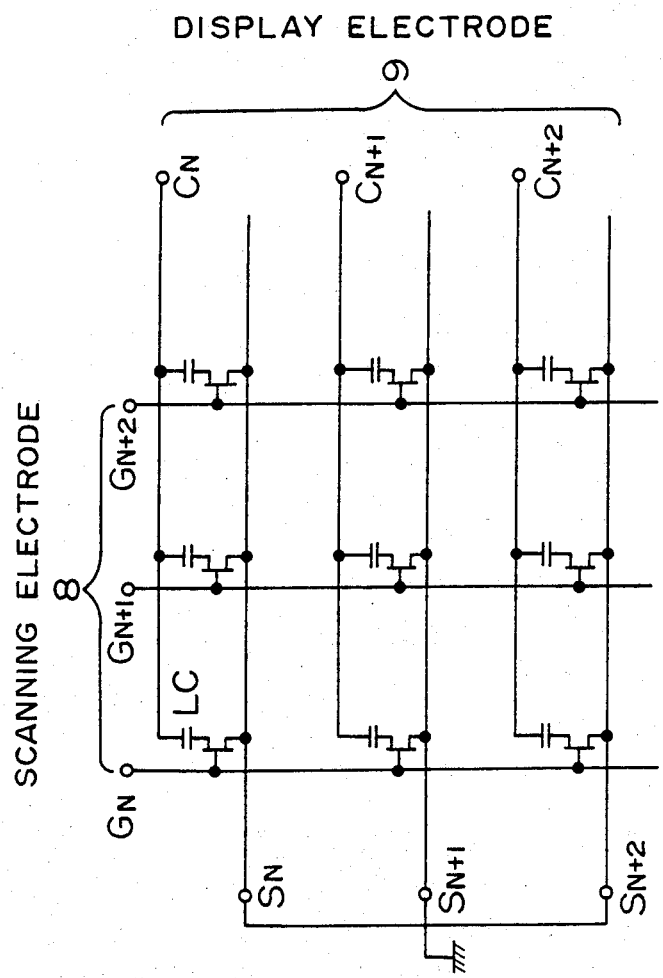

FIG. 8 shows a circuit diagram of another active matrix according to the present invention, and FIG. 9 is an explanatory view illustrating an example of a display of corresponding picture elements.

Referring to FIG. 8, scanning electrodes 8 are connected to gates of FET, and display or signal electrodes 9 are connected to sources or drains of FET, while the counter electrodes are connected electrically in common.

Figure 10A:
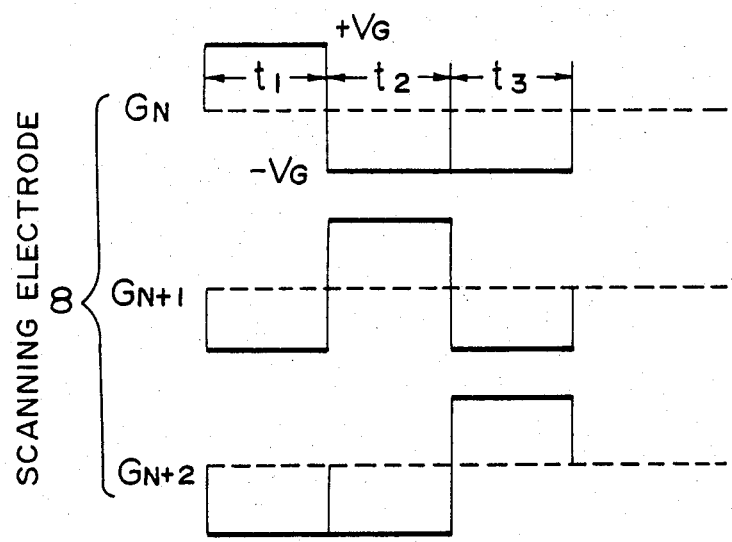
Figure 10B:
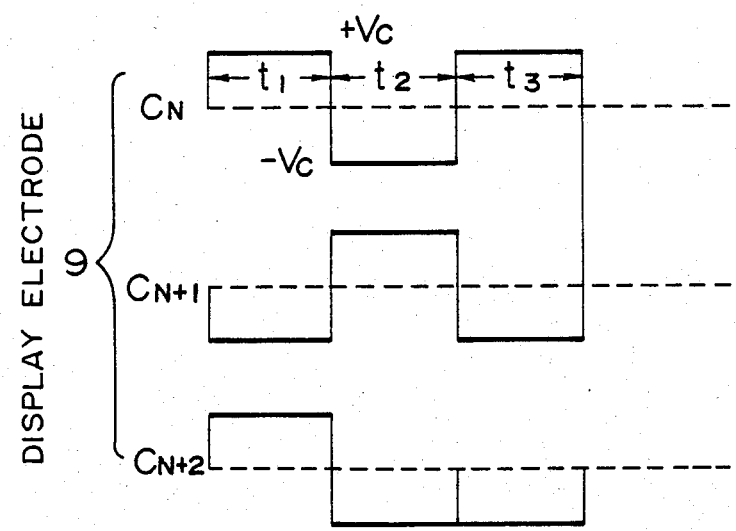

A case where a scanning electrode $G_N$ connected to gates is selected is first explained. FIG. 10A shows scanning signals including an electric signal applied to a scanning electrode $G_N$ selected at phase $t_1$ and electric signals applied to the other scanning electrodes (nonselected scanning electrodes) $G_{N+1}$ and $G_{N+2}$. FIG. 10B shows display signals including electric signals applied to display electrodes $C_N$ and $C_{N+2}$ (counter electrodes) selected at phase $t_1$ and an electric signal applied to a nonselected display electrode, $S_{N+1}$ (counter electrode), each display electrode being connected to a source or drain.

In FIGS. 10A and 10B, the abscissas represent time and the ordinates represent voltages. For example, when a motion picture is displayed, scanning electrodes 8 are sequentially and periodically selected. The electric signal applied to the selected scanning electrode $G_N$ is $+V_G$ at phase (time) $t_1$ and $-V_G$ at phase (time) $t_2$ as shown in FIG. 10A.

On the other hand, an electric signal of $-V_G$ is applied to the other scanning electrodes $G_{N+1}$, $G_{N+2}$ at phase $t_1$ as shown in FIG. 10A. Further, the electric signal applied to the selected display electrode $C_N$, $C_{N+2}$ is $+V_C$ and an electric signal of $-V_C$ is applied to the nonselected display electrode. In the above, respective voltages are set to desired values satisfying the following relationships.

In a case where, on a scanning electrode of m=q line, "bright" state is written on a display electrode of n=1 and "dark" on a display electrode n≠1, simultaneously:

$V_{Gm} - V_P > V_{LC} + V_S \quad (m=q)$ $V_S + V_{LC} < V_{Cn} \quad (m=q, n=1)$ $V_S - V_{LC} > V_{Cn} \quad (n \neq 1)$ $V_{Gm} - V_P < V_{Cn} \quad (m \neq q, n \neq 1)$ wherein the respective symbols represent the following:

$V_{Gm}$: gate electrode (scanning signal) voltage,
$V_{Cn}$: counter electrode (display signal) voltage,
$V_S$: source or drain (common terminal) voltage;
$V_{LC}$: absolute value of threshold voltage of a ferroelectric liquid crystal, and
$V_P$: gate-source threshold voltage.

The above operations are repeated to effect writing through cycles of q=1 to q=N. In this instance, the counter electrodes may be formed in stripes as shown in FIG. 64.

Thus, a display can be effected according to image information signals by using a plurality of picture elements formed by a plurality of picture element electrodes and arranged in a plurality of rows and in a plurality of columns, and by using an operation mode which comprises a first phase wherein a selected first group of picture elements are brought to a "bright" state and a second phase wherein a selected second group of picture elements are brought to a "dark" state, the first and second phase being effected simultaneously and row by row.

Figure 11:
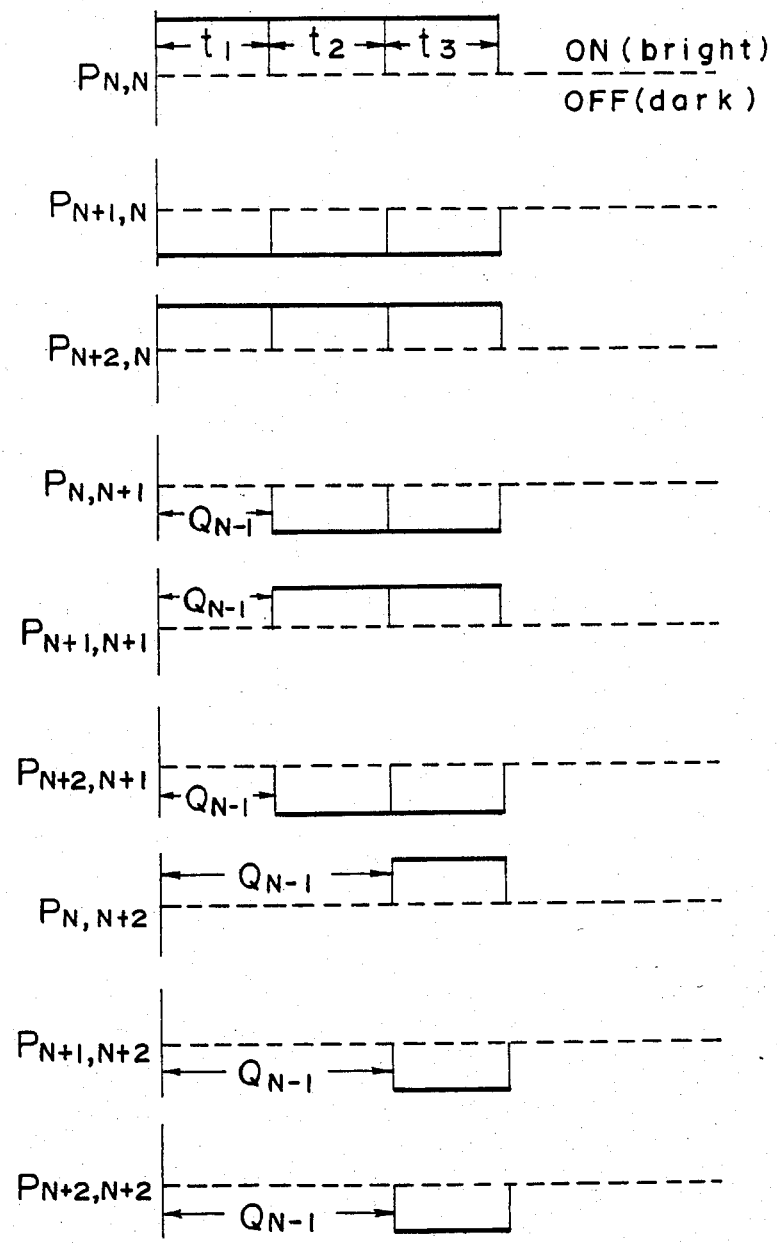

A writing operation for the picture elements shown in FIG. 4 by applying such electric signals is illustrated by FIG. 11. In FIG. 11, the respcetive abscissas represent time and the ordinates indicate the display states of ON (bright) on the upper sides and OFF (dark) on the lower sides. As is apparent from FIG. 11, a voltage $V_C - V_S (> V_{LC})$ exceeding the threshold voltage $V_{LC}$ is applied to picture elements $P_{N,N}$, $P_{N+2,N}$ on a selected scanning line at phase $t_1$. On the other hand, a voltage $-V_C - V_S (< -V_{LC})$ exceeding the threshold voltage $-V_{LC}$ is applied to a picture element $P_{N+1,N}$ on the same scanning line at phase $t_1$. As a result, depending on whether a display electrode is selected or not on a selected scanning electrode, liquid crystal molecules are oriented to the first stable state to form a picture element of ON (bright) state when the display electrode is selected while oriented to the second stable state to form a picture element of OFF (dark) state when not selected.

On the other hand, on the nonselected scanning lines, none of the voltages applied to all the picture elements exceeds the threshold voltages as shown in FIG. 11. As a result, liquid crystal molecules in the respective picture elements $P_{N,N+1}$, $P_{N+1,N+1}$, $P_{N+2,N+1}$, $P_{N,N+2}$, $P_{N+1,N+2}$, $P_{N+2,N+2}$ on the nonselected scanning lines do not change their orientation states but retain their orientation states obtained corresponding to the signal state ($Q_{N-1}$) in the previous scanning step. Namely, when a certain scanning electrode line is selected, signals corresponding to the line are written. During a time interval from a time at which writing of signals corresponding to one frame is completed to a time at which the scanning line is selected next after one frame is completed, the signal state of each picture element is maintained. As a result, even if the number of scanning electrode lines is increased, the duty ratio does not substantially change, thus resulting in no decrease in contrast.

Next, a driving operation for a display device is explained. Referring to FIG. 9, among the picture elements formed by intersections of scanning electrodes $G_N$, $G_{N+1}$, $G_{N+2}$, ... and display electrodes $C_N$, $C_{N+1}$, $C_{N+2}$, ..., it is assumed that the hatched picture elements correspond to the "dark" state and the white picture elements correspond to the "bright" state. With respect to the picture elements on the display electrode $C_N$ in FIG. 9, the picture elements corresponding to the scanning electrodes $G_N$, $G_{N+2}$ are in the "bright" state and the other picture element are in the "dark" state. When the scanning electrode $G_N$ is scanned, a voltage exceeding the threshold voltage is applied to the picture elements $P_{N,N}$, $P_{N+2,N}$ so that the picture elements $P_{N,N}$, $P_{N+2,N}$ are switched to one stable state, i.e., the "bright" state regardless of the past states. After that, the picture elements $P_{N,N}$, $P_{N+2,N}$ retain the "bright" state while the scanning electrodes $G_{N+1}$, $G_{N+2}$, ... are scanned.

Examples of specific preferable values for driving a ferroelectric liquid crystal DOBAMBC in the above explained embodiment are enumerated below:

Input frequency $f_0 = 1 \times 10^4 - 1 \times 10^6$ Hz
$10 < |V_G| < 60$ V (peak value)
$0.3 < |V_S| < 10$ V (peak value).

Figure 12A:
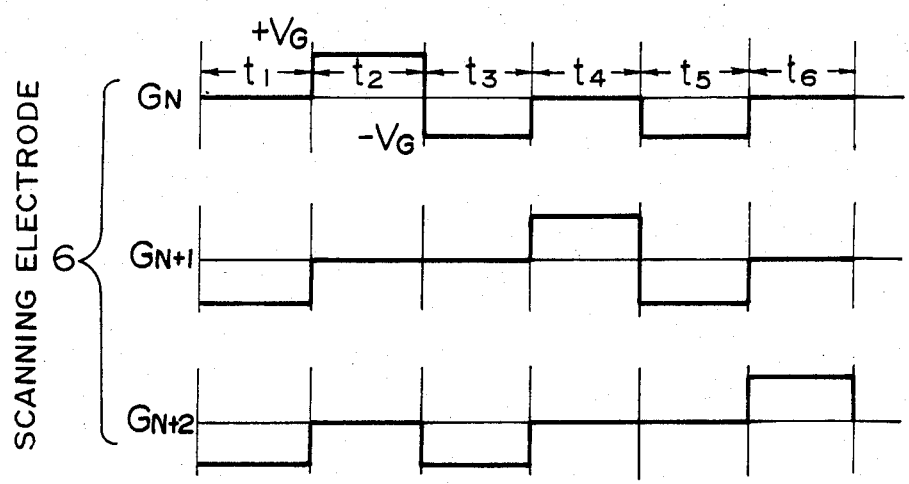
Figure 12B:
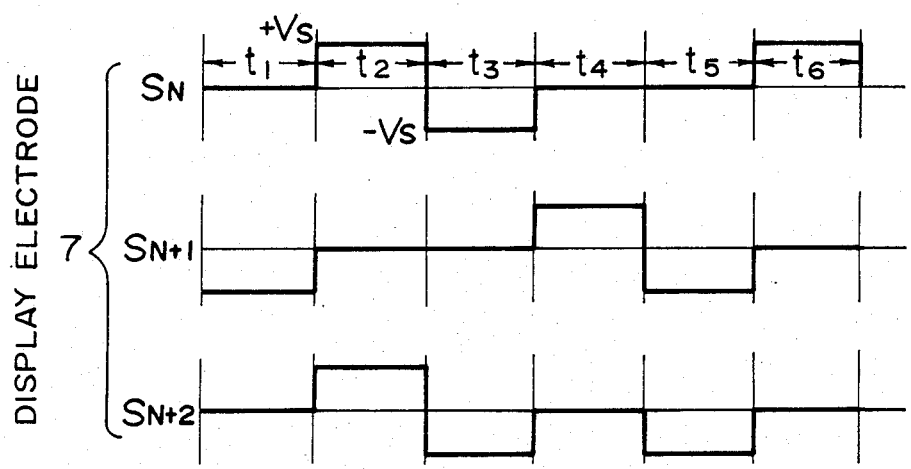

FIG. 12A shows scanning signals for the active matrix circuit shown in FIG. 3 and, more particularly, shows electric signals applied to selected scanning electrodes and the other scanning electrodes (nonselected scanning electrodes), respectively, at phases $t_1$, $t_2$, ... FIG. 12B shows display signals applied corresponding and, more particularly, shows electric signals applied to selected display electrodes and nonselected display electrodes, respectively, at phases $t_1$, $t_2$, ....

In FIGS. 21A and 12B, the abscissas represent time and the ordinates represent voltages. For example, when a motion picture is displayed, scanning electrodes 6 are sequentially and periodically selected. The electric signal applied to the selected scanning electrode $G_N$ is 0 at the time of writing "bright" and $+V_G$ at the time of writing "dark" as shown in FIG. 12A.

On the other hand, an electric signal of $-V_G$ is applied to the other nonselected scanning electrodes at phase $t_1$ as shown in FIG. 12A. Further, the electric signal applied to the selected display electrode is $-V_S$ at the time of writing "bright" and $+V_S$ at the time of writing "dark". On the other hand, an electric signal of 0 is equally applied to the nonselected display electrodes. In the above, respective voltages are set to desired values satisfying the following relationships.

In a case where, on a scanning electrode of $m=q$ line, "bright" state is written on a display electrode of $n=1_1$ and then "dark" on a display electrode $n=1_2$:

$V_{Gm} = 0 \quad (m=q, n=1_1)$ $V_C + V_{LC} < V_{Sn} \quad (n=1_1)$ $V_{Gm} - V_P > V_{LC} + V_C \quad (m=q, n=1_2)$ $V_C + V_{LC} < V_{Sn} \quad (n=1_2)$ $V_{Sn} = 0 \quad (m=q, n\neq 1_1)(m=q, n\neq 1_2)$ $V_{Gm} - V_P < V_{Sn} \quad (m\neq q)$ wherein the respective symbols represent the following:
$V_{Gm}$: gate electrode (scanning signal) voltage,
$V_{Sn}$: source or drain electrode (display signal) voltage,
$V_C$: counter electrode (common terminal) voltage,
$V_{LC}$: absolute value of threshold voltage of a ferroelectric liquid crystal, and
$V_P$: gate-source threshold voltage.

The above operations are repeated to effect writing through cycles of $q=1$ to $q=N$. In this instance, counter electrodes may be formed in stripes as shown in FIG. 64.

Thus, a display can be effected according to image information signals by using a plurality of picture elements formed by a plurality of picture element electrodes and arranged in a plurality of rows and in a plurality of columns, and by using an operation mode which comprises a first phase wherein a ferroelectric liquid crystal at a selected first group of picture elements on a selected row is brought to the first oriented state and a second phase wherein the ferroelectric liquid crystal at a selected second group of picture elements on the selected row is brought to the second oriented state, the first and second phases being effected in the order named and row by row.

Figure 13:
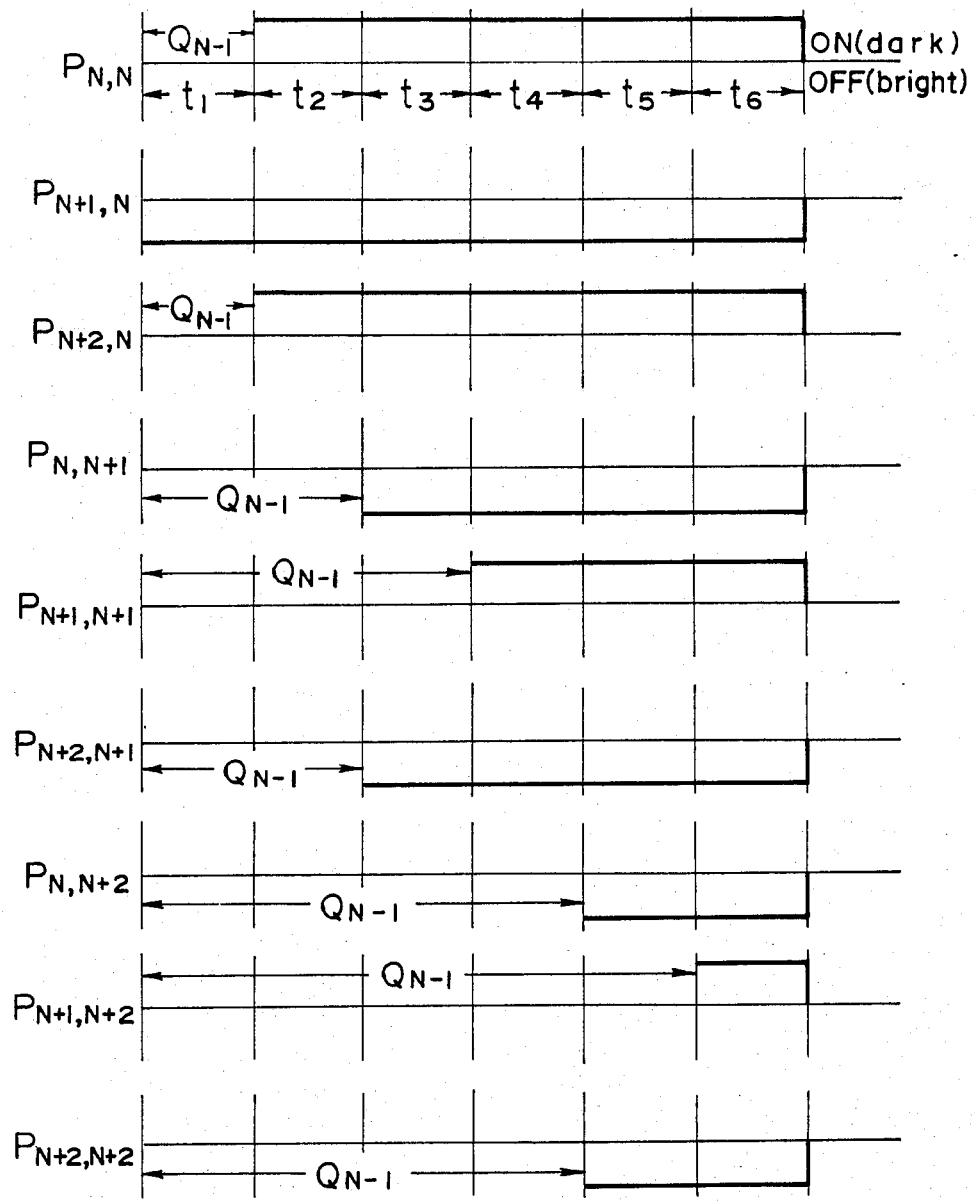

A writing operation for the picture elements shown in FIG. 4 by applying such electric signals is illustrated by FIG. 13. In FIG. 13, the respective abscissas represent time and the ordinates indicate the display states of ON (dark) on the upper sides and OFF (bright) on the lower sides. As is apparent from FIG. 13, a voltage $-V_S - V_C (< -V_{LC})$ exceeding the threshold voltage $-V_{LC}$ is applied to a picture element $P_{N+1,N}$ at an intersection of a selected scanning line and a selected display line at phase $t_1$. Thus, the picture element $P_{N+1,N}$ shown in FIG. 4 changes its orientation and is switched to a "bright" state. Then, at phase $t_2$, a voltage $V_S - V_C (> V_{LC})$ exceeding the threshold voltage $V_{LC}$ is applied to picture elements $P_{N,N}$, $P_{N+2,N}$ at intersections of a selected scanning line and selected display lines. Thus, the picture elements $P_{N,N}$, $P_{N+2,N}$ are switched to "dark". Operations at phases $t_3-t_6$ after the phase $t_2$ are similar to that explained with reference to phases $t_1$ and $t_2$. Thus, a "bright" state is written in a picture element on a selected scanning line and then a "dark" state is written in a picture element which is not selected in the previous phase on the same scanning line. As will be understood from the above explanation, depending on whether a display electrode is sected or not on a selected scanning electrode line, liquid crystal molecules on the display electrode when it is selected are oriented to the first or second oriented state to give a picture element of ON (dark) or OFF (bright) state. On the nonselected scanning lines, voltages applied to all picture elements do not exceed the threshold voltages. As a result, liquid crystal molecules at the respective picture elements on the nonselected scanning lines do not change their orientation states but retain their orientation states obtained corresponding to the signal state ($Q_{N-1}$) in the previous scanning step. Namely, when a certain scanning electrode line is selected, signals corresponding to the line are written. During a time interval from a time at which writing of signals corresponding to one frame is completed to a time at which the scanning line is selected next after one frame is completed, the signal state of each picture element is maintained. As a result, even if the number of scanning electrode lines is increased, the duty ratio does not substantially change, thus resulting in no decrease in contrast.

Examples of specific preferable values for driving a ferroelectric liquid crystal DOBAMBC in the above explained embodiment are enumerated below:

Input frequency $f_0 = 1 \times 10^4 - 1 \times 10^6$ Hz
$10 < |V_G| < 60$ V (peak value)
$0.3 < |V_S| < 10$ V (peak value).

Figure 14A:
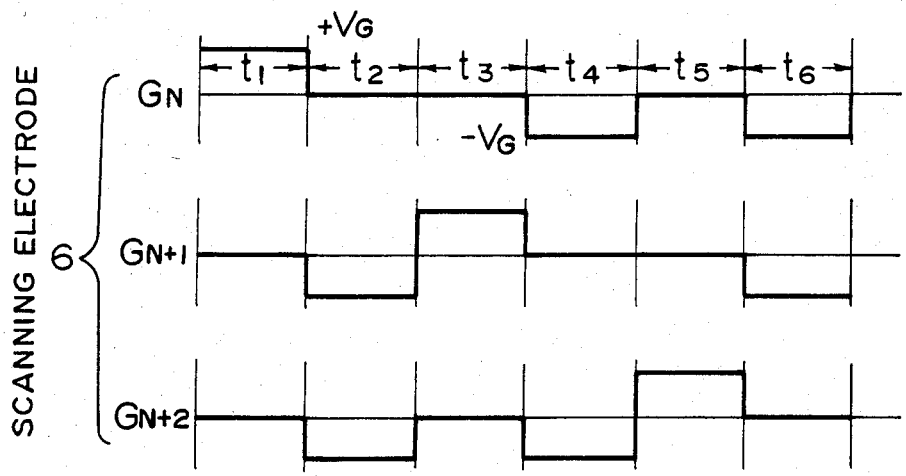
Figure 14B:
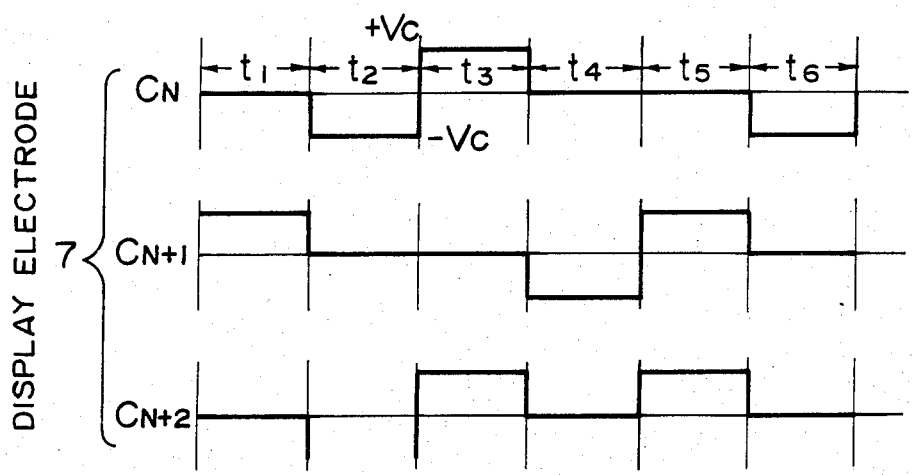

FIG. 14A shows scanning signals for the active matrix circuit shown in FIG. 8 and, more particularly shows electric signals applied to selected scanning electrodes and other scanning electrodes (nonselected scanning electrodes), respectively, at phases $t_1, t_2, \ldots$. FIG. 14B shows dispaly signals applied correspondingly and, more particularly, shows electric signals applied to selected display electrodes and nonselected display electrodes, respectively, at phases $t_1, t_2, \ldots$.

In FIGS. 14A and 14B, the abscissa represent time and the ordinates represent voltages. For example, when a motion picture is displayed, scanning electrodes 8 are sequentially and periodically selected. The electric signal applied to the selected scanning electrode $G_N$ is $+V_G$ at the time of writing "bright" and 0 at the time of writing "dark" as shown in FIG. 14A.

On the other hand, an electric signal of $-V_G$ is applied to the other nonselected scanning electrodes at phase $t_1$ as shown in FIG. 14A. Further, the electric signal applied to the selected display electrodes is $+V_C$ at the time of writing "bright" and a $-V_C$ at the time of writing "dark". On the other hand, an electric signal of 0 is applied to any of the nonselected display electrode. In the above, respective voltages are set to desired values satisfying the following relationships.

In a case where, on a scanning electrode of $m = q$ line, "bright" state is written on a display electrode of $n = 1_1$ and then "dark" on a display electrode $n = 1_2$:

$V_{Gm} - V_P > V_{LC} + V_S$  ($m = q, n = 1_1$)

$V_S + V_{LC} < V_{Cn}$  ($n = 1_1$)

$V_{Gm} + 0$  ($m = q, n = 1_2$)

$V_S - V_{LC} > V_{Cn}$  ($n = 1_2$)

$V_{Gm} - V_P < V_{Cn}$  ($m \neq q$)

wherein the respective symbols represent the following:
$V_{Gm}$: gate electrode (scanning signal) voltage,
$V_{Cn}$: counter electrode (display signal) voltage,
$V_S$: source or drain (common electrode) voltage,
$V_{LC}$: absolute value of threshold voltage of a ferroelectric liquid crystal, and
$V_P$: gate-source threshold voltage.

The above operations are repeated to effect writing through cycles of $q = 1$ to $a = N$. In this instance, counter electrodes may be formed in stripes as shown in FIG. 64.

Thus, a display can be effected according to image information signals by using a plurality of picture elements formed by a plurality of picture element electrodes and arranged in a plurality of rows and in a plurality of columns, and by using an operation mode which comprises a first phase wherein a ferroelectric liquid crystal at a selected first group of picture elements on a selected row is brought to the first oriented state and a second phase wherein the ferroelectric liquid crystal at a selected second group of picture elements on the selected row is brought to the second oriented state, the first and second phases being effected in the order named and row by row.

Figure 15:
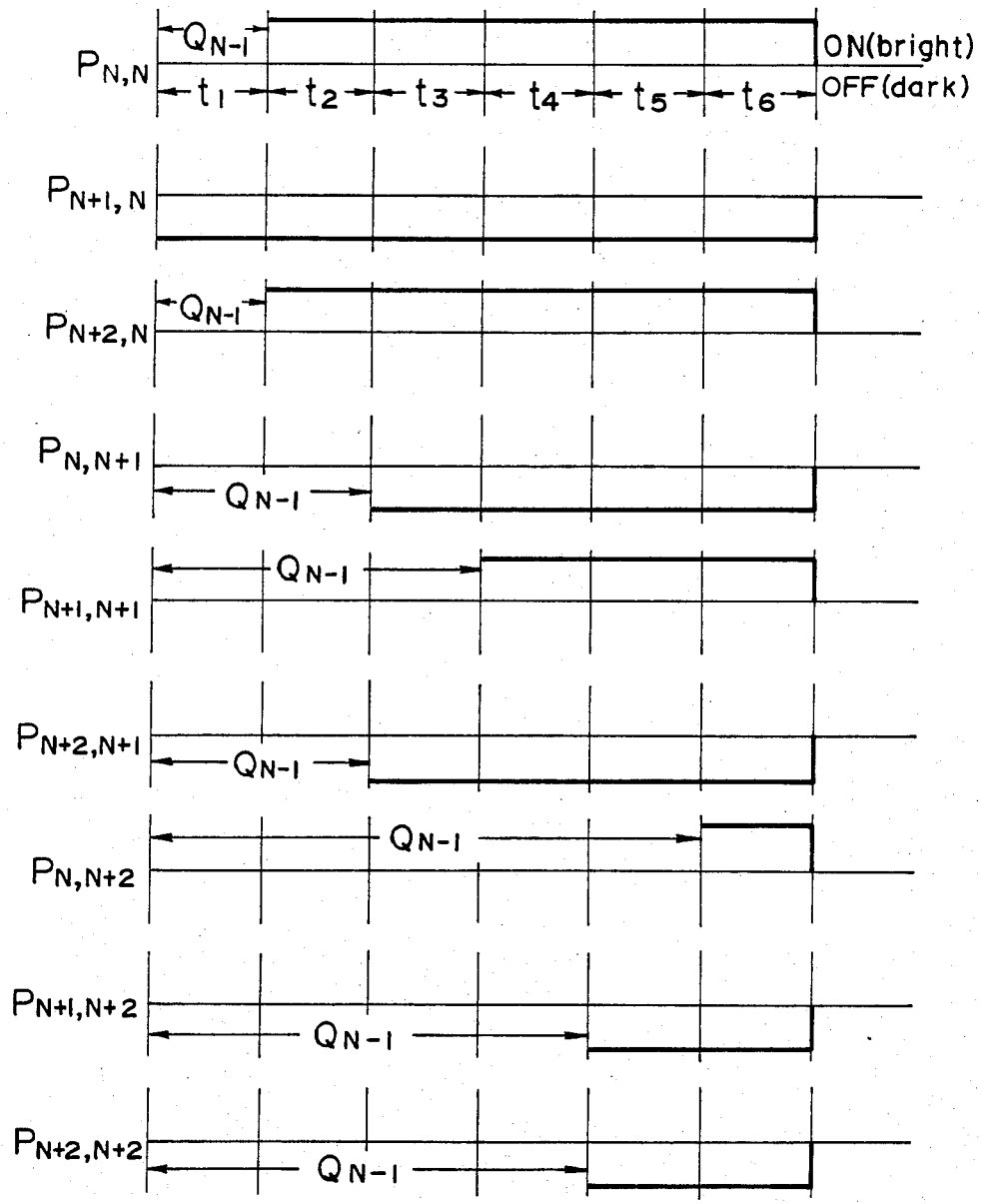

A writing operation for the picture elements shown in FIG. 4 by applying such electric signals is illustrated by FIG. 15. In FIG. 15, the respective abscissas represent time and the ordinates indicate the display states of ON (bright) on the upper sides and OFF (dark) on the lower sides. As is apparent from FIG. 15, a voltage $V_S - V_C (> V_{LC})$ exceeding the threshold voltage $V_{LC}$ is applied to a picture element $P_{N+1,N}$ on a selected scanning line at phase $t_1$. Thus, the picture element $P_{N+1,N}$ shown in FIG. 4 changes its orientation and is switched to a "dark" state. Then, at phase $t_2$, a voltage $-V_S - V_C (< -V_{LC})$ exceeding the threshold voltage $-V_{LC}$ is applied to picture elements $P_{N,N}, P_{N+2,N}$ on a selected scanning line. Thus, the picture elements $P_{N,N}, P_{N+2,N}$ are switched to "bright". Operations at phases $t_3 - t_6$ after the phase $t_2$ are similar to that explained with reference to phases $t_1$ and $t_2$. Thus, a "dark" state is written in a picture element on a selected scanning line and display line and then a "bright" state is written in a picture element which is not selected in the previous phase on the same scanning line. As will be understood from the above explanation, depending on whether a display electrode is selected or not on a selected scanning electrode line, liquid crystal molecules on the display electrode when it is selected are oriented to the first or second oriented state to give a picture element of ON (bright) or OFF (dark) state. On the nonselected scanning lines, voltages applied to all the picture elements do not exceed the threshold voltages. As a result, liquid crystal molecules at the respective picture elements on the nonselected scanning lines do not change their orientation states but retain their orientation states obtained corresponding to the signal state ($Q_{N-1}$) in the previous scanning step. Namely, when a certain scanning electrode line is selected, signals corresponding to the line are written. During a time interval from a time at which writing of signals corresponding to one frame is completed to a time at which the scanning line is selected next after one frame is completed, the signal state of each picture element is maintained. As a result, even if the number of scanning electrode lines is increased, the duty ratio does not substantially change, thus resulting in no decrease in contrast.

Figure 16:
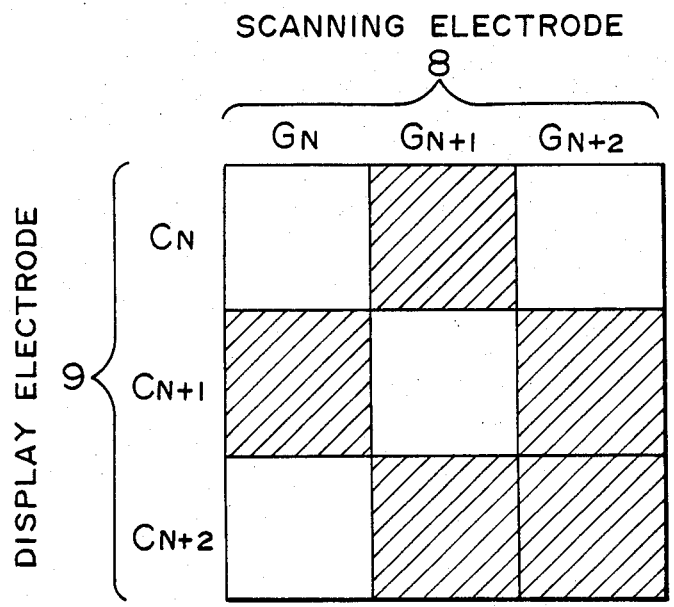

Referring to FIG. 16, among the picture elements formed by intersections of scanning electrodes $G_N$, $G_{N+1}, G_{N+2}, \ldots$ and display electrodes $S_N, S_{N+1}$, $S_{N+2}, \ldots$, it is assumed that the hatched picture elements correspond to the "dark" state and the white picture elements correspond to the "bright" state. With respect to the picture elements on the display electrode $S_N$ in FIG. 16, the picture elements corresponding to the scanning electrodes $G_N$, $G_{N+2}$ are in the bright state and the other picture elements are in the dark state. A display pattern shown in FIG. 16 is completed through the operations at phases $t_1$-$t_6$.

Incidentally, waveforms of voltage signals shown in FIG. 14 all have 3 levels including those of the scanning signals and display signals. However, both scanning signals and driving signals may be those having 2 levels of voltages for driving by setting the voltage of the counter electrode used as a common electrode at the ground level for writing the first display state and at $+V_S$ for writing the second display level.

Figure 17:
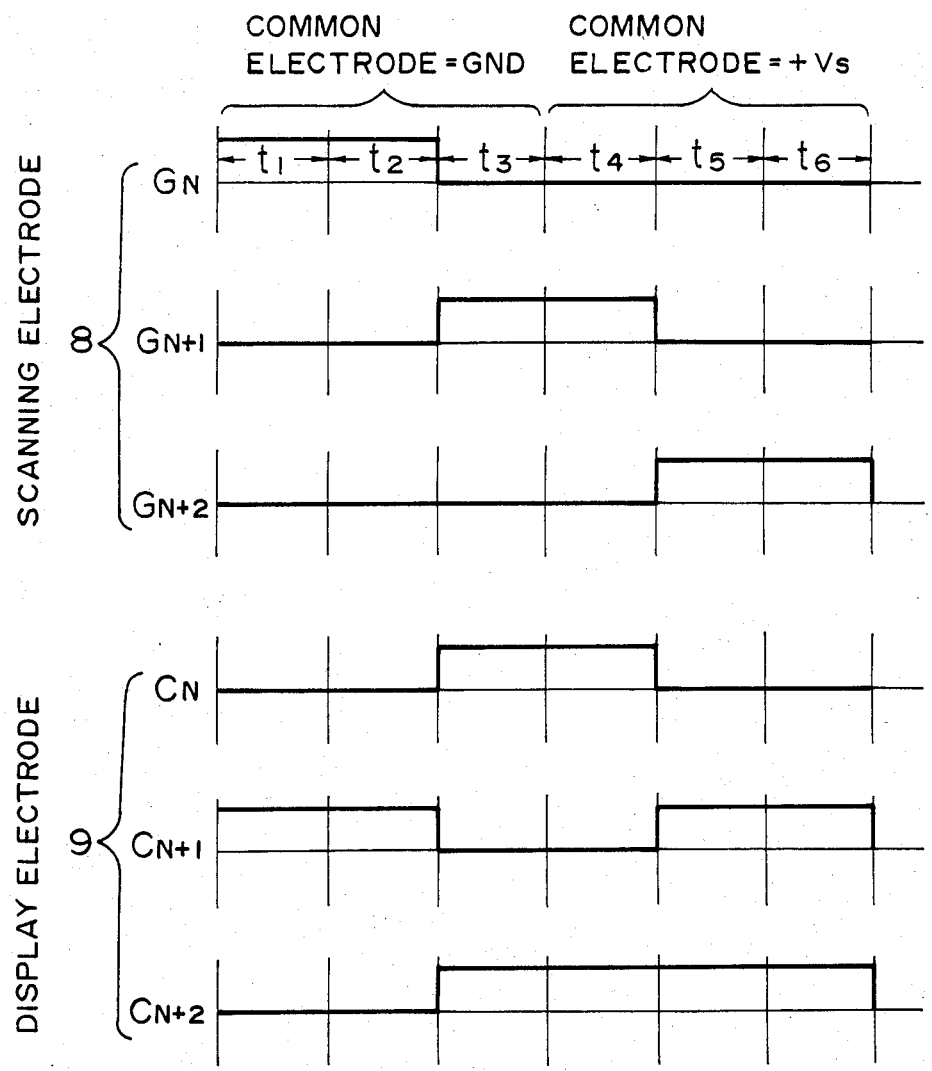

An example of driving waveforms having two levels of voltages is explained in FIG. 17.

Examples of specific preferable values for driving a ferroelectric liquid crystal DOBAMBC in the above explained embodiment are enumerated below:

Input frequency $f_0 = 1 \times 10^4 - 1 \times 10^6$ Hz $10 < |V_G| < 60$ V (peak value)

$0.3 < |V_S| < 10$ V (peak value).

Figure 19:
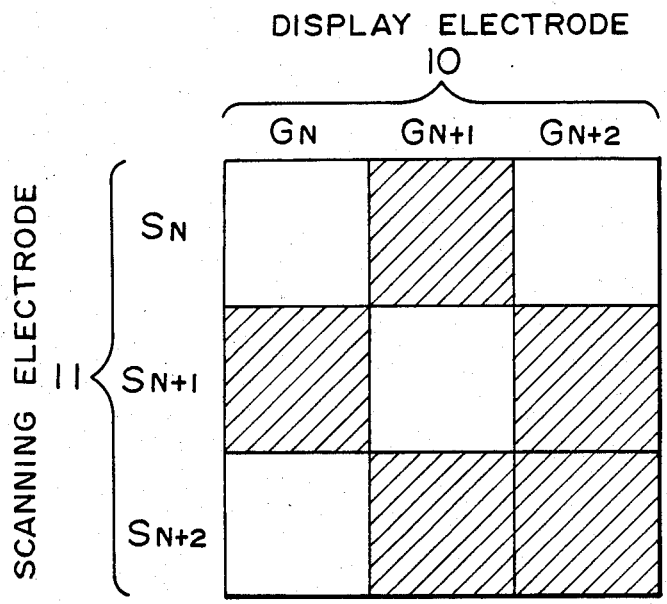
Figure 18:
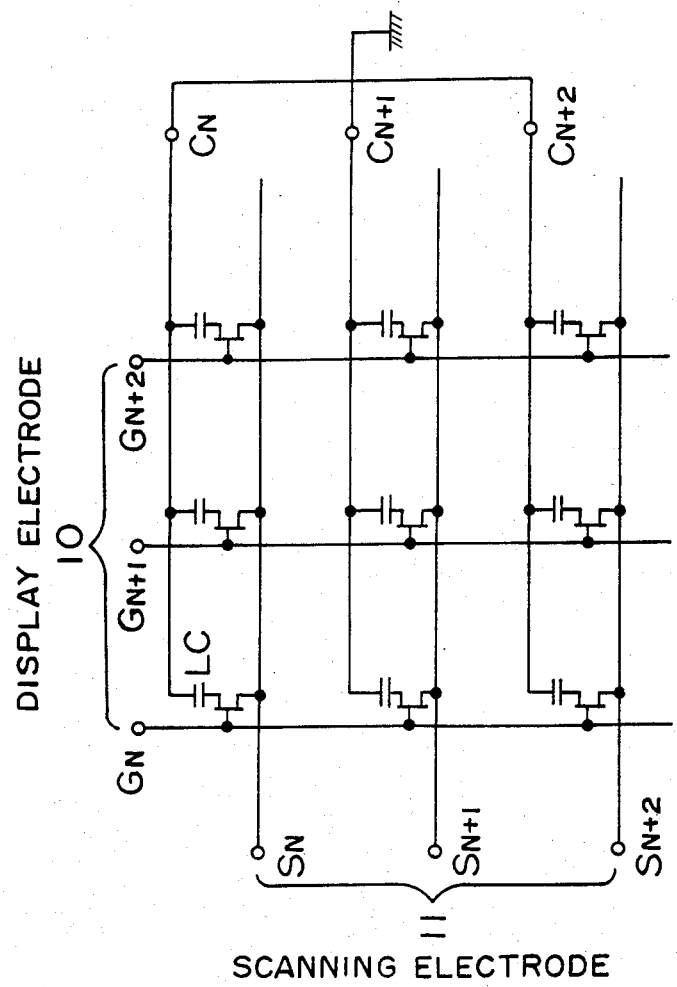

FIG. 18 shows a circuit diagram of another active matrix according to the present invention, and FIG. 19 is an explanatory view illustrating an example of a display of corresponding picture elements.

Referring to FIG. 18, scanning electrodes 10 are connected to sources or drains of FET, and display or signal electrodes 11 are connected to sources or drains of FET, while the counter electrodes are connected electrically in common.

Figure 20A:
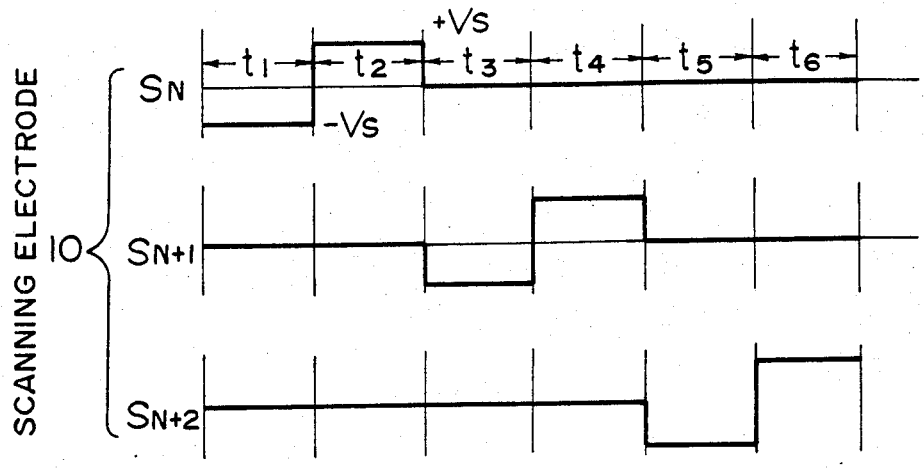
Figure 20B:
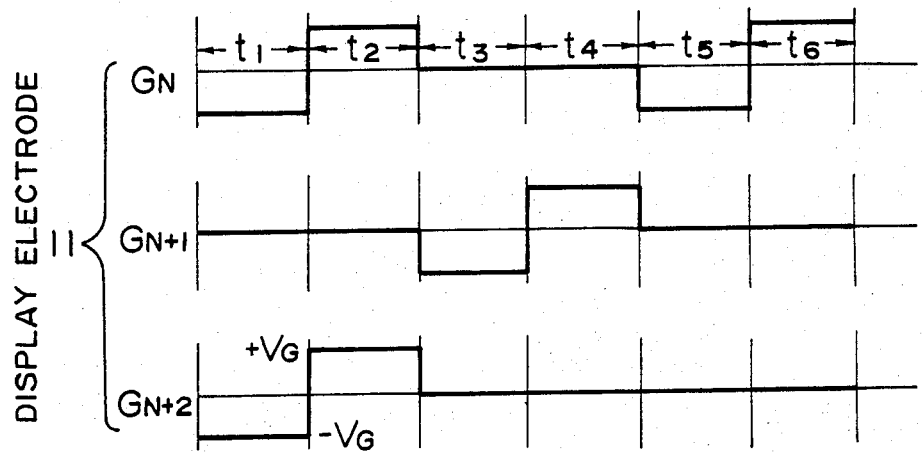

FIG. 20A shows scanning signals including an electric signal applied to a scanning electrode selected at phase $t_1$ and electric signals applied to the other scanning electrodes (nonselected scanning electrodes). FIG. 20B shows display signals including electric signals applied to display electrodes respectively selected at phase $t_1$, $t_2$, ... and an electric signal applied to a nonselected display electrode, each display electrode being connected to a gate.

In FIGS. 20A and 20B, the abscissas represent time and the ordinates represent voltages. For example, when a motion picture is displayed, scanning electrodes 11 are sequentially and periodically selected. The electric signal applied to the selected scanning electrode $S_N$ is $-V_S$ at phase (time) $t_1$ and $+V_S$ at phase (time) $t_2$ as shown in FIG. 20A.

On the other hand, an electric signal of $-V_G$ is applied to the other scanning electrodes $S_{N+1}$, $S_{N+2}$ at phase $t_1$ as shown in FIG. 20A. Further, the electric signal applied to the selected display electrode $G_{N+1}$ is $V_G=0$ at phase $t_1$ as shown in FIG. 18B and an electric signal of $+V_G$ is applied to the display electrodes $G_N$, $G_{N+2}$ selected at phase $t_2$. Further an electric signal of $-V_G$ is applied to the display electrodes not selected at phase $t_1$ and an electric signal of $V_G=0$ is applied to the display electrode not selected at phase $t_2$. In the above, respective voltages are set to desired values satisfying the following relationships.

In a case where, on a scanning electrode of m=q line, "bright" state is written on a display electrode of n=1 and then "dark" on a display electrode n≠1:

$V_{Gn} - V_P > V_{LC} + V_C$  (n=1)

$V_C + V_{LC} < V_{Sm}$  (m=q_1, n=1_1)

$V_C - V_{LC} > V_{Sm}$  (m=q_2, n=1_2)

$V_{Gn} - V_P < V_{Sm}$  (m=q, n≠1) (m≠q, n=1)

wherein the respective symbols represent the following:

$V_{Sm}$: source electrode (scanning signal) voltage, $V_{Gn}$: gate electrode (display signal) voltage;

$V_C$: counter electrode (common terminal) voltage, $V_{LC}$: absolute value of threshold voltage of a ferroelectric liquid crystal, and $V_P$: gate-source threshold voltage.

The above operations are repeated to effect writing through cycles of q=1 to q=N.

Thus, a display can be effected according to image information signals by using a plurality of picture elements formed by a plurality of picture element electrodes and arranged in a plurality of rows and in a plurality of columns, and by using an operation mode which comprises a first phase wherein a ferroelectric liquid crystal at a selected first group of picture elements on a selected row is brought to the first oriented state and a second phase wherein the ferroelectric liquid crystal at a selected second group of picture elements on the selected row is brought to the second oriented state, the first and second phases being effected in the order named and row by row.

A writing operation for the picture elements shown in FIG. 4 by applying such electric signals is illustrated by FIG. 15. In FIG. 15, the respective abscissas represent time and the ordinates indicate the display state of ON (bright) on the upper sides and OFF (dark) on the lower sides. As is apparent from FIGS. 20 and 15, a voltage $-V_S - V_C (< -V_{LC})$ exceeding the threshold voltage $V_{LC}$ is applied to a picture element $P_{N,N+1}$ on a selected scanning line at phase $t_1$. As a result, the picture element $P_{N,N+1}$ shown in FIG. 4 changes its orientation and is switched to "dark". Then, at phase $t_2$, a voltage $V_S - V_C (> V_{LC})$ exceeding the threshold voltage $V_{LC}$ is applied to picture elements $P_{N,N}$, $P_{N,N+2}$ on the selected scanning line at phase $t_2$. Thus, the picture elements $P_{N,N}$, $P_{N,N+2}$ are switched to "bright". Operations at phases $t_3$-$t_6$ after the phase $t_2$ are similar to that explained with reference to phases $t_1$ and $t_2$. Thus, a "dark" state is written in a picture element on a selected scanning line and then a "bright" state is written in a picture element which is not selected in the previous phase on the same scanning line. As will be understood from the above explanation, depending on whether a display electrode is sected or not on a selected scanning electrode line, liquid crystal molecules on the display electrode when it is selected are oriented to the first or second oriented state to give a picture element of ON (bright) or OFF (dark) state. On the nonselected scanning lines, voltages applied to all the picture elements do not exceeds the threshold voltages. As a result, liquid crystal molecules at the respective picture elements on the nonselected scanning lines do not change their orientation states but retain their orientation states obtained corresponding to the signal state ($Q_{N-1}$) in the previous scanning step. Namely, when a certain scanning electrode line is selected, signals corresponding to the line are written. During a time interval from a time at which writing of signals corresponding to one frame is completed to a time at which the scanning line is selected next after one frame is completed, the signal state of each picture element is maintained. As a result, even if the number of scanning electrode lines is increased, the duty ratio does not substantially change, thus resulting in no decrease in contrast.

Referring to FIG. 19, among the picture elements formed by intersections of scanning electrodes $S_N$, $S_{N+1}$, $S_{N+2}$, ... and display electrodes $G_N$, $G_{N+1}$, $G_{N+2}$, ..., it is assumed that the hatched picture elements correspond to the "dark" state and the white picture elements correspond to the "bright" state. With respect to the picture elements on the display electrode $G_N$ in FIG. 19, the picture elements corresponding to the scanning electrodes $S_N$, $S_{N+2}$ are in the bright state and the other picture element are in the dark state. A display pattern shown in FIG. 19 is completed through the operations at phases $t_1$–$t_6$.

Examples of specific preferable values for driving a ferroelectric liquid crystal DOBAMBC in the above explained embodiment are enumerated below:

Input frequency $f_0 = 1 \times 10^4 - 1 \times 10^6$ Hz
$10 < |V_G| < 60$ V (peak value)
$0.3 < |V_S| < 10$ V (peak value).

Figure 21:
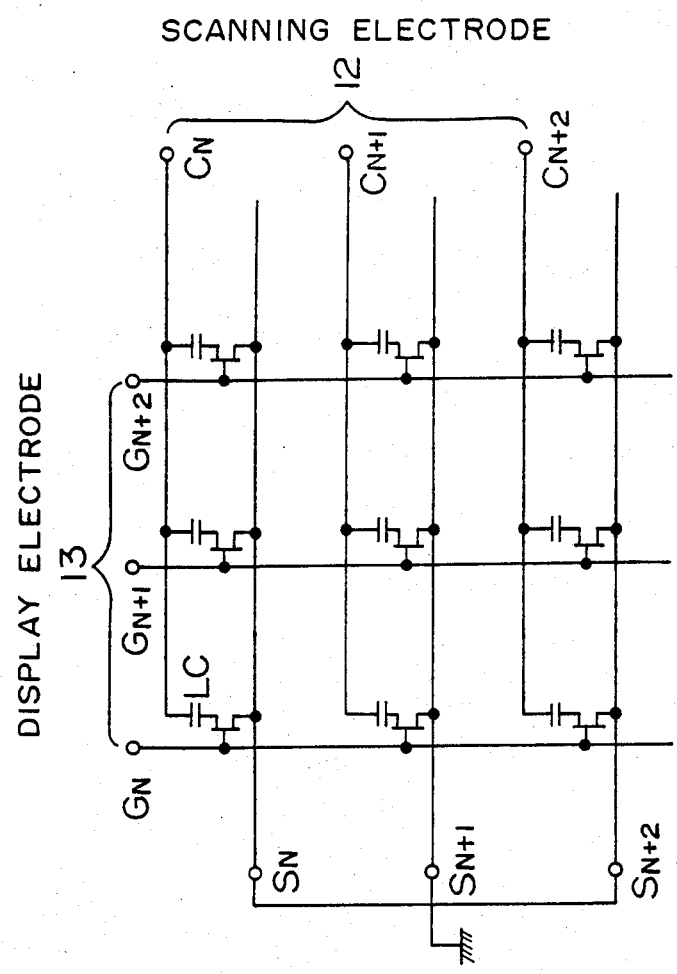
Figure 22:
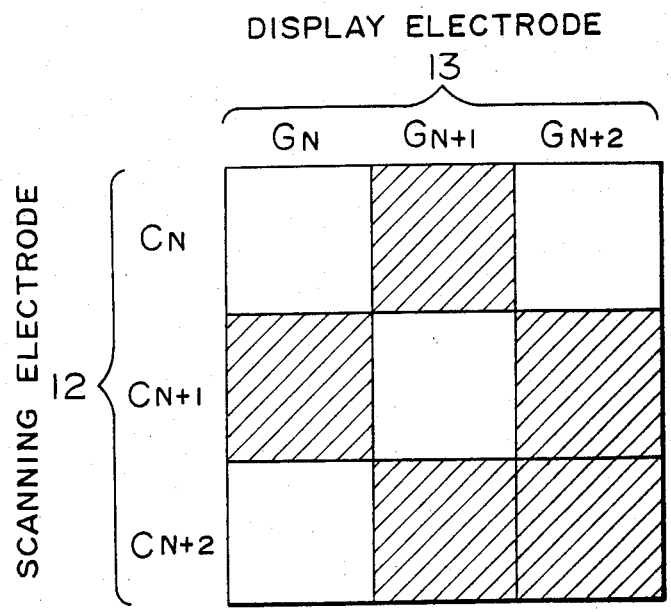

FIG. 21 shows a circuit diagram of another active matrix according to the present invention, and FIG. 22 is an explanatory view illustrating an example of a display of corresponding picture elements.

Referring to FIG. 21, scanning electrodes 12 are formed of counter electrodes, and display or signal electrodes 13 are connected to gates of FET, while the sources or drain of FET are connected electrically in common.

Figure 23A:
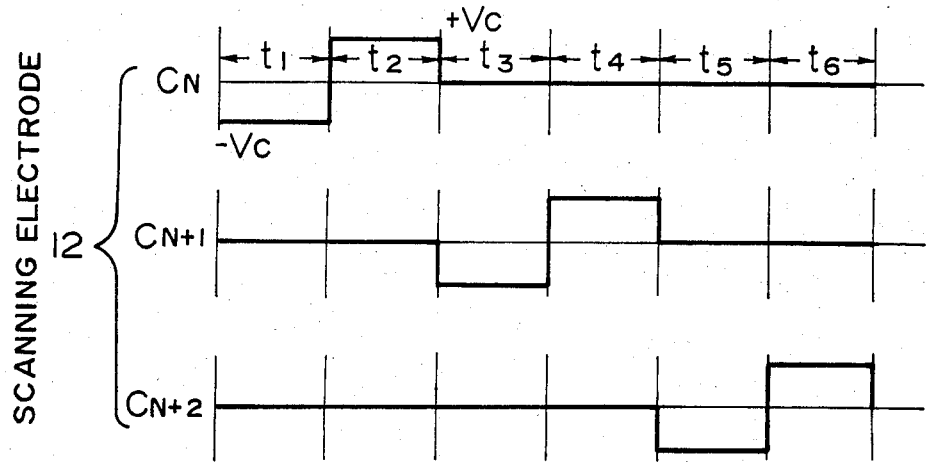
Figure 23B:
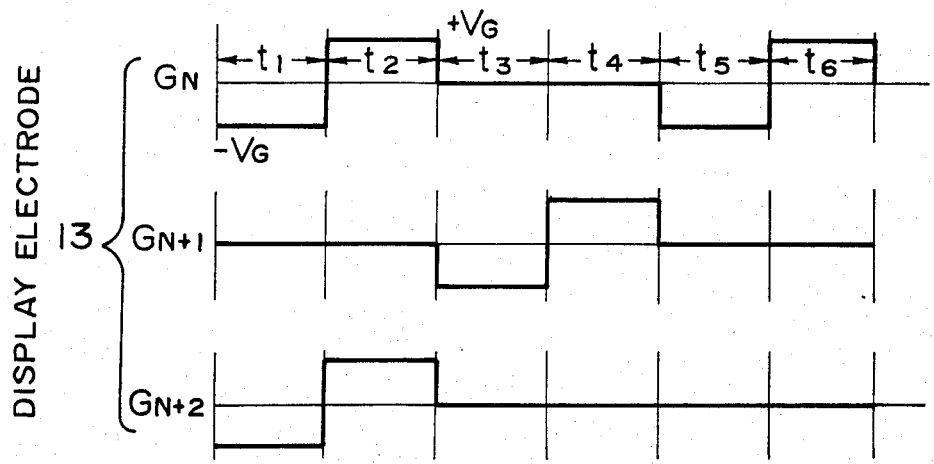

FIG. 23A shows scanning signals including an electric signal applied to selected scanning electrodes and electric signals applied to the other scanning electrodes (nonselected scanning electrodes), respectively, at phases $t_1$, $t_2$, .... FIG. 23B shows display signals including electric signals applied to display electrodes selected and nonselected, respectively, at phases $t_1$, $t_2$, ....

In FIGS. 23A and 23B, the abscissas represent time and the ordinates represent voltages. For example, when a motion picture is displayed, scanning electrodes 12 formed of counter electrodes are sequentially and periodically selected. The electric signal applied to the selected scanning electrode $C_N$ is $-V_C$ at phase (time) $t_1$ and $+V_C$ at phase (time) $t_2$ as shown in FIG. 23A.

On the other hand, an electric signal of $V_C = 0$ is applied to the other scanning electrodes $C_{N+1}$, $C_{N+2}$ at phases $t_1$, $t_2$ as shown in FIG. 23A. Further, the electric signal applied to the selected display electrode $G_{N+1}$ is $V_G = 0$ at phase $t_1$ and an electric signal of $+V_G$ is applied to the display electrodes $G_N$, $G_{N+2}$ selected at phase $t_2$ as shown in FIG. 23B. Further an electric signal of $-V_G$ is applied to the nonselected electrode at phase $t_1$, and an electric signal of $V_G = 0$ is applied to the nonselected display electrode $G_{N+1}$ at phase $t_2$. In the above, respective voltages are set to desired values satisfying the following relationships.

In a case where, on a scanning electrode of m=q line, "bright" is written on a display electrode of n=$1_1$ and then "dark" on a display electrode n=$1_2$:

$V_{Gm} - V_P > V_{LC} + V_S$  (m=q, n=$1_1$) (m=q, n=$1_1$)

$V_S + V_{LC} < V_{Cm}$  (m=q, n=$1_1$)

$V_S - V_{LC} > V_{Cm}$  (m=q, n=$1_2$)

$V_{Gn} - V_P < V_{Cm}$  (m=q, n≠$1_1$) (m=q, n≠$1_2$)

wherein the respective symbols represent the following:

$V_{Cm}$: counter electrode (scanning signal) voltage,
$V_{Gn}$: gate electrode (display signal) voltage,
$V_S$: source or drain (common terminal) voltage;
$V_{LC}$: absolute value of threshold voltage of a ferroelectric liquid crystal, and
$V_P$: gate-source threshold voltage.

The above operations are repeated to effect writing through cycles of q=1 to q=N. In this instance the counter electrodes may be formed in stripes as shown in FIG. 64.

Thus, a display can be effected according to image information signals by using a plurality of picture elements formed by a plurality of picture element electrodes and arranged in a plurality of rows and in a plurality of columns, and by using an operation mode which comprises a first phase wherein a ferroelectric liquid crystal at a selected first group of picture elements on a selected row is brought to the first oriented state and a second phase wherein a ferroelectric liquid crystal at a selected second group of picture elements on the selected row is brought to the second oriented state, the first and second phases being effected in the order named and row by row.

A writing operation for the picture elements shown in FIG. 4 by applying such electric signals is illustrated by FIG. 15. In FIG. 15, the respective abscissas represent time and the ordinates indicate the display states of ON (bright) on the upper sides and OFF (dark) on the lower sides. As is apparent from FIGS. 23 and 15, a voltage $-V_S - V_C (< -V_{LC})$ exceeding the threshold voltage $-V_{LC}$ is applied to a picture element $P_{N,N+1}$ on a selected scanning line at phase $t_1$. Thus, the picture element $P_{N,N+1}$ shown in FIG. 4 changes its orientation and is switched to a "dark" state. Then, at phase $t_2$, a voltage $V_S - V_C (> V_{LC})$ exceeding the threshold voltage $V_{LC}$ is applied to picture elements $P_{N,N}$, $P_{N,N+2}$ on the selected scanning line. Thus, the picture elements $P_{N,N}$, $P_{N,N+2}$ are switched to "bright". Operations at phases $t_3$–$t_6$ after the phase $t_2$ are similar to that explained with reference to phases $t_1$ and $t_2$. Thus, a "dark" state is written in a picture element on a selected scanning line and then a "bright" state is written in a picture element which is not selected in the previous phase on the same scanning line. As will be understood from the above explanation, depending on whether a display electrode is selected or not on a selected scanning electrode line, the display electrode when it is selected is brought to ON (dark) or OFF (bright) state. On the nonselected scanning lines, voltages applied to all the picture elements do not exceed the threshold voltages. As a result, liquid crystal molecules at the respective picture elements on the nonselected scanning lines do not change their orientation states but retain their orientation states obtained corresponding to the signal state ($Q_{N-1}$) in the previous scanning step. Namely, when a certain scanning electrode line is selected, signals corresponding to the line are written. During a time interval from a time at which writing of signals corresponding to one frame is completed to a time at which the scanning line is selected next after one frame is completed, the signal state of each picture element is maintained. As a result, even if the number of scanning electrode lines is increased, the duty ratio does not substantially change, thus resulting in no decrease in contrast.

Referring to FIG. 22, among the picture elements formed by intersections of scanning electrodes $C_N$, $C_{N+1}$, $C_{N+2}$, ... and display electrodes $G_N$, $G_{N+1}$, $G_{N+2}\ldots$, it is assumed that the hatched picture elements correspond to the "dark" state and the white picture elements to the "bright" state. With respect to the picture elements on the display electrode $G_N$ in FIG. 22, the picture elements corresponding to the scanning electrodes $C_N$, $C_{N+2}$ are in the bright state and the other picture element is in the dark state. A display pattern shown in FIG. 22 is completed through the operations at phases $t_1$-$t_6$.

Examples of specific preferable values for driving a ferroelectric liquid crystal DOBAMBC in the above explained embodiment are enumerated below:

Input frequency $f_0 = 1 \times 10^4 - 1 \times 10^6$ Hz
$10 < |V_G| < 60$ V (peak value)
$0.3 < |V_S| < 10$ V (peak value).

Figure 24:
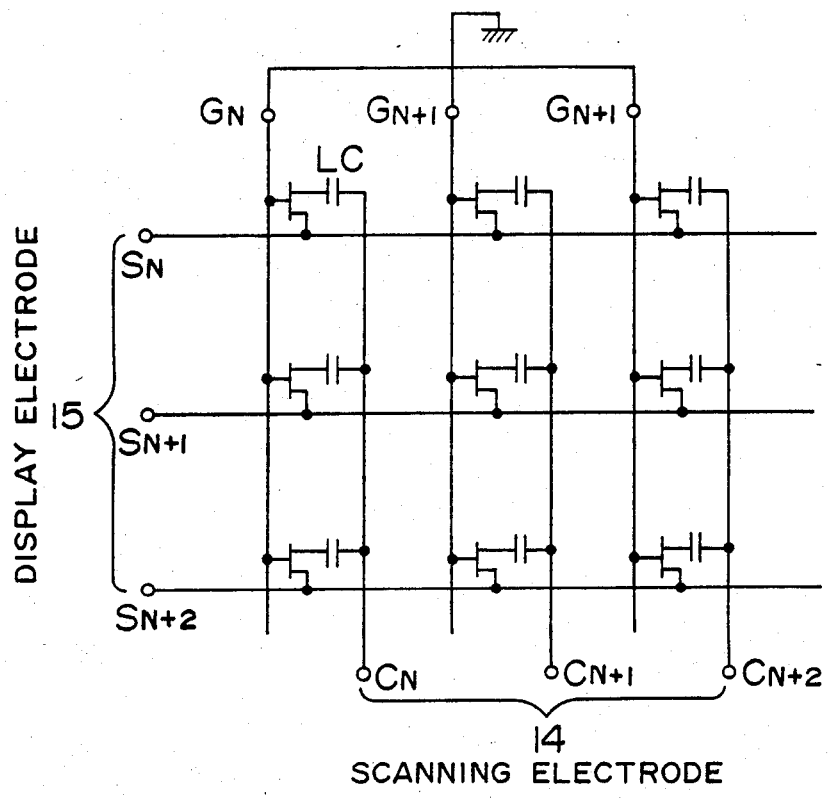

FIG. 24 shows a circuit diagram of another active matrix according to the present invention, and FIG. 22 is an explanatory view illustrating an example of a display of corresponding picture elements.

Referring to FIG. 24, scanning electrodes 14 are formed of counter electrodes, and display or signal electrodes 15 are connected to sources or drains of FET.

Figure 26A:
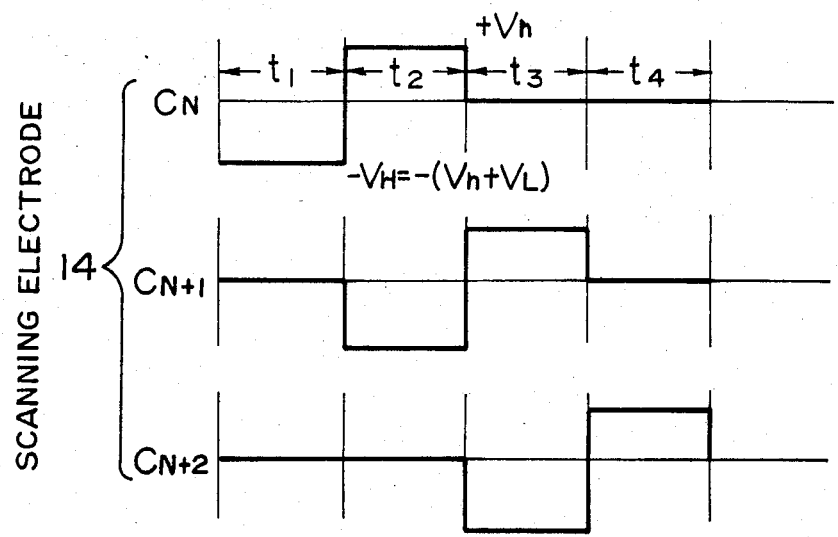
Figure 26B:
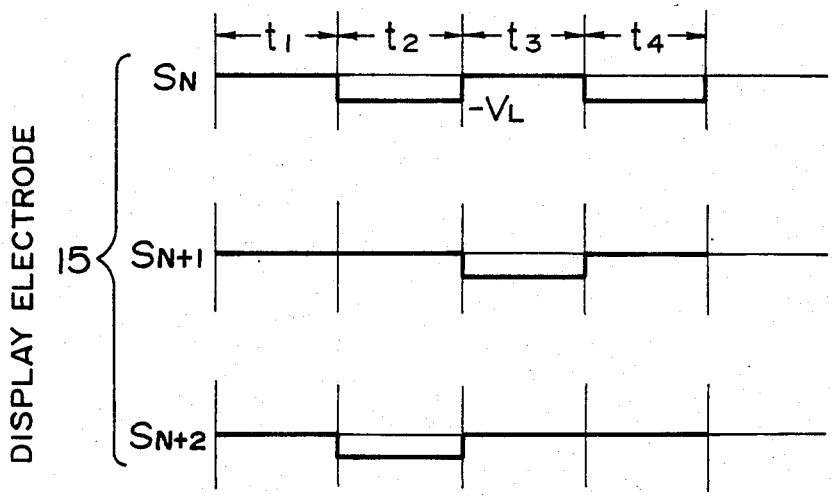

FIG. 26A shows scanning signals including an electric signal applied to selected scanning electrodes (counter electrodes) and electric signals applied to the other scanning electrodes (nonselected scanning electrodes; counter electrodes), respectively, at phases $t_1$, $t_2$, .... FIG. 26B shows display signals including electric signals applied to selected display electrodes and nonselected display electrodes, respectively, at phase $t_1$, $t_2$ ..

In FIGS. 26A and 26B, the abscissas represent time and the ordinates represent voltages. For example, when a motion picture is displayed, scanning electrodes 14 are sequentially and periodically selected. The electric signal is applied to the selected scanning electrode $C_N$ is $-V_H$ at phase (time) $t_1$ and $+V_H$ at phase (time) $t_2$ as shown in FIG. 26A.

On the other hand, an electric signal of 0 is applied to the other scanning electrodes $C_{N+1}$, $C_{N+2}$ at phase $t_1$ as shown in FIG. 26A. At phase $t_2$, the scanning electrode $C_{N+1}$ is selected in addition to $C_N$, and an electric signal of $-V_H$ which is the same as the one applied to $C_N$ at phase $t_1$ is applied to the scanning electrode $C_{N+1}$. While no display electrode is selected at phase $t_1$, an electric signal of $-V_L$ is applied to the display electrodes $S_N$, $S_{N+2}$ selected at phase $t_2$ as shown in FIG. 26B. In the above, respective voltages are set to desired values satisfying the following relationships.

In a case where, on a scanning electrode of $m=q$ line, "bright" state is written on a display electrode of $n=1$ and all the picture elements on a scanning electrode of $m=q+1$ are refreshed to form a "dark" state, simultaneously:

$V_G - V_P > V_{LC} + V_D$   ($m=q$, $n=1$) ($m=q+1$)

$V_D + V_{LC} < V_S$   ($m=q$, $n=1$)

$V_D - V_{LC} > V_S$   ($m=q+1$)

$V_G - V_P < V_S$   ($m=q$, $n \neq 1$)

wherein the respective symbols represent the following:
$V_S$: source voltage,
$V_D$: drain voltage,
$V_G$: gate (common electrode) voltage,
$V_{LC}$: absolute value of threshold voltage of a ferroelectric liquid crystal, and
$V_P$: gate-source threshold voltage.

The above operations are repeated to effect writing through cycles of $q=1$ to $q=N$. In this instance, the counter electrodes may be formed in stripes as shown in FIG. 64.

Thus, a display can be effected according to image information signals by using a plurality of picture elements formed by a plurality of picture element electrodes and arranged in a plurality of rows and in a plurality of columns, and by using an operation mode which comprises a first phase wherein a ferroelectric liquid crystal at selected picture elements on a row (q) is brought to the first alignment state and a second phase wherein a ferroelectric liquid crystal at picture elements on the row (q+1) subsequent to the above mentioned row (q) is refreshed to the second stable state, the first and second phases being effected simultaneously and repeated row by row.

Figure 27:
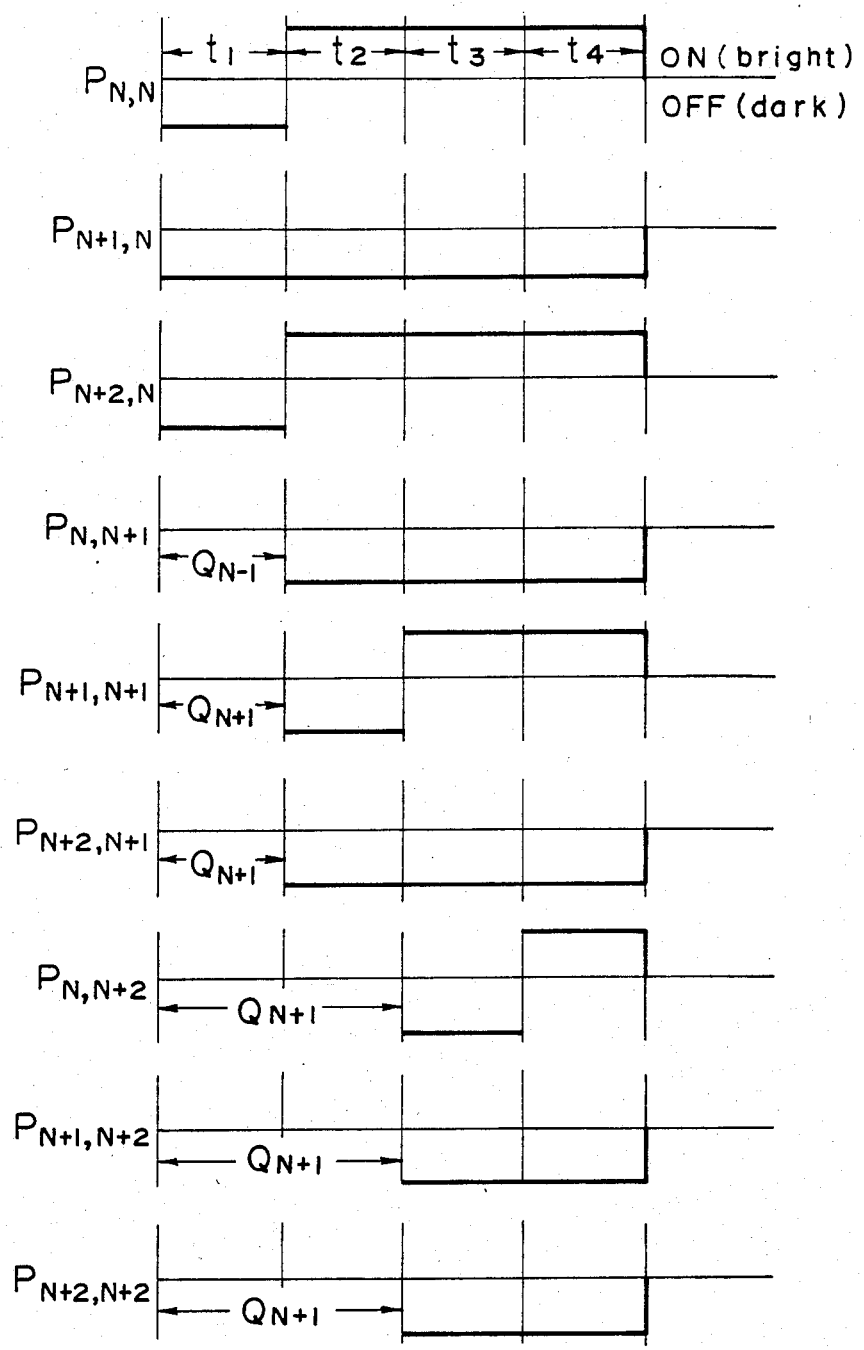

A writing operation for the picture elements shown in FIG. 4 by applying such electric signals is illustrated by FIG. 27. In FIG. 27, the respective abscissas represent time and the ordinates indicate the display states of ON (bright) on the upper sides and OFF (dark) on the lower sides. As apparent from FIGS. 26 and 27, a voltage $-V_H - V_D (< -V_{LC}, V_D = 0)$ exceeding the threshold voltage $V_{LC}$ is applied to picture elements $P_{N,N}$, $P_{N+1,N}$, $P_{N+2,N}$ on a selected scanning line at phase $t_1$, whereby these picture elements are refreshed to "dark". Then, at phase $t_2$, a voltage $V_H + V_L (> V_{LC})$ exceeding the threshold voltage $V_{LC}$ is applied to picture elements $P_{N,N}$, $P_{N+2,N}$ at intersections of a selected scanning line and selected display lines, whereby the picture elements $P_{N,N}$, $P_{N+2,N}$ are brought to "bright". Thus, "bright" is written on the scanning electrode C. Simultaneously with the writing, at phase $t_2$, a voltage $-V_H - V_P (< -V_{LC})$ exceeding the threshold voltage $-V_{LC}$ is applied to the picture elements $P_{N,N+1}$, $P_{N+1,N+1}$, $P_{N+2,N+1}$ also on the scanning line, these picture elements are refreshed to "dark". As a result, on a selected scanning line, liquid crystal molecules at respective picture elements are first oriented to one orientation state to form picture elements of OFF (dark), and then the liquid crystal molecules at respective picture elements on the same selected scanning electrodes assume a new state depending on whether the display electrodes, e.g., the liquid crystal molecules are switched to the other orientation state to form picture elements on ON (bright) when the display electrodes are selected. At and after phase $t_3$, the above operations are repeated, whereby predetermined states are written on the respective scanning lines.

On the other hand, as shown in FIG. 27, voltages applied to any picture elements on the nonselected scanning lines do not exceed the threshold values. As a result, liquid crystal molecules in the respective picture elements on the nonselected scanning lines do not change their orientation states but retain their orientation states obtained corresponding to the signal state ($Q_{N-1}$) in the previous scanning step. Namely, when a certain scanning electrode line is selected, signals corresponding to the line are written. During a time interval from a time at which writing of signals corresponding to one frame is completed to a time at which the scanning line is selected next after one frame is completed, the signal state of each picture element is maintained. As a result, even if the number of scanning electrode lines is increased, the duty ratio does not substantially change, thus resulting in no decrease in contrast.

Figure 25:
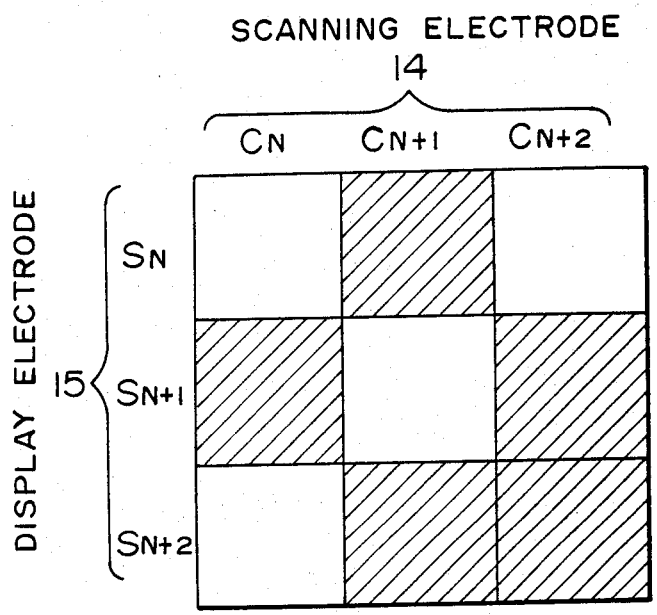

Referring to FIG. 25, among the picture elements formed by intersections of scanning electrodes $C_N$, $C_{N+1}$, $C_{N+2}$, ... and display electrodes $S_N$, $S_{N+1}$, $S_{N+2}$, ..., it is assumed that the hatched picture elements correspond to the "dark" state and the white picture elements to the "bright" state. With respect to the picture elements on the display electrode $S_N$ in FIG. 25, the picture elements corresponding to the scanning electrodes $C_N$, $C_{N+2}$ are in the "bright" state and the other picture element is in the "dark" state. A display pattern shown in FIG. 25 is coupled through the operations at phases $t_1$-$t_6$ as described above.

Examples of specific preferable values for driving a ferroelectric liquid crystal DOBAMBC in the above explained embodiment are enumerated below:

Input frequency $f_0 = 1 \times 10^4 - 1 \times 10^6$ Hz
$10 < |V_G| < 60$ V (peak value)
$0.3 < |V_S| < 10$ V (peak value)

Figure 28A:
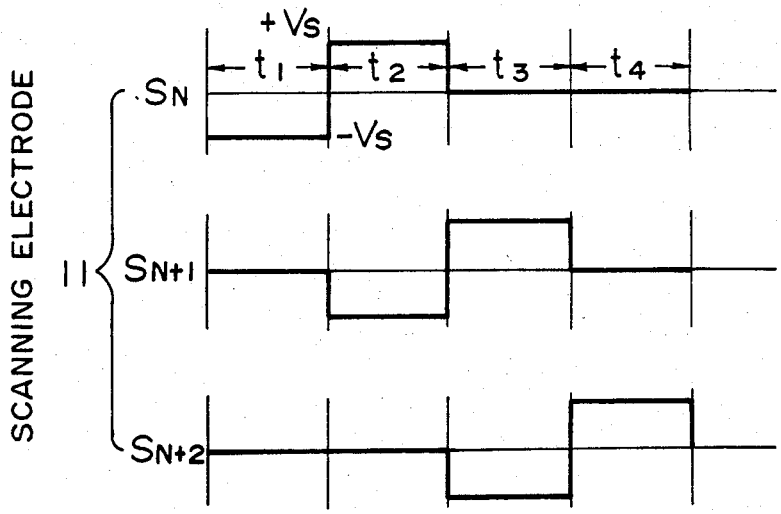
Figure 28B:
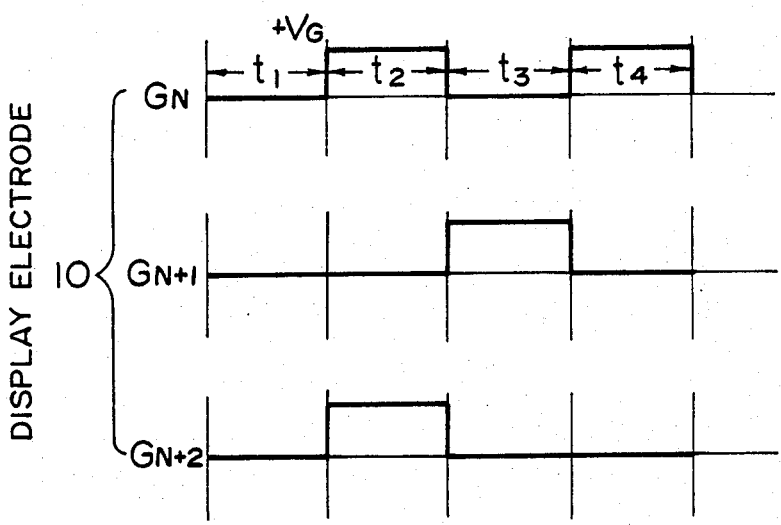

FIGS. 28A and 28B show scanning signals applied to sources or drains of FET and display signals applied to display electrodes connected to gates of FET, respectively, in another embodiment for driving the active matrix circuit shown in FIG. 18. More specifically, FIG. 28A shows scanning signals including an electric signal applied to selected scanning electrode and electric signals applied the other scanning electrodes (nonselected scanning electrodes), respectively, at phases $t_1$, $t_2$.... FIG. 28B shows display signals including electric signals applied to selected display electrodes and nonselected display electrodes, respectively, at phases $t_1$, $t_2$, ...

In FIGS. 28A and 28B, the abscissas represent time and the ordinates represent voltages. For example, when a motion picture is displayed, scanning electrodes 11 are sequentially and periodically selected. The electric signal applied to the selected scanning electrode $S_N$ is $-V_S$ at phase (time) $t_1$ and $+V_S$ at phase (time) $t_2$ as shown in FIG. 28A.

On the other hand, an electric signal of 0 is applied to the other scanning electrodes $S_{N+1}$, $S_{N+2}$ at phase $t_1$ as shown in FIG. 28A. Further, while no display electrode is selected at phase $t_1$, an electric signal of $+V_G$ is applied to the display electrodes $G_N$, $G_{N+2}$ selected and an electric signal of 0 is applied to the display electrode $G_N$ nonselected, respectively, at phase $t_2$. In the above, respective voltages are set to desired values satisfying the following relationships.

In a case where, on a scanning electrode of $m=q$ line, "bright" state is written on a display electrode of $n=1$ and all the picture elements on a scanning electrode of $m=q+1$ are refreshed to form a "dark" state, simultaneously:

$V_C + V_{LC} < V_{Gn}$ (m=q, n=1)

$V_{Sm} - V_P > V_{LC} + V_C$ (n=1)

$V_C - V_{LC} > V_{Gn}$ (m=q+1, n=1 to M)

$V_{Gn} = 0$ (m=q, n≠1) (n=1 to M)

wherein the respective symbols represent the following:
$V_{Sm}$: source or drain electrode (scanning signal) voltage,
$V_{Gn}$: gate electrode (display signal) voltage;
$V_C$: counter electrode (common terminal) voltage;
$V_{LC}$: absolute value of threshold voltage of a ferroelectric liquid crystal; and
$V_P$: gate-source threshold voltage.

The above operations are repeated to effect writing through cycles of q=1 to q=N.

Thus, a display can be effected according to image information signals by using a plurality of picture elements formed by a plurality of picture element electrodes and arranged in a plurality of rows and in a plurality of columns, and by using an operation mode which comprises a first phase wherein a ferroelectric liquid crystal at selected picture elements on a row (q) is brought to the first alignment state and a second phase wherein a ferroelectric liquid crystal at picture elements on the row (q+1) subsequent to the above mentioned row (q) is refreshed to the second stable state, the first and second phases being effected simultaneously and repeated row by row.

A writing operation for the picture elements shown in FIG. 4 by applying such electric signals is illustrated by FIG. 27. A writing pattern in this case is shown in FIG. 19.

Examples of specific preferable values for driving a ferroelectric liquid crystal DOBAMBC in the above explained embodiment are enumerated below:

Input frequency $f_0 = 1 \times 10^4 - 1 \times 10^6$ Hz
$10 < |V_G| < 60$ V (peak value)
$0.3 < |V_S| < 10$ V (peak value).

Figure 29A:
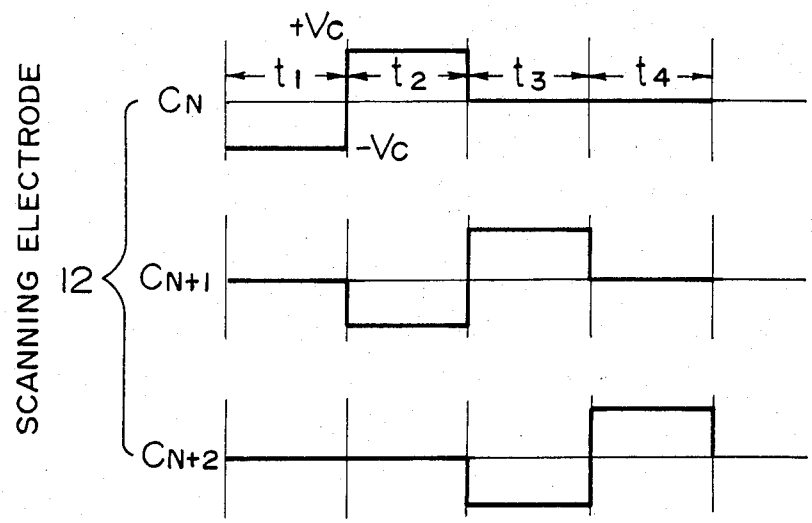
Figure 29B:
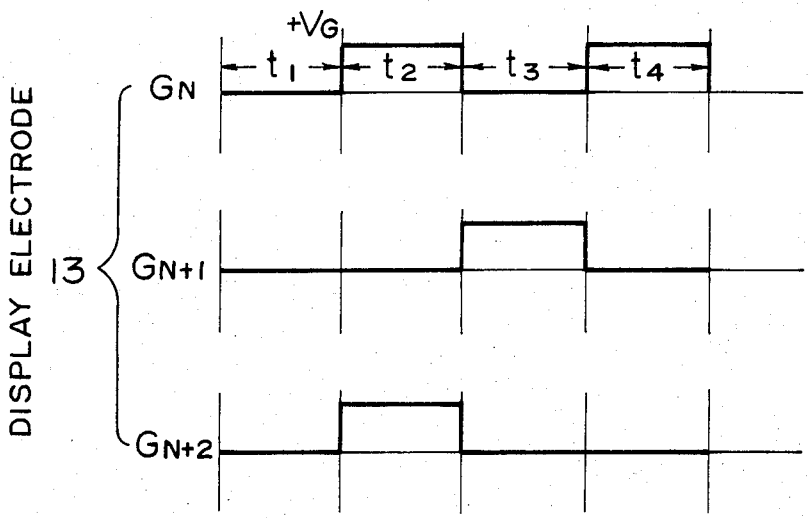

FIG. 29A shows scanning signals including an electric signal applied to selected scanning electrodes (counter electrodes) and electric signals applied to the other scanning electrodes (nonselected scanning electrodes; counter electrodes) in another embodiment using an active matrix circuit shown in FIG. 21. FIG. 29B shows display signals including electric signals applied to selected display electrodes and nonselected display electrodes, respectively, at phases $t_1$, $t_2$, ..., each display electrode being connected to a gate of FET.

In FIGS. 29A and 29B, the abscissas represent time and the ordinates represent voltages. For example, when a motion picture is displayed, scanning electrodes 12 are sequentially and periodically selected. The electric signal applied to the selected scanning electrode is $-V_C$ at "bright" refreshing time and $+V_C$ at "dark" refreshing time as shown in FIG. 29A.

On the other hand, an electric signal of 0 is applied to the other scanning electrodes as shown in FIG. 29A. Further, the electric signal applied to the selected display electrode is 0 or $+V_G$ when $-V_C$ is applied to the scanning electrode and $+V_G$ when $+V_C$ is applied to the scanning electrode. In the above, respective voltages are set to desired values satisfying the following relationships.

In a case where, on a scanning electrode of $m=q$ line, "dark" state is written on a display electrode of $n=1$ and all the picture elements corresponding to display electrodes of n=1 to M (M: number of display lines) are refreshed to form a "bright" state, simultaneously:

$V_S + V_{LC} < V_{Cm}$ (m=q)

$V_{Gn} - V_P < V_{LC} + V_S$ (n=1)

$V_S - V_{LC} > V_{Cm}$ (m=q+1)

$V_{Gn} = 0$ (n=1 to M) (m=q, n≠1)

$V_{Cm} = 0$ (m≠q)

wherein the respective symbols represent the following:
- $V_{Cm}$: counter electrode (scanning signal) voltage,
- $V_{Gn}$: gate electrode (display signal) voltage,
- $C_S$: source or drain voltage;
- $V_{LC}$: absolute value of threshold voltage of a ferroelectric liquid crystal; and
- $V_P$: gate-source threshold voltage.

The above operations are repeated to effect writing through cycles of $q=1$ to $q=N$.

Thus, a display can be effected according to image information signals by using a plurality of picture elements formed by a plurality of picture element electrodes and arranged in a plurality of rows and in a plurality of columns, and by using a time division driving mode which comprises a first phase wherein a ferroelectric liquid crystal at selected picture elements on a row (q) is brought to the first alignment state and a second phase wherein a ferroelectric liquid crystal at picture elements on the row (q+1) subsequent to the above mentioned row (q) is refreshed to the second stable state, the first and second phases being effected simultaneously and repeated row by row.

A writing operation for the picture elements shown in FIG. 4 by applying such electric signals is illustrated by FIG. 27.

Figure 30:
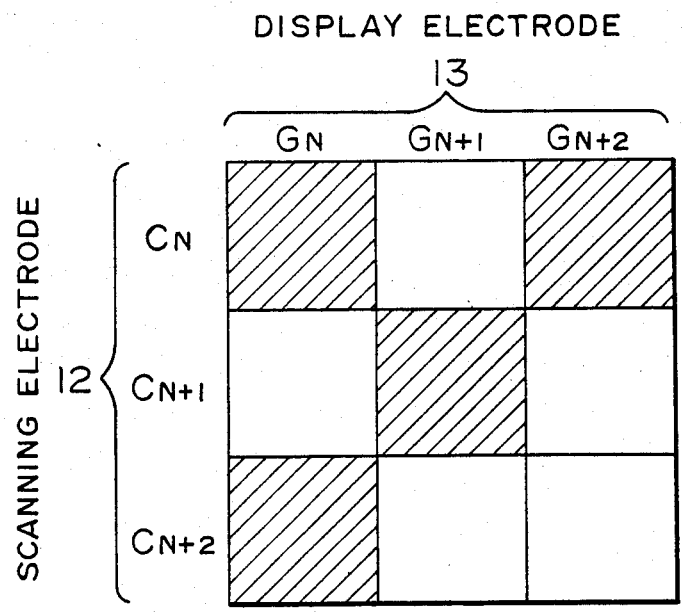

Referring to FIG. 30, among the picture elements formed by intersections of scanning electrodes $C_N$, $C_{N+1}$, $C_{N+2}$, ... and display electrodes $G_N$, $G_{N+1}$, $G_{N+2}$..., it is assumed that the hatched picture elements correspond to the "dark" state and the white picture elements to the "bright" state. With respect to the picture elements on the display electrode $G_n$ in FIG. 30, the picture elements corresponding to the scanning electrodes $C_N$, $C_{N+2}$ are in the dark state and the other picture element are in the bright state. A display pattern of FIG. 30 is completed through the operations at phases 1 to 4 as described above.

Examples of specific preferable values for driving a ferroelectric liquid crystal DOBAMBC in the above explained embodiment are enumerated below:
- Input frequency $f_0 = 1 \times 10^4 - 1 \times 10^6$ Hz
- $10 < |V_G| < 60$ V (peak value)
- $0.3 < |V_S| < 10$ V (peak value).

Figure 31A:
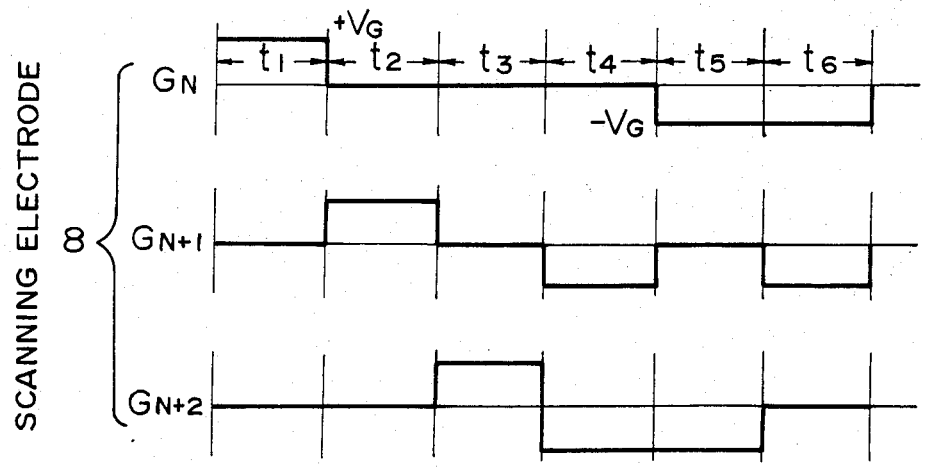
Figure 31B:
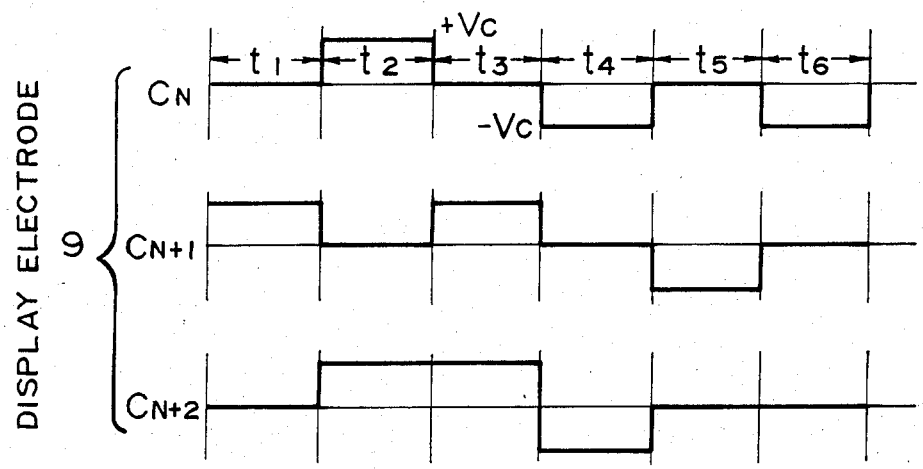

FIGS. 31A and 31B show another example of scanning signals and display signals in an embodiment using the active matrix circuit shown in FIG. 8. In FIGS. 31A and 31B, the abscissas represent time and the ordinates represent voltages. For example, when a motion picture is displayed, scanning electrodes 6 are sequentially and periodically selected. The electric signal applied to the selected scanning electrode is $+V_G$ at phases (time) $t_1$ to $t_3$ and 0 at phases (time) $t_4$ to $t_6$ as shown in FIG. 31A.

On the other hand, an electric signal of $-V_G$ is applied to the other scanning electrodes $G_{N+1}$, $G_{N+2}$ at phases $t_1$ to $t_3$ and $-V_G$ at phases $t_4$ to $t_6$ as shown in FIG. 31A. Further, the electric signal applied to the nonselected display electrodes (counter electrodes) is 0. In the above, respective voltages are set to desired values satisfying the following relationships.

In a case where, on scanning electrodes $m=1$ to N, "bright" state is written successively on a display electrode of $n=1_1$ on the whole picture area and then "dark" state is written successively on a display electrode $n=1_2$ on the whole picture elements:

$$V_{Gm} - V_P > V_{LC} + V_S \quad (m=1 \text{ to } N, n=1_1)$$

$$V_S + V_{LC} < V_{Cn} \quad (n=1_1)$$

$$V_S - V_{LC} > V_{Cn} \quad (m=1 \text{ to } N, n=1_2)$$

$$V_{Gm} = 0 \quad (n=1_2)(n \neq 1_1)$$

$$V_{Gm} - V_P < V_{Cn} \quad (n \neq 1_2)$$

wherein the respective symbols represent the following:
- $V_{Gm}$: gate electrode (scanning signal) voltage;
- $V_{Cn}$: counter electrode (display signal) voltage;
- $V_S$: source or drain voltage;
- $V_{LC}$: absolute value of threshold voltage of a ferroelectric liquid crystal; and
- $V_P$: gate-source threshold voltage.

The above operations are repeated to effect writing through cycles of $q=1$ to $q=N$.

Thus, a display can be effected according to image information signals by using a plurality of picture elements formed by a plurality of picture element electrodes and arranged in a plurality of rows and in a plurality of columns, and by using a time division driving mode which comprises a first step wherein a selected first group of picture elements are successively brought to a display state based on the first orientation state of a ferroelectric liquid crystal at a predetermined picture area and a second step wherein a selected second group of picture elements are successively brought to a display state based on the second orientation state of a ferroelectric liquid crystal at the predetermined picture area, the first and the second steps being effected row by row.

Figure 33:
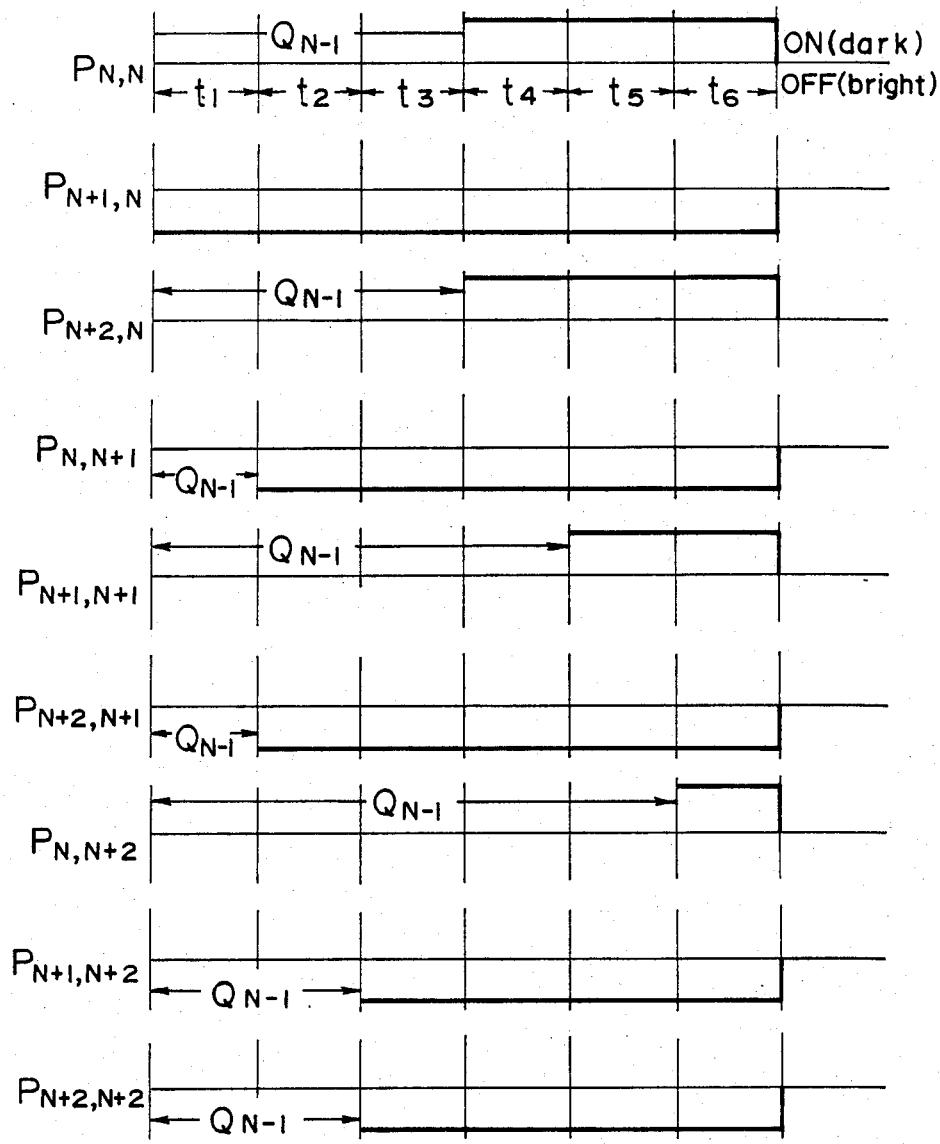

A writing operation for the picture elements shown in FIG. 14 by applying such electric signals is illustrated by FIG. 33. In FIG. 33, the respective abscissas represent time and the ordinates the display states of ON (dark) on the upper sides and OFF (bright) on the lower sides. As is apparent from FIGS. 31 and 33, a voltage $V_C - V_S (> V_{LC})$ exceeding the threshold voltage $V_{LC}$ is applied to a picture element $P_{N+1,N}$ at the intersection of a selected scanning line and a selected display line at phase $t_1$. Thus, "bright" is written at the picture element $P_{N+1,N}$ in FIG. 4. After that, at phases $t_2$ and $t_3$, "bright" is sequentially written in the picture elements $P_{N,N+1}$, $P_{N+2,N+1}$, $P_{N+1,N+2}$, $P_{N+2,N+2}$ respectively at the intersections of selected scanning lines and display lines. After "bright" is written in the picture elements on the whole picture at phases $t_1$ to $t_3$, "dark" is written on the whole picture area at phases $t_4$ to $t_6$. Thus, at phase $t_4$, a voltage of $-V_C - V_S 8 < -V_{LC}$) exceeding the threshold voltage 31 $V_{LC}$ is applied to picture elements $P_{N,N}$, $P_{N+2,N}$ on a selected scanning line. Thus, "dark" is written in the picture elements $P_{N,N}$, $P_{N+2,N}$ in FIG. 4. After that, at phases $t_5$ and $t_6$, "dark" is written in picture elements $P_{N+1,N+1}$, $P_{N,N+2}$ on selected scanning lines. As will be understood from the operations described above, depending on whether a display electrode is selected or not on a selected scanning electrode, liquid crystal molecules are oriented to the first orientation state or the second orientation state to form a picture element of ON (bright) or OFF state when the display electrode is selected. On the other hand, when not selected, none of the voltages applied to all the picture elements exceeds the threshold voltages. As a result, liquid crystal molecules in the respective picture elements other than those on the selected scanning lines do not change their orientation states but retain their orientation states obtained corresponding to the signal state ($Q_{N-1}$) in the previous scanning step. Namely, when a certain scanning electrode line is selected, signals corresponding to the line are written. During a time interval from a time at which writing of signals corresponding to one frame is completed to a time at which the scanning line is selected next after one frame is completed, the signal state of each picture element is maintained. As a result, even if the number of scanning electrode lines is increased, the duty ratio does not substantially change, thus resulting in no decrease in contrast.

Figure 32:
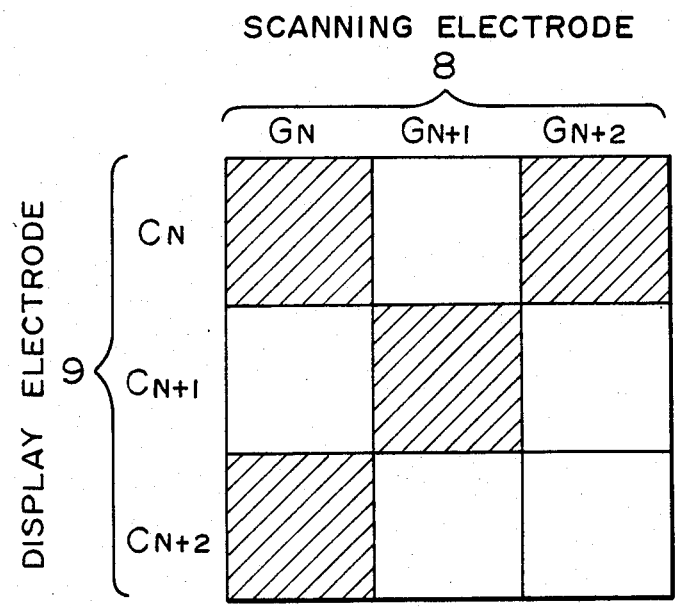

Referring to FIG. 32, among the picture elements formed by intersections of scanning electrodes $G_N$, $G_{N+1}$, $G_{N+2}$, ... and display electrodes $C_N$, $C_{N+1}$, $C_{N+2}$, ..., it is assumed that the hatched picture elements correspond to the "dark" state and the white picture elements to the "bright" state. With respect to the picture elements on the display electrode $C_N$ in FIG. 32, the picture elements corresponding to the scanning electrodes $G_N$, $G_{N+2}$ are in the dark state and the other picture element are in the bright state. A display state shown in FIG. 32 is completed through the operations at phases $t_1-t_6$.

Incidentally, waveforms of voltage signals shown in FIG. 31 all have 3 levels including those of the scanning signals and display signals. However, both scanning signals and driving signals may be those having 2 levels of voltages for driving by setting the voltage of the counter electrode used as a common electrode at the ground level for writing the first display state and at $+V_S$ for writing the second display level.

Figure 34:
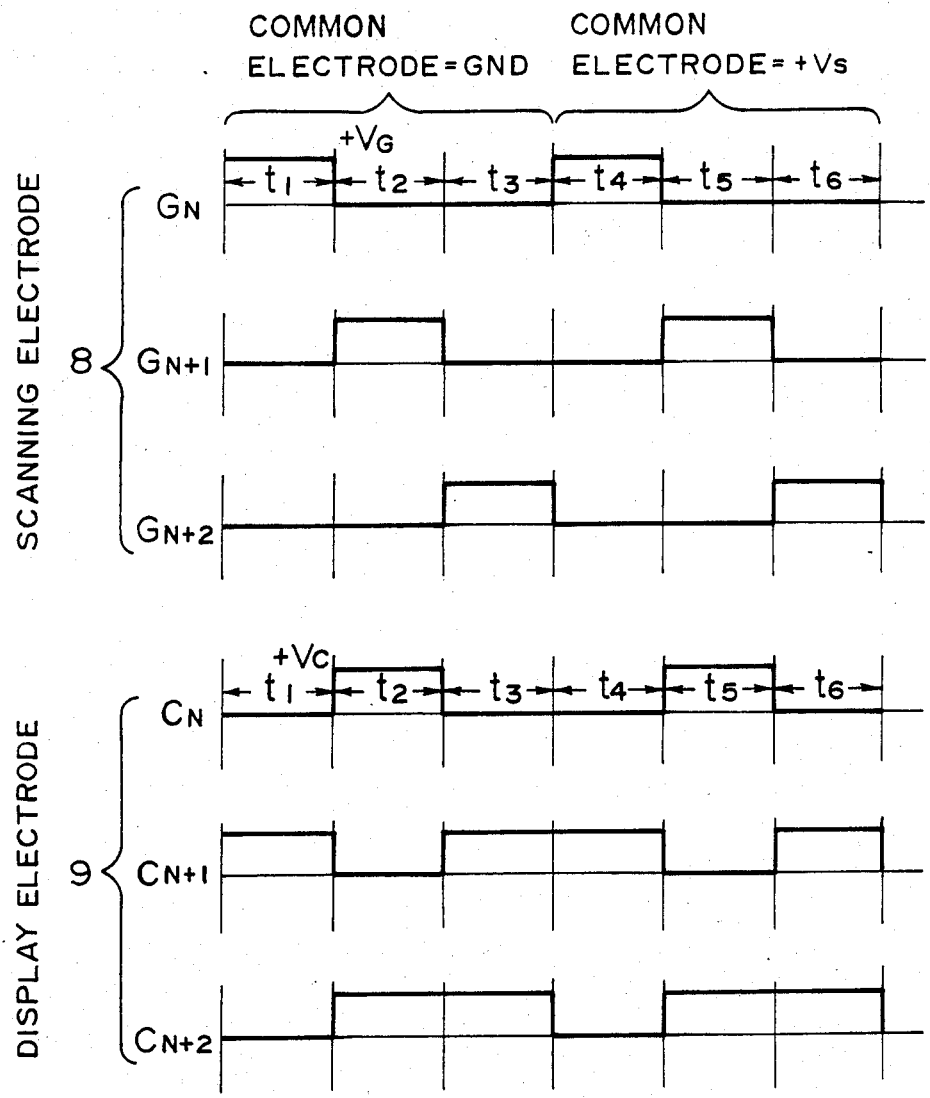

An example of driving waveforms having two levels of voltages is explained in FIG. 34.

Examples of specific preferable values for driving a ferroelectric liquid crystal DOBAMBC in the above explained embodiment are enumerated below:

Input frequency $f_0 = 1 \times 10^4 - 1 \times 10^6$ Hz
$10 < |V_G| < 60$ V (peak value)
$0.3 < |V_S| < 10$ V (peak value).

Figure 35A:
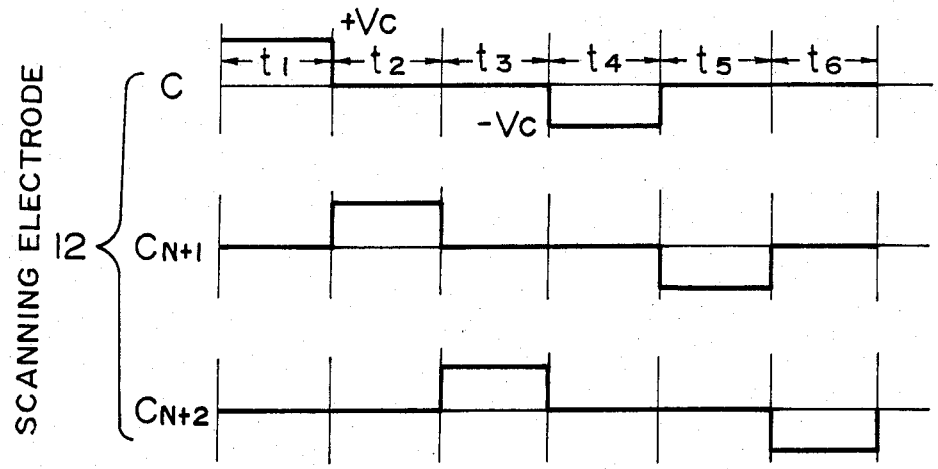
Figure 35B:
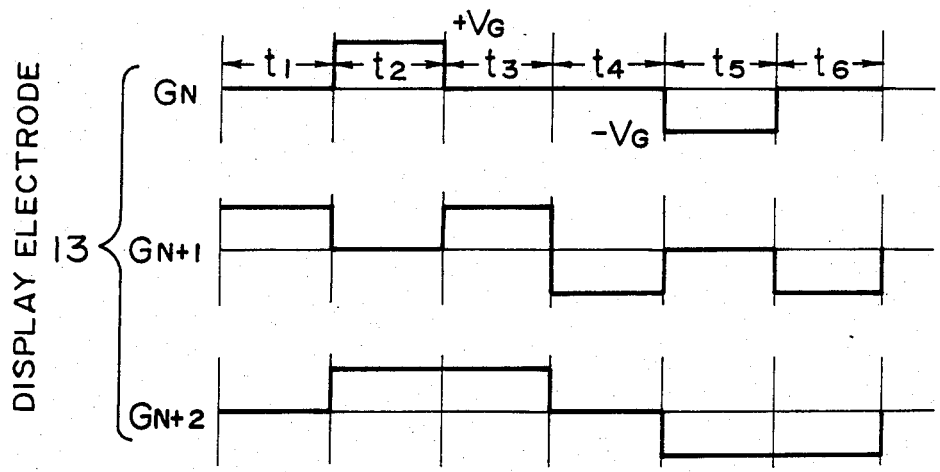

FIGS. 35A and 35B show another example of scanning signals and display signals in an embodiment using an active matrix circuit shown in FIG. 21. In FIGS. 35A and 35B, the abscissas represent time and the ordinates represent voltages. For example, when a motion picture is displayed, scanning electrodes 12 formed of counter electrodes are sequentially and periodically selected. The electric signal applied to the selected scanning electrode is $+V_G$ at phases (time) $t_1$ to $t_3$ and $-V_G$ at phases (time) $t_4$ to $t_6$ as shown in FIG. 35A.

On the other hand, an electric signal of 0 is applied at phases $t_1-t_3$ and $-V_C$ at phases $t_4-t_6$ respectively to the other nonselected scanning electrodes as shown in FIG. 35A. Further, the electric signal applied to the selected display electrode connected to gates of FET is $+V_G$ at phases $t_1-t_3$ and 0 at phases $t_4-t_6$. Further, an electric signal of $-V_G$ is applied to the nonselected display electrodes connected to gates of FET. In the above, respective voltages are set to desired values satisfying the following relationships.

In a case where, on scanning electrodes $m = 1$ to N, "bright" state is written successively on a display line of $n = 1_1$ on the whole picture area and then "dark" state is written successively on a display electrode $n = 1_2$ on the whole picture area:

$V_{Gn} - V_P > V_{LC} + V_S$  ($m = 1$ to N, $n = 1_1$)

$V_S + V_{LC} < V_{Cm}$  ($n = 1_1$)

$V_S - V_{LC} > V_{Cm}$  ($m = 1$ to N, $n = 1_2$)

$V_{Gn} = 0$  ($n = 1_1$, $n \neq 1_1$)

$V_{Gn} - V_P < V_{Cm}$  ($n \neq 1_2$)

wherein the respective symbols represent the following:
 $V_{Cm}$: counter electrode (scanning signal) voltage,
 $V_{Gn}$: gate electrode (display signal) voltage,
 $V_S$: source or drain electrode (common terminal) voltage,
 $V_{LC}$: absolute value of threshold voltage of a ferroelectric liquid crystal, and
 $V_P$: gate-source threshold voltage.

The above operations are repeated to effect writing through cycles of $q = 1$ to $q = N$.

Thus, a display can be effected according to image information signals by using a plurality of picture elements formed by a plurality of picture element electrodes and arranged in a plurality of rows and in a plurality of columns, and by using a time division driving mode which comprises a first step wherein a selected first group of picture elements are successively brought to a display state based on the first orientation state of a ferroelectric liquid crystal at a predetermined picture area and a second step wherein a selected second group of picture elements are successively brought to a display state based on the second orientation state of a ferroelectric liquid crystal at the predetermined picture area, the first and the second steps being effected row by row.

A writing operation for the picture elements shown in FIG. 4 by applying such electric signals is illustrated by FIG. 33.

Figure 36:
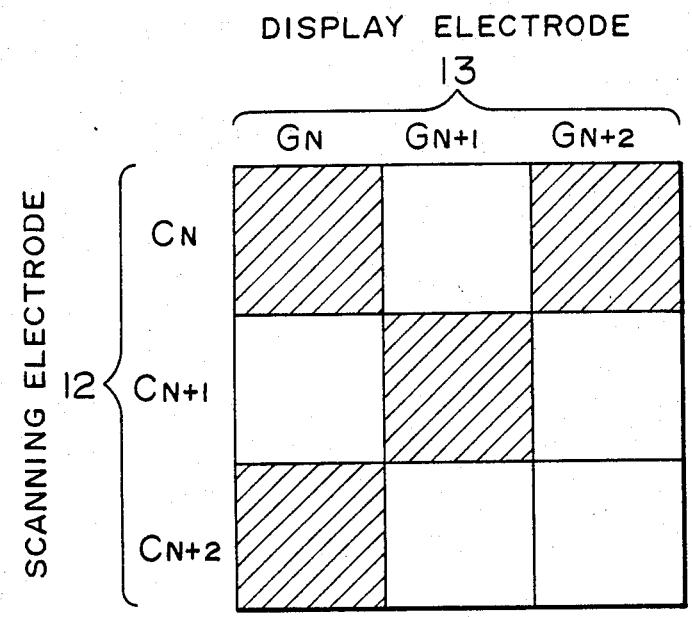

Referring to FIG. 36, among the picture elements formed by intersections of scanning electrodes $C_N$, $C_{N+1}$, $C_{N+2}$, ... and display electrodes $G_N$, $G_{N+1}$, $G_{N+2}$, ..., it is assumed that the hatched picture elements correspond to the "dark" state and the white picture elements to the "bright" state. With respect to the picture elements on the display electrode $G_N$ in FIG. 36, the picture elements corresponding to the scanning electrodes $C_N$, $C_{N+2}$ are in the dark state and the other picture element is in the bright state. A picture element shown in FIG. 36 is formed through the operations at phases $t_1-t_6$.

Incidentally, waveforms of voltage signals shown in FIG. 35 all have 3 levels including those of the scanning signals and display signals. However, both scanning signals and driving signals may be those having 2 levels of voltages for driving by setting the voltage of the counter electrode used as a common electrode at the ground level for writing the first display state and at $+V_S$ for writing the second display level.

Figure 37:
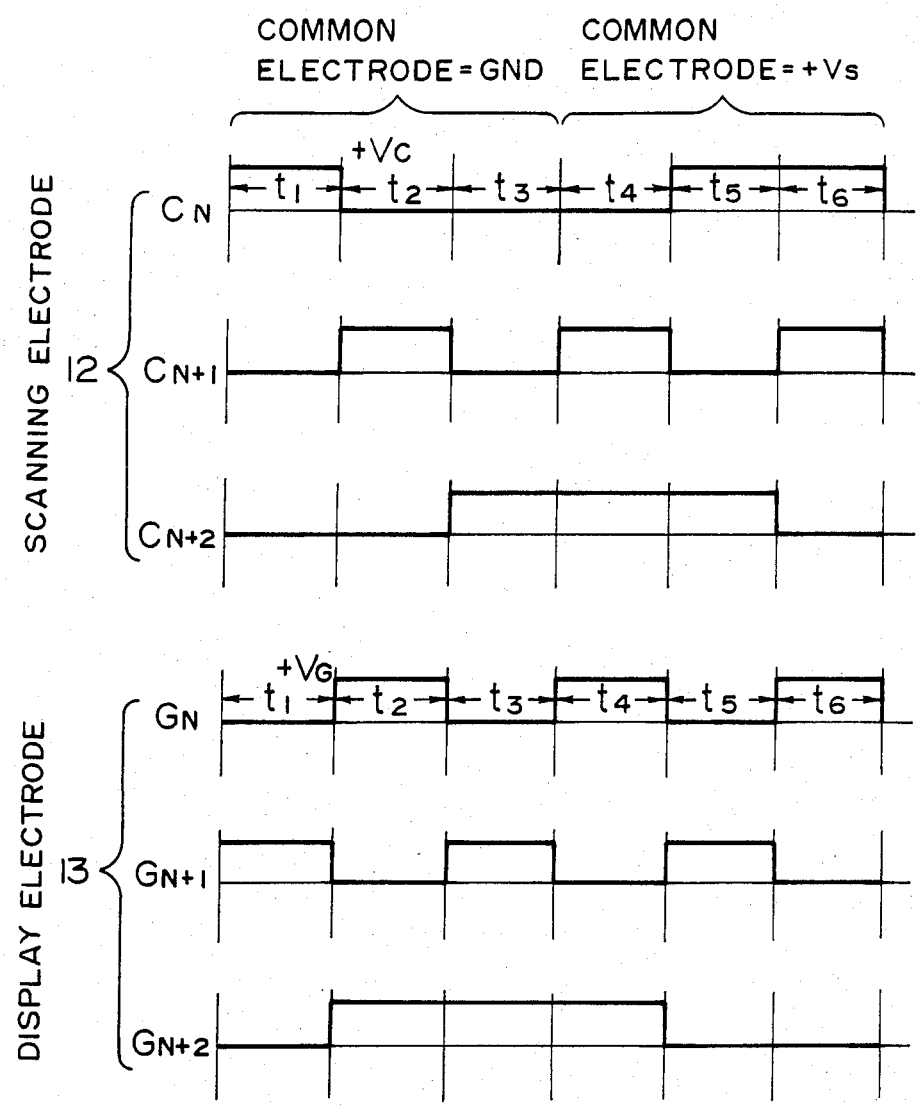

An example of driving waveforms having two levels of voltages is explained in FIG. 37.

Examples of specific preferable values for driving a ferroelectric liquid crystal DOBAMBC in the above explained embodiment are enumerated below:

Input frequency $f_0 = 1 \times 10^4 - 1 \times 10^6$ Hz
$10 < |V_G| < 60$ V (peak value)
$0.3 < |V_S| < 10$ V (peak value).

Figure 38A:
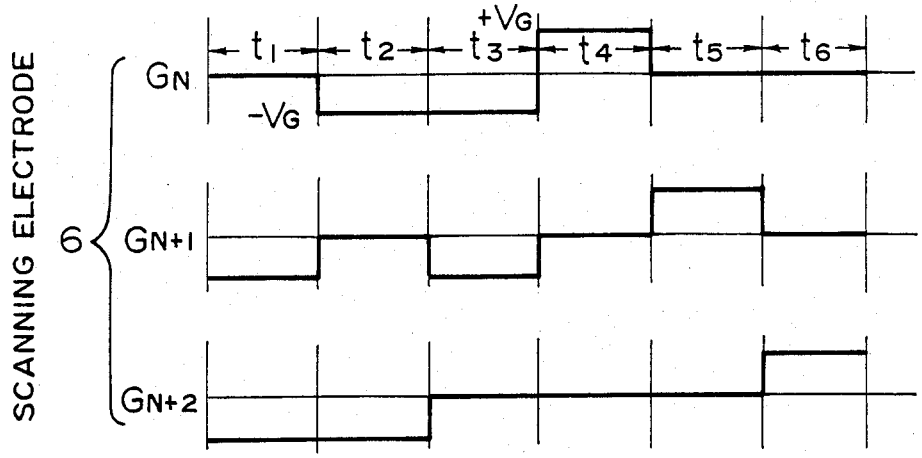
Figure 38B:
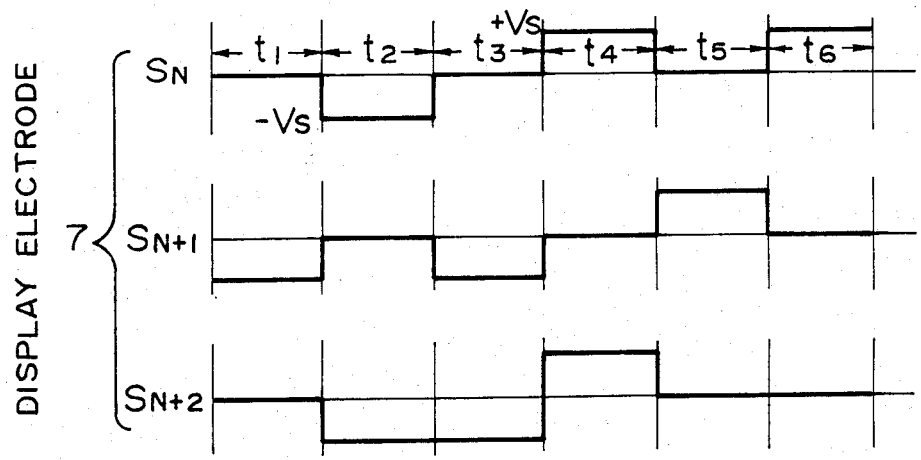

FIGS. 38A and 38B show another example of scanning signals and display signals in an embodiment using an active matrix circuit shown in FIG. 3. In FIGS. 38A and 38B, the abscissas represent time and the ordinates represent voltages. For example, when a motion picture is displayed, scanning electrodes 6 connected to gates of FET are sequentially and periodically selected. The electric signal applied to the selected scanning electrode is $V_G=0$ at phases (time) $t_1$ to $t_3$ and $+V_G$ at phases (time) $t_4$ to $t_6$ as shown in FIG. 38A.

On the other hand, an electric signal of $-V_G$ is applied at phases $t_1-t_3$ and an electric signal of 0 at phases $t_4-t_6$, respectively, to the other scanning electrodes as shown in FIG. 38A. Further, the electric signal applied to selected display electrodes connected to sources or drains of FET is $-V_S$ at phases $t_1-t_3$ and $+V_S$ at phases $t_4-t_6$. Further, an electric signal of 0 is applied to nonselected display electrodes connected to sources or drains of FET. In the above, respective voltages are set to desired values satisfying the following relationships.

In a case where, on scanning electrodes $m=1$ to N, "bright" state is written successively on a display electrode of $n=1_1$ line on the whole picture area and "dark" state is written successively on a display electrode $n=1_2$ line on the whole picture area:

$V_{Gm}=0 \quad (m=1 \text{ to } N, n=1_1)$ $V_C-V_{LC}>V_{Sn} \quad (n=1_1)$ $C_{Gm}-V_P>V_{LC}+V_C \quad (m=1 \text{ to } N, n=1_2)$ $V_C+V_{LC}<V_{Sn} \quad (n=1_2)$ $V_{Sn}=0 \quad (n\neq1_1, n\neq1_2)$ wherein the respective symbols represent the following:
$V_{Gm}$: gate electrode (scanning signal) voltage,
$V_{Sn}$: source or drain electrode (display signal) voltage,
$V_C$: counter electrode (common terminal) voltage,
$V_{LC}$: absolute value of threshold voltage of a ferroelectric liquid crystal, and
$V_P$: gate-source threshold voltage.

The above operations are repeated to effect writing through cycles of $q=1$ to $q=N$.

Thus, a display can be effected according to image information signals by using a plurality of picture elements formed by a plurality of picture element electrodes and arranged in a plurality of rows and in a plurality of columns, and by using a time division driving mode which comprises a first step wherein a selected first group of picture elements are successively brought to a display state based on the first orientation state of a ferroelectric liquid crystal at a predetermined picture area and a second step wherein a selected second group of picture elements are successively brought to a display state based on the second orientation state of a ferroelectric liquid crystal at the predetermined picture area, the first and the second steps being effected row by row.

A writing operation for the picture elements shown in FIG. 4 by applying such electric signals is illustrated by FIG. 33.

Examples of specific preferable values for driving a ferroelectric liquid crystal DOBAMBC in the above explained embodiment are enumerated below:
Input frequency $f_0=1\times10^4-1\times10^6$ Hz
$10<|V_G|<60$ V (peak value)
$0.3<|V_S|<10$ V (peak value).

Figure 39A:
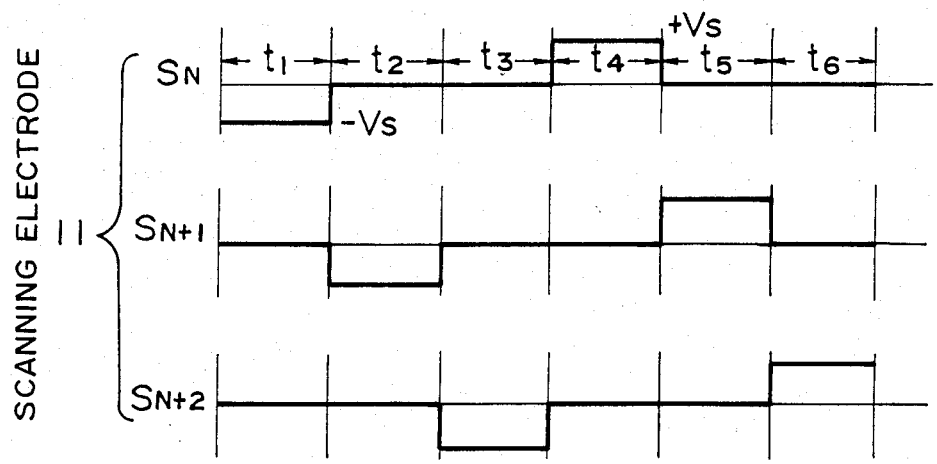
Figure 39B:
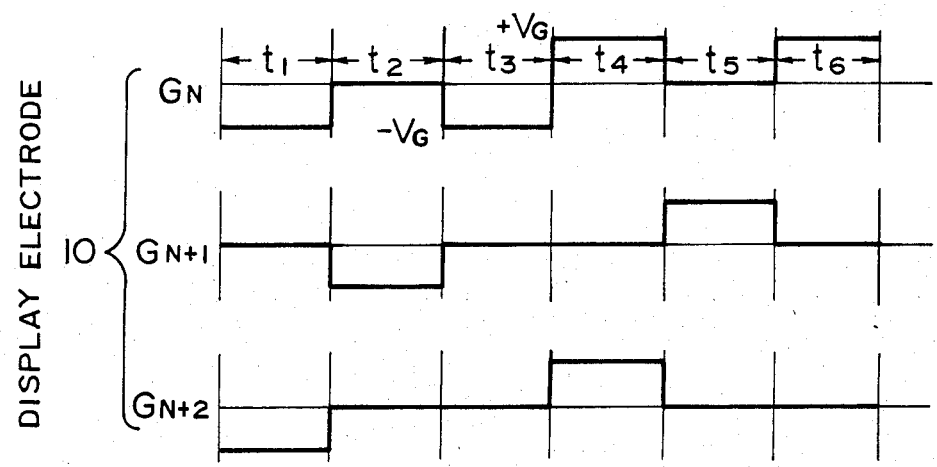

FIGS. 39A and 39B show other examples of scanning signals and display signals in an embodiment using an active matrix circuit shown in FIG. 18. In FIGS. 39A and 39B, the abscissas represent time and the ordinates represent voltages. For example, when a motion picture is displayed, scanning electrodes 11 connected to sources or drains of FET are sequentially and periodically selected. The electric signal applied to the selected scanning electrode is $-V_S$ at phases (time) $t_1$ to $t_3$ and $+V_S$ at phases (time) $t_4$ to $t_6$ as shown in FIG. 39A.

On the other hand, an electric signal of $-V_G$ is applied to the other nonselected scanning electrodes is 0 at phases $t_1-t_6$ as shown in FIG. 39A. Further, the electric signal applied to the selected display electrodes connected to sources or drains of FET is 0 at phases $t_1-t_3$ and $+V_G$ at phases $t_4-t_6$. Further, the electric signal applied to the nonselected display electrode connected to gates of FET is $-V_G$ at phases $t_1$ to $t_3$ and 0 at phases $t_4$ to $t_6$. In the above, respective voltages are set to desired values satisfying the following relationships.

In a case where, on scanning electrodes $m=1$ to N, "bright" state is written successively on a display electrode of $n=1_1$ line on the whole picture are and "dark" state is written successively on a display electrode $n=1_2$ line on the whole picture area:

$V_C-V_{LC}>V_{Sm} \quad (m=1 \text{ to } N, n=1_1)$ $V_{Gn}=0 \quad (n=1_1, n\neq1_2)$ $V_{Gn}-V_P>V_{LC}+V_C \quad (m=1 \text{ to } N, n=1_2)$ $V_C+V_{LC}<V_{Sm} \quad (n=1_2)$ $V_{Gn}-V_P<V_{Cm} \quad (n\neq1_1)$ wherein the respective symbols represent the following:
$V_{Sm}$: source or drain electrode (scanning signal) voltage,
$V_{Gn}$: gate electrode (display signal) voltage,
$V_C$: counter electrode voltage,
$V_{LC}$: absolute value of threshold voltage of a ferroelectric liquid crystal, and
$V_P$: gate-source threshold voltage.

The above operations are repeated to effect writibg through cycles of $q=1$ to $q=N$.

Thus, a display can be effected according to image information signals by using a plurality of picture elements formed by a plurality of picture element electrodes and arranged in a plurality of rows and in a plurality of columns, and by using a time division driving mode which comprises a first step wherein a selected group of picture elements are successively brought to a display state based on the first orientation state of a ferroelectric liquid crystal at a predetermined picture area and a second step wherein a selected second group of picture elements are successively brought to a display state based on the second orientation state of a ferroelectric liquid crystal at the predetermined picture area, the first and the second steps being effected row by row.

A writing operation for the picture elements shown in FIG. 4 by applying such electric signals is illustrated by FIG. 33.

Figure 40:
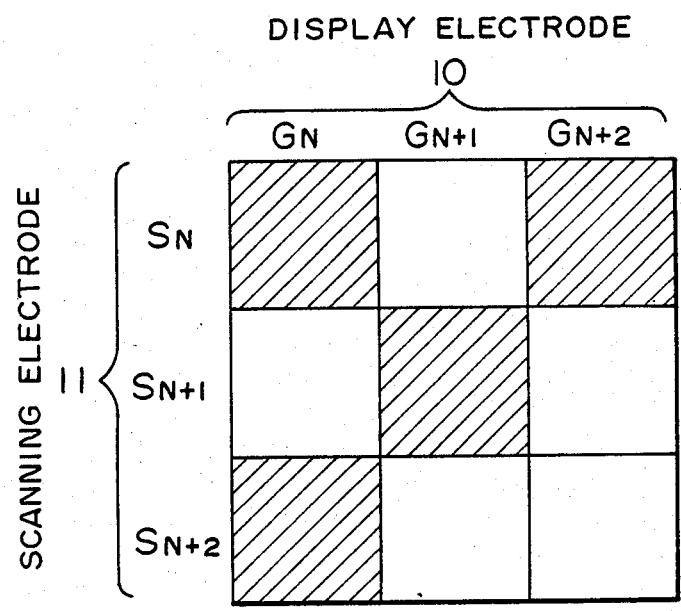

Referring to FIG. 40, among the picture elements formed by intersections of scanning electrodes $S_N$, $S_{N+1}$, $S_{N+2}$, ... and display electrodes $G_N$, $G_{N+1}$, $G_{N+2}$, ..., it is assumed that the hatched picture elements correspond to the "dark" state and the white picture elements to the "bright" state. With respect to the picture elements on the display electrode $G_N$ in FIG. 40, the picture elements corresponding to the scanning electrodes $S_N$, $S_{N+2}$ are in the bright state and the other picture element is in the bright state. A display pattern shown in FIG. 40 is completed, through the operations at phases $t_1-t_6$.

Incidentally, waveforms of voltage signals shown in FIG. 39 all have 3 levels including those of the scanning signals and display signals. However, both scanning levels and driving signals may be those having 2 levels of voltages for driving by setting the voltage of the counter electrodes used as a common electrode at the ground level for writing the first display state and at $-V_S$ for writing the second display level.

Figure 41:
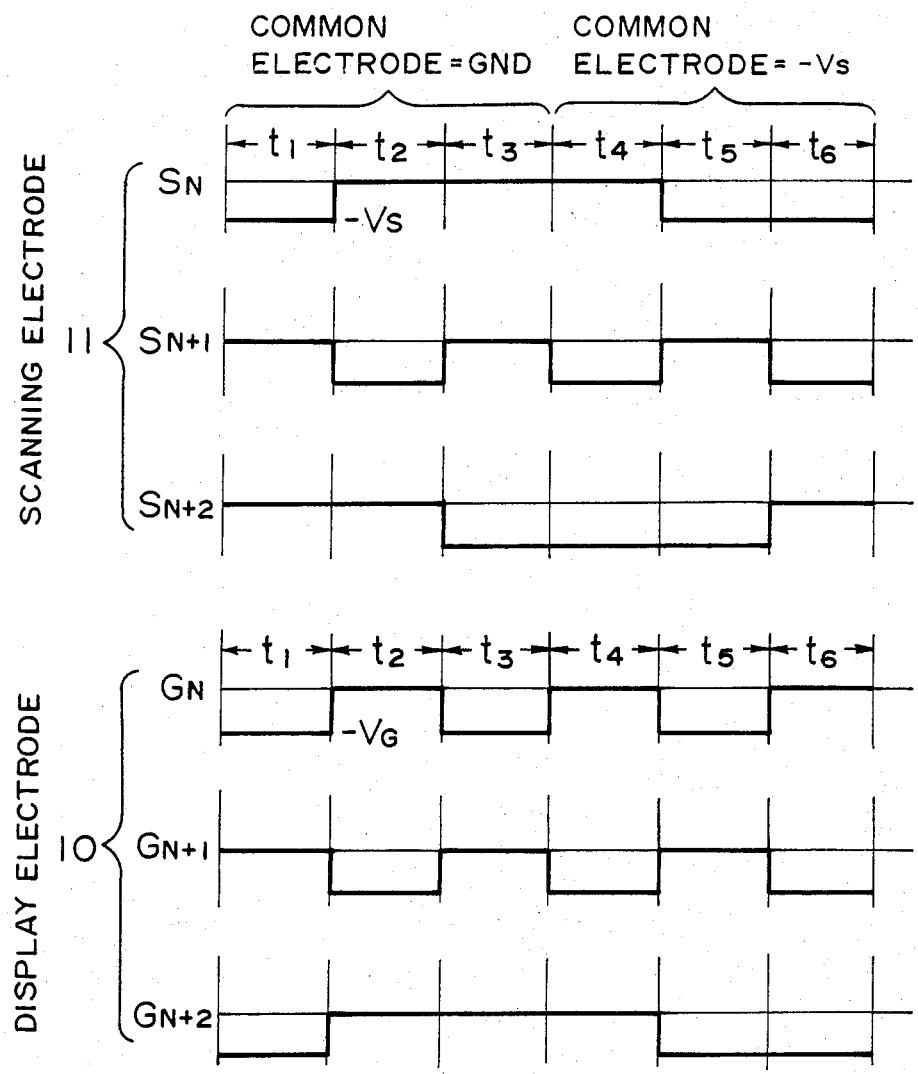

An example of driving waveforms having two levels of voltages is explained in FIG. 41.

Examples of specific preferable values for driving a ferroelectric liquid crystal DOBAMBC in the above explained embodiment are enumerated below:

Input frequency $f_0 = 1 \times 10^4 - 1 \times 10^6$ Hz
$10 < |V_G| < 60$ V (peak value)
$0.3 < |V_S| < 10$ V (peak value).

Figure 42A:
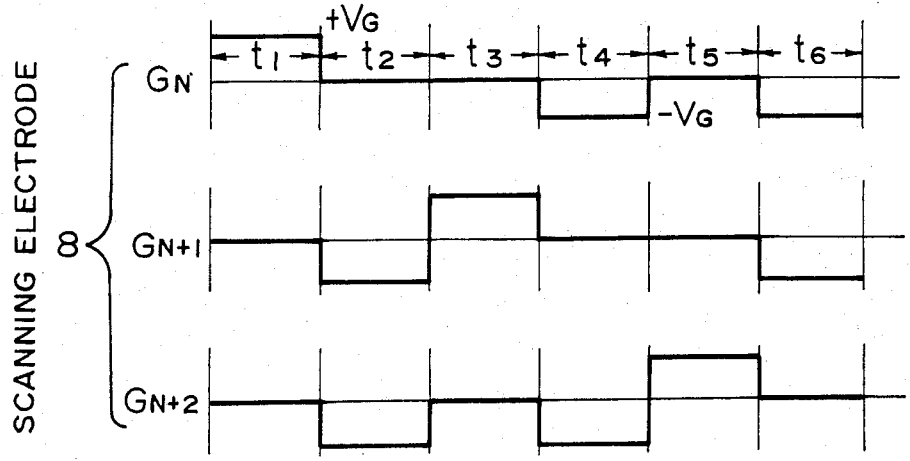
Figure 42B:
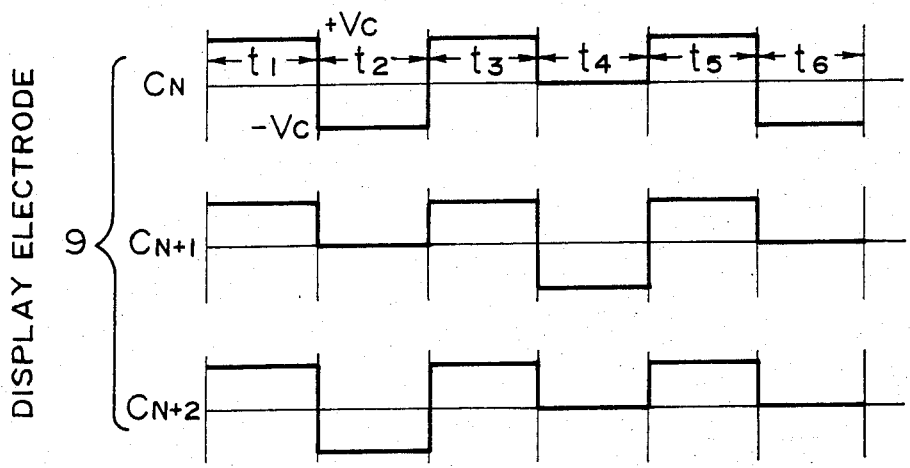

FIGS. 42A and 42B show another example of scanning signals and display signals in an embodiment using an active matrix circuit shown in FIG. 8. FIG. 42A shows electric signals applied to selected scanning electrodes and to the other scanning electrodes (nonselected scanning electrodes), respectively connected to gates of FET, at phases $t_1, t_2, \ldots$ FIG. 42B shows display signals including electric signals applied to selected display electrodes (counter electrodes) and electric signals applied to nonselected display electrodes (counter electrodes), respectively, at phases $t_1, t_2 \ldots$ In FIGS. 42A and 42B, the abscissas represent time and the ordinates represent voltages. For example, when a motion picture is displayed, scanning electrodes 8 are especially and periodically selected. The electric signal applied to the selected scanning electrode $G_N$ is $+V_G$ at phase (time) $t_1$ and 0 at phase (time) $t_2$ as shown in FIG. 42A.

On the other hand, an electric signal of 0 is applied at phase $t_1$ and $-V_G$ at phase $t_2$, respectively, to the other scanning electrodes $G_{N+1}$, $G_{N+2}$ as shown in FIG. 42A. Further, the electric signal applied to the selected display electrodes C, $C_{N+1}$, $C_{N+2}$ is $+V_C$ at phase $t_1$ and an electric signal of $-V_C$ is applied to the selected display electrodes $C_N$, $C_{N+2}$ at phase $t_2$. On the other hand, an electric signal of 0 is applied to the display electrode $C_{N+1}$ not selected at phase $t_2$. In the above, respective voltages are set to desired values satisfying the following relationships.

In a case where, on a scanning electrode of $m=q$ line, display electrodes of $n=1$ to M are refreshed to form "bright" and then "dark" is written on a display electrode $n=1$:

$V_{Gm} - V_P > V_{LC} + V_S$    (m=q, n=1 to M)

$V_S + V_{LC} < V_{Cn}$    (m=q, n=1 to M) m=q, n≠1)

$V_{Gm} = 0$    (m=q, n=1)

$V_S - V_{LC} > V_{Cn}$    (n=1)

$V_{Gm} - V_P < V_{Cn}$    (m≠q)

wherein the respective symbols represent the following:
$C_{Gm}$: gate electrode (scanning signal) voltage,
$V_{Cn}$: counter electrode (display signal) voltage,
$V_S$: source or drain electrode (counter terminal) voltage,
$V_{LC}$: absolute value of threshold voltage of a ferroelectric liquid crystal, and
$V_P$: gate-source threshold voltage.

The above operations are repeated to effect writing through cycles of $q=1$ to $q=N$.

Thus, a display can be effected according to image information signals by using a plurality of picture elements formed by a plurality of picture element electrodes and arranged in a plurality of rows and in a plurality of columns, and by using a time division driving mode which comprises a first phase wherein a selected first group of picture elements are refreshed to a display state based on the first orientation state of a ferroelectric liquid crystal and a second phase wherein a selected picture element among the refreshed picture elements is brought to a display state based on the second orientation state of the ferroelectric liquid crystal, the first and second phase being effected row by row.

Figure 43:
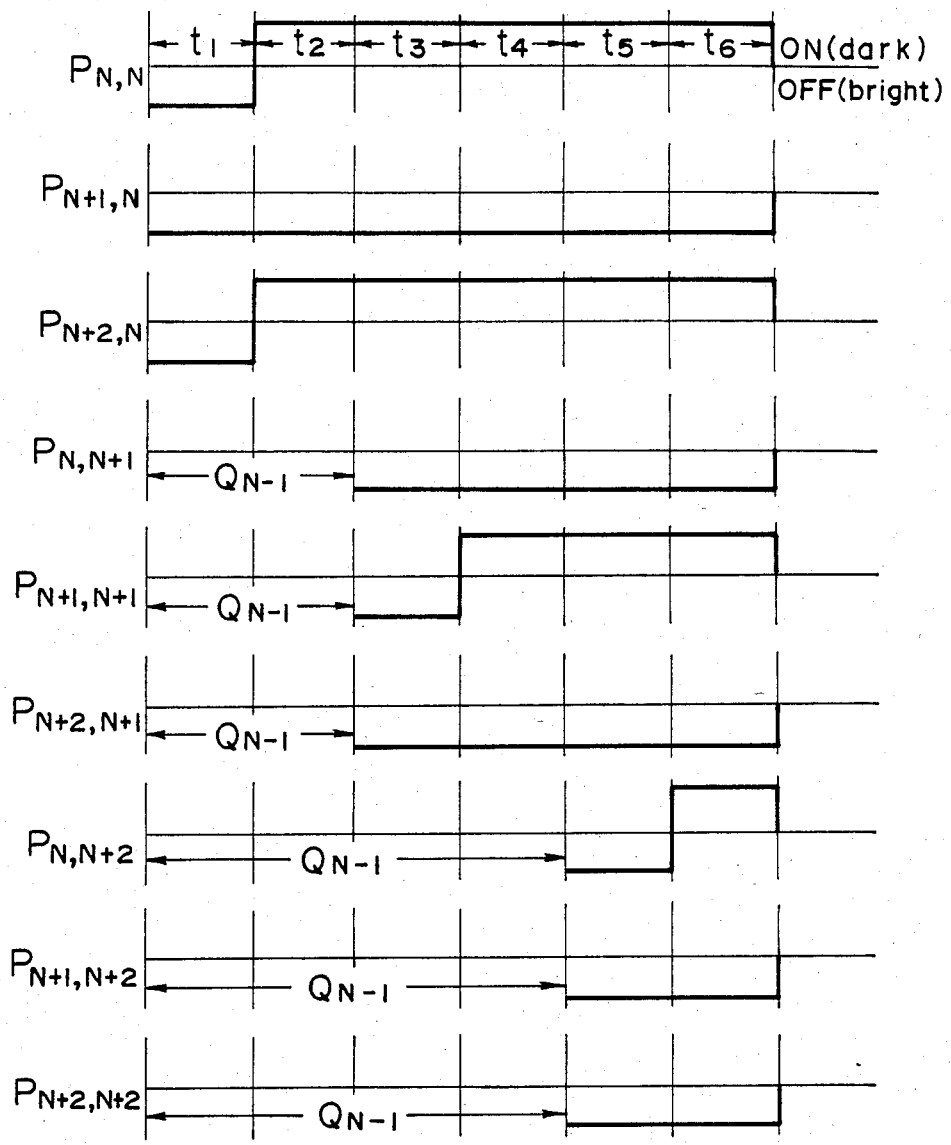

A writing operation for the picture elements shown in FIG. 4 by applying such electric signals is illustrated by FIG. 43. In FIG. 27, the respective abscissas represent time and the ordinates indicate the display states of ON (bright) on the upper sides and OFF (dark) on the lower sides. As apparent from FIGS. 42 and 43, a voltage $V_C - V_S$ ($> V_{LC}$) exceeding the threshold voltage $V_{LC}$ is applied to picture elements $P_{N,N}$, $P_{N+1,N}$, $P_{N+2,N}$ at the intersections of selected scanning line and display lines at phase $t_1$ whereby the picture elements are refreshed to "bright". Then, at phase $t_2$, a voltage $-V_C - V_S$ ($< -V_{LC}$) exceeding the threshold voltage $-V_{LC}$ is applied to picture elements $P_{N,N}$, $P_{N+2,N}$ at intersections of a selected scanning line and selected display lines, whereby the picture elements $P_{N,N}$, $P_{N+2,N}$ are switched to "dark". At phases $t_3$ and thereafter, likewise at phases $t_1$ and $t_2$, all the picture elements on a selected scanning line is first refreshed to "bright" and then "dark" is written in selected picture elements on the same scanning line. As will be understood from the above operation, depending on whether a display electrode is selected or not on a selected scanning electrode line, liquid crystal molecules on the display electrode when it is selected are oriented to the first or second orientation state to give a picture element of ON (dark) or OFF (bright) state. On the nonselected scanning lines, voltages applied to all the picture elements do not exceed the threshold voltages. As a result, liquid crystal molecules at the respective picture elements on the nonselected scanning lines do not change their orientation states but retain their orientation states obtained corresponding to the signal state ($Q_{N-1}$) in the previous scanning step. Namely, when a certain scanning electrode line is selected, signals corresponding to the line are written. During a time interval for a time at which writing of signals corresponding to one frame is completed at a time at which the scanning line is selected next after one frame is completed, the signal state of each picture element is maintained. As a result, even if the number of scanning electrode lines is increased, the duty ratio does not substantially change, thus resulting in no decrease in contrast.

Thus, a display pattern as shown in FIG. 32, for example, can be completed through the operations at phases $t_1-t_6$.

Examples of specific preferable values for driving a ferroelectric liquid crystal DOBAMBC in the above explained embodiment are enumerated below:

Input frequency $F_0 = 1 \times 10^4 - 1 \times 10^6$ Hz
$10 < |V_G| < 60$ V (peak value)

$0.3 < |V_S| < 10$ V (peak value).

Figure 44A:
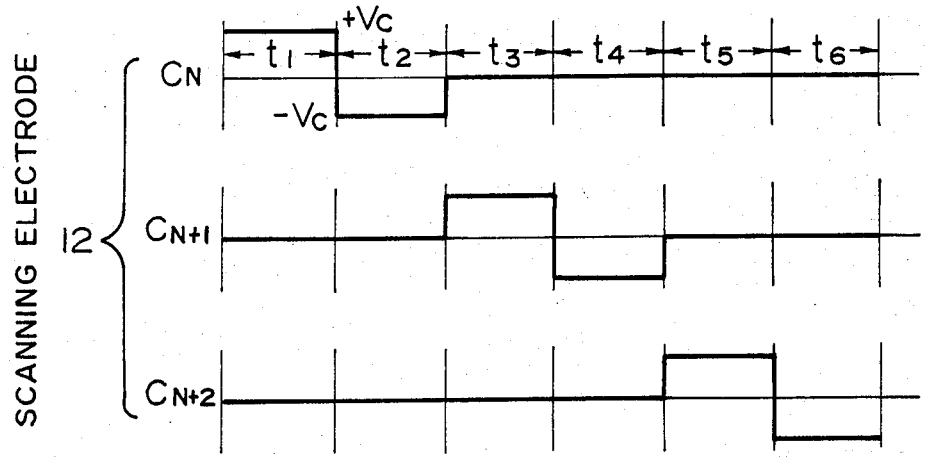
Figure 44B:
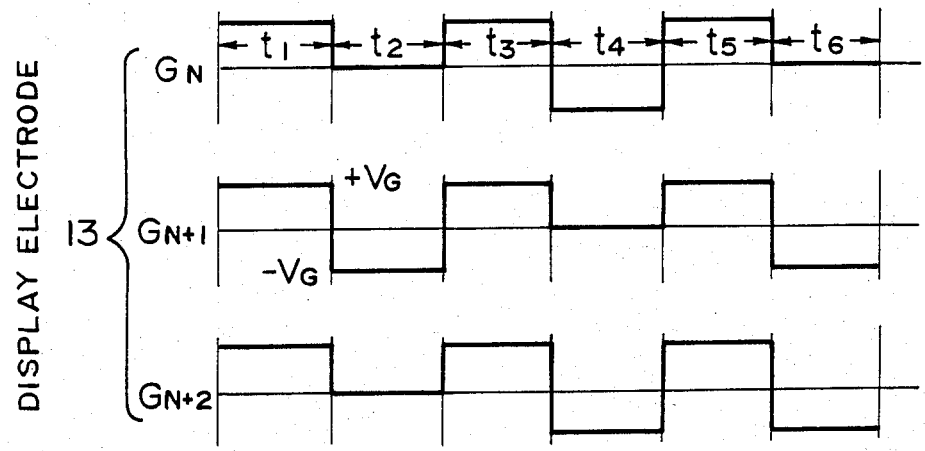

FIGS. 44A and 44B show another example of scanning signals and display signals in an embodiment using an active matrix circuit shown in FIG. 21. FIG. 44A shows electric signals applied to selected scanning electrodes (counter electrodes) and to the other scanning electrodes (nonselected scanning electrodes), respectively connected to gates of FET, at phases $t_1, t_2, \ldots$ FIG. 44B shows display signals including electric signals applied to selected display electrodes and electric signals applied to nonselected display electrodes, respectively at phases $t_1, t_2, \ldots$, each display electrode being connected to a gate of FET.

In FIGS. 44A and 44B, the abscissas represent time and the ordinates represent voltages. For example, when a motion picture is displayed, scanning electrodes 12 are sequentially and periodically selected. The electric signal applied to the selected scanning electrode $C_N$ is $+V_S$ at phase (time) $t_1$ and $-V_G$ at phase (time) $t_2$ as shown in FIG. 44A.

On the other hand, an electric signal of $-V_G$ is applied to the other scanning electrodes $C_{N+1}$, $C_{N+2}$ at phases $t_1$-$t_2$ as shown in FIG. 44A. Further, the electric signal applied to the selected display electrode $G_N$, $G_{N+1}$, $G_{N+2}$ is $+V_G$ and an electric signal of 0 is applied to the selected display electrodes $G_N$, $G_{N+2}$, as shown in FIG. 44B. On the other hand, an electric signal of $-V_G$ is applied to the display electrode $G_{N+1}$ not selected at phase $t_2$. In the above, respective voltages are set to desired values satisfying the following relationships.

In a case where "bright" state is written on scanning electrodes $m=1$ to $q$ and on a display electrode of $n=1$ to $M$ and then "dark" is written a scanning electrode of $m=q$ and on a display electrode $n=1$:

$V_S + V_{LC} < V_{Cm}$   ($m=q$, $n=1$ to M)

$V_{Gn} - V_P < V_{LC} + V_C$   ($n=1$) ($n=1$ to M)

$V_S - V_{LC} > V_{Cm}$   ($m=q$, $n=1$)

$V_{Gn} = 0$   ($n=1$)

$V_{Gn} - V_P < V_{Cm}$   ($m=q$, $n\neq 1$)

$V_{Cm} = 0$   ($m\neq q$)

wherein the respective symbols represent the following:
$V_{Cm}$: counter electrode (scanning signal) voltage,
$V_{Gn}$: gate electrode (display signal) voltage,
$V_S$: source or drain electrode (common terminal) voltage,
$V_{LC}$: absolute value of threshold voltage of a ferroelectric liquid crystal, and
$V_P$: gate-source threshold voltage.

The above operations are repeated to effect writing through cycles of $q=1$ to $q=N$.

Thus, a display can be effected according to image information signals by using a plurality of picture elements formed by a plurality of picture element electrodes and arranged in a plurality of rows and in a plurality of columns, and by using a time division driving mode which comprises a first phase wherein a selected first group of picture elements are refreshed to a display state based on the first orientation state of a ferroelectric liquid crystal and a second phase wherein a selected picture element among the refreshed picture elements is brought to a display state based on the second orientation state of the ferroelectric liquid crystal, the first and second phase being effected row by row.

A writing operation for the picture elements shown in FIG. 4 by applying such electric signals is illustrated by FIG. 43.

Thus, a display pattern as shown in FIG. 36, for example, can be completed through the operations at phases $t_1$-$t_6$.

Figure 45A:
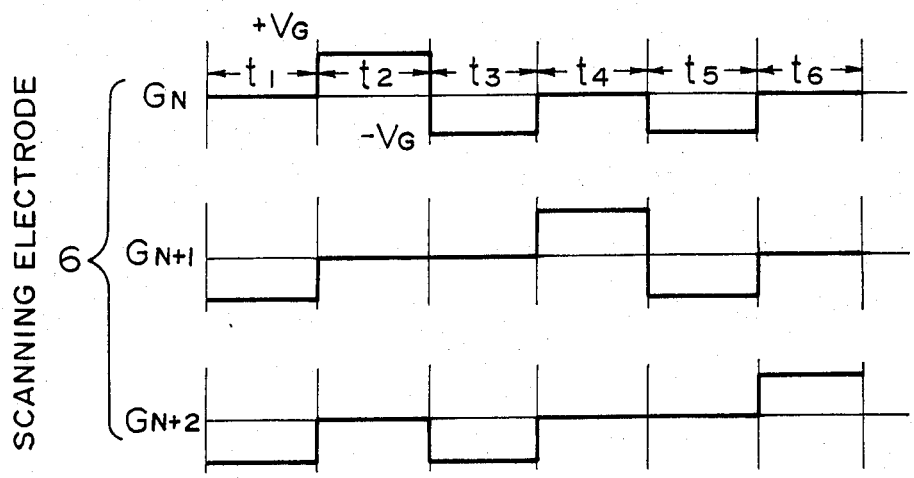
Figure 45B:
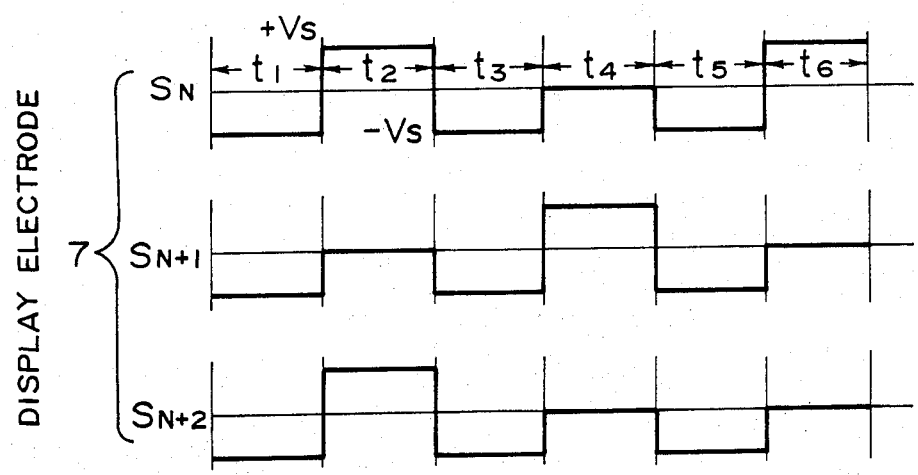

FIGS. 45A and 45B show another example of scanning signals and display signals in an embodiment using an active matrix circuit shown in FIG. 3. FIG. 45A shows electric signals applied to selected scanning electrodes and to the other scanning electrodes (nonselected scanning electrodes), respectively connected to gates of FET, at phases $t_1, t_2, \ldots$ FIG. 45B shows display signals including electric signals applied to selected display electrodes and nonselected display electrodes, respectively connected to sources or drains of FET at phases $t_1, t_2 \ldots$.

In FIGS. 45A and 45B, the abscissas represent time and the ordinates represent voltages. For example, when a motion picture is displayed, scanning electrodes 6 are sequentially and periodically selected. The electric signal applied to the selected scanning electrode $G_N$ is 0 at phase (time) $t_1$ and $+V_G$ at phase (time) $t_2$ as shown in FIG. 45A.

On the other hand, an electric signal of $-V_G$ is applied to the other scanning electrodes $G_{N+1}$, $G_{N+2}$ at phase $t_1$ as shown in FIG. 45A. Further, the electric signal applied to the selected display electrode $S_N$, $S_{N+1}$, $S_{N+2}$ is $-V_S$ and an electric signal of $+V_S$ is applied to the selected display electrodes $S_N$, $S_{N+2}$, as shown in FIG. 45B. On the other hand, an electric signal of 0 is applied to the display electrode $S_{N+1}$ not selected at phase $t_2$. In the above, respective voltages are set to desired values satisfying the following relationships.

In a case where, on a scanning electrode of $m=q$ line, "bright" state is written as by refreshing on display electrodes of $n=1$ to $M$, and then "dark" is written on a display electrode $n=1$:

$V_{Gm} = 0$   ($m=q$, $n=1$ to M)

$V_C - V_{LC} > V_{Sn}$   ($m=q$, $n=1$ to M)

$V_C + V_{LC} < V_{Sn}$   ($m=q$, $n=1$)

$V_{Gm} - V_P > V_{LC} + V_C$   ($m=q$, $N=1$)

$V_{Sn} = 0$   ($m=q$, $n\neq 1$)

$V_{Gm} - V_P < V_{Sn}$   ($m\neq q$, $n=1$) ($m\neq q$, $n\neq 1$)

wherein the respective symbols represent the following:
$V_{Gm}$: gate electrode (scanning signal) voltage,
$V_{Sn}$: source or drain electrode (display signal) voltage,
$V_C$: counter electrode (common terminal) voltage,
$V_{LC}$: absolute value of threshold voltage of a ferroelectric liquid crystal, and
$V_P$: gate-source threshold voltage.

The above operations are repeated to effect writing through cycles of $q=1$ to $q=N$.

Thus, a display can be effected according to image information signals by using a plurality of picture elements formed by a plurality of picture element electrodes and arranged in a plurality of rows and in a plurality of columns, and by using a time division driving mode which comprises a first phase wherein a selected first group of picture elements are refreshed to a display state based on the first orientation state of a ferroelectric liquid crystal and a second phase wherein a selected picture element among the refreshed picture elements is brought to a display state based on the second orientation state of the ferroelectric liquid crystal, the first and second phase being effected row by row.

A writing operation for the picture elements shown in FIG. 4 by applying such electric signals is illustrated by FIG. 43.

Thus, a display pattern as shown in FIG. 5, for example, can be completed through the operations at phases $t_1$-$t_6$.

Examples of specific preferable values for driving a ferroelectric liquid crystal DOBAMBC in the above explained embodiment are enumerated below:

Input frequency $f_0 = 1 \times 10^4 - 1 \times 10^6$ Hz
$10 < |V_G| < 60$ V (peak value)
$0.3 < |V_S| < 10$ V (peak value).

Figure 46A:
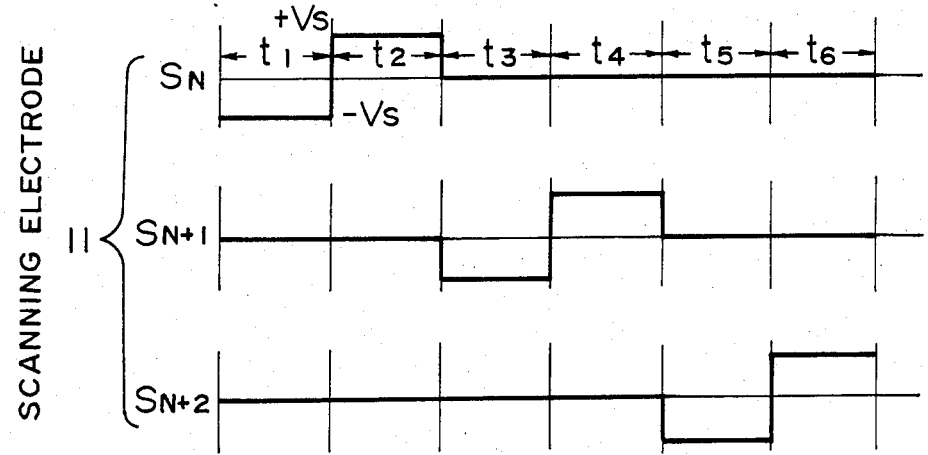
Figure 46B:
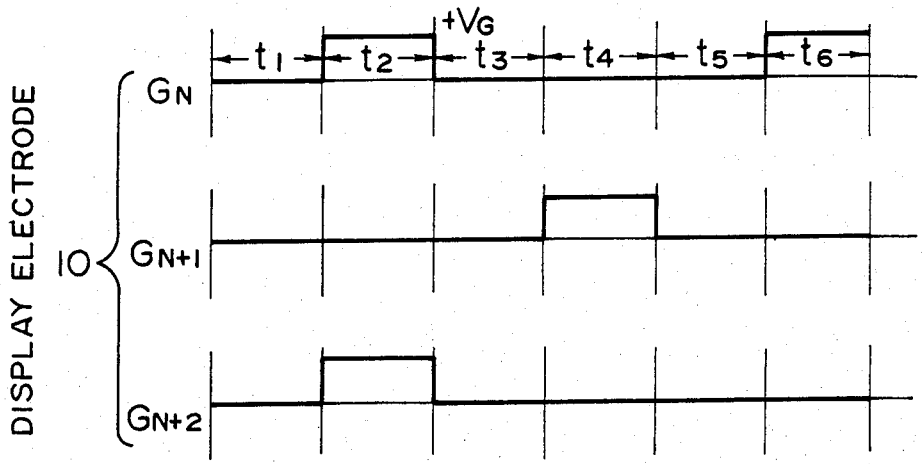

FIGS. 46A and 46B show another example of scanning signals and display signals in an embodiment using an active matrix circuit shown in FIG. 18. FIG. 46A shows electric signals applied to selected scanning electrodes and to the other scanning electrodes (nonselected scanning electrodes) at phases $t_1$, $t_2$, . . . . FIG. 46B shows display signals including electric signals applied to selected display electrodes and nonselected display electrodes at phases $t_1$, $t_2$ . . . , respectively.

In FIGS. 46A and 46B, the abscissas represent time and the ordinates represent voltages. For example, when a motion picture is displayed, scanning electrodes 11 connected to sources or drains of FET are sequentially and periodically selected. The electric signal applied to the selected scanning electrode $S_N$ is $-V_S$ at phase (time) $t_1$ and $+V_S$ at phase (time) $t_2$ as shown in FIG. 46A.

On the other hand, an electric signal of 0 is applied to the other scanning electrodes $S_{N+1}$, $S_{N+2}$ at phases $t_1$-$t_2$ as shown in FIG. 46A. Further, the electric signal applied to the selected display electrode $G_N$, $G_{N+1}$, $G_{N+2}$ connected to gates of FET is 0 at phase $t_1$ and an electric signal of $+V_S$ is applied to the selected display electrodes $G_N$, $G_{N+2}$ connected to gates of FET. Further, an electric signal of 0 is applied to the display electrode not selected at phase $t_2$ is 0. In the above, respective voltages are set to desired values satisfying the following relationships.

In a case where, on a scanning electrode of m=q line, "bright" state is written as by refreshing on display electrodes of n=1 to M and then "dark" is written on a display electrode n=1:

$V_{Sm} = 0$ (m=q, n≠1) (m>q, n=1 to M)

$V_C - V_{LC} > V_{Sm}$ (m=q, n=1 to M)

$V_C + V_{LC} < V_{Sm}$ (m=q, n=1)

$V_{Gn} - V_P > V_{LC} + V_C$ (m=q, n=1)

$V_{Sm} = 0$ (m≠q, n=1) (m≠q, n≠1)

wherein the respective symbols represent the following:
$V_{Sm}$: source electrode (scanning signal) voltage,
$V_{Gn}$: gate electrode (display signal) voltage,
$V_C$: counter electrode (common terminal) voltage,
$V_{LC}$: absolute value of threshold voltage of a ferroelectric liquid crystal, and $V_P$: gate-source threshold voltage.

The above operations are repeated to effect writing through cycles of q=1 to q=N.

Thus, a display can be effected according to image information signals by using a plurality of picture elements formed by a plurality of picture element electrodes and arranged in a plurality of rows and in a plurality of columns, and by using a time division driving mode which comprises a first phase wherein a selected first group of picture elements are refreshed to a display based on the first orientation state of a ferroelectric liquid crystal and a second phase wherein a selected picture element among the refreshed picture elements is brought to a display state based on the second orientation state of the ferroelectric liquid crystal, the first and second phase being effected row by row.

A writing operation for the picture elements shown in FIG. 4 by applying such electric signals is illustrated by FIG. 43.

Thus, a display pattern as shown in FIG. 40, for example, can be completed through the operations at phases $t_1$-$t_6$.

Examples of specific preferable values for driving a ferroelectric liquid crystal DOBAMBC in the above explained embodiment are enumerated below:

Input frequency $f_0 = 1 \times 10^4 - 1 \times 10^6$ Hz
$10 < |V_G| < 60$ V (peak value)
$0.3 < |V_S| < 10$ V (peak value).

Figure 47A:
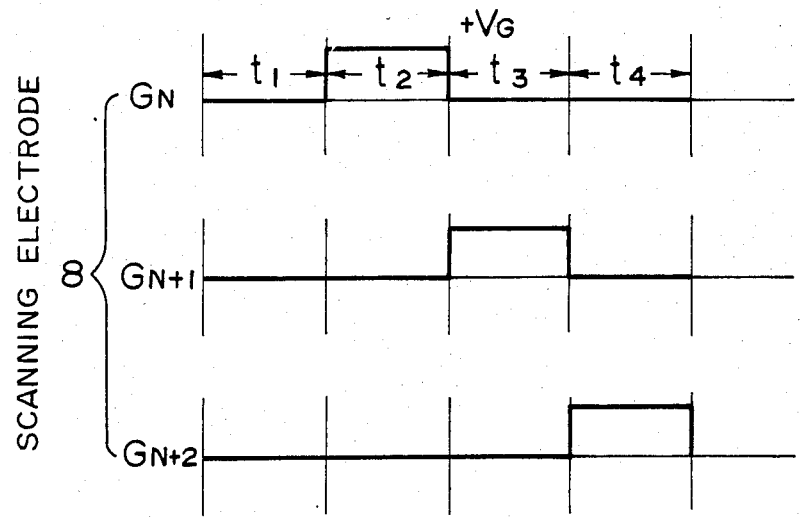
Figure 47B:
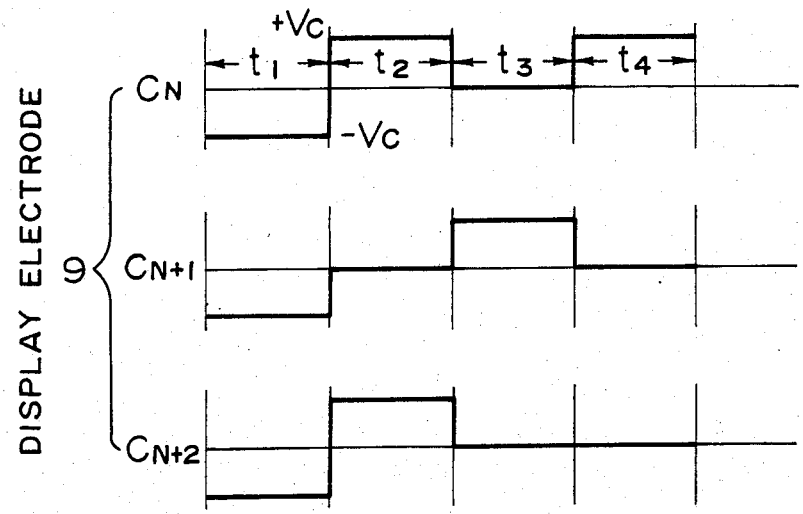

FIGS. 47A and 47B show another example of scanning signals and display signals in an embodiment using an active matrix circuit shown in FIG. 8. FIG. 47A shows electric signals applied to selected scanning electrodes and to the other scanning electrodes (nonselected scanning electrodes) at phases $t_1$, $t_2$, . . . . FIG. 47B shows display signals including electric signals applied to selected display electrodes and nonselected display electrodes at phases $t_1$, $t_2$ . . . .

In FIGS. 47A and 47B, the abscissas represent time and the ordinates represent voltages. For example, when a motion picture is displayed, scanning electrodes 8 connected to gates of FET are sequentially and periodically selected. The electric signal applied to the selected scanning electrode $G_N$ is 0 at phase (time) $t_1$ and $+V_G$ at phase (time) $t_2$ as shown in FIG. 47A.

On the other hand, an electric signal of 0 is applied to the other scanning electrodes $G_{N+1}$, $G_{N+2}$ at phases $t_1$ and $t_2$ as shown in FIG. 47A. Further, the electric signal applied to the selected display electrodes (counter electrodes) $C_N$, $C_{N+1}$, $C_{N+2}$ is $-V_C$ at phase $t_1$ and an electric signal of $+V_C$ is applied to the selected display electrode (counter electrode) $C_N$, $C_{N+2}$ at phase $t_2$. Further, an electric signal of 0 is applied to the display electrode $C_{N+1}$ not selected at phase $t_2$. In the above, respective voltages are set to desired values satisfying the following relationships.

In a case where the whole picture is refreshed to "bright" on scanning electrodes m=1 to N (N: number of scanning lines) and on display electrodes n=1 to M (M: number of display lines) and then "dark" is written on a scanning electrode m=q and on a display electrode n=1:

$V_{Gm} - V_P > V_{LC} + V_S$ (m=q, n=1) (m=q, n≠1)

$V_S - V_{LC} > V_{Cn}$ (m=1 to N, n=1 to M)

$V_S + V_{LC} < V_{Cn}$ (m=q, n=1) (m≠q, n=1)

$$V_{Gm} - V_P < V_{Cn} \quad (m \neq q, n \neq 1)$$

wherein the respective symbols represent the following:
- $V_{Gm}$: gate electrode (scanning signal) voltage,
- $V_{Cn}$: counter electrode (display signal) voltage,
- $V_S$: source or drain electrode (common terminal) voltage,
- $V_{LC}$: absolute value of threshold voltage of a ferroelectric liquid crystal, and
- $V_P$: gate-source threshold voltage.

The above operations are repeated to effect writing through cycles of q=1 to q=N.

Thus, a display can be effected according to image information signals by using a plurality of picture elements formed by a plurality of picture element electrodes and arranged in a plurality of rows and a plurality of columns forming a matrix, and by using a time division driving mode which comprises a first step wherein the matrix picture elements are refreshed to a display state based on the first orientation state of a ferroelectric liquid crystal, and a second step wherein a selected picture element among the refreshed picture elements is brought to a display state based on the second orientation state of the ferroelectric liquid crystal.

Figure 48:
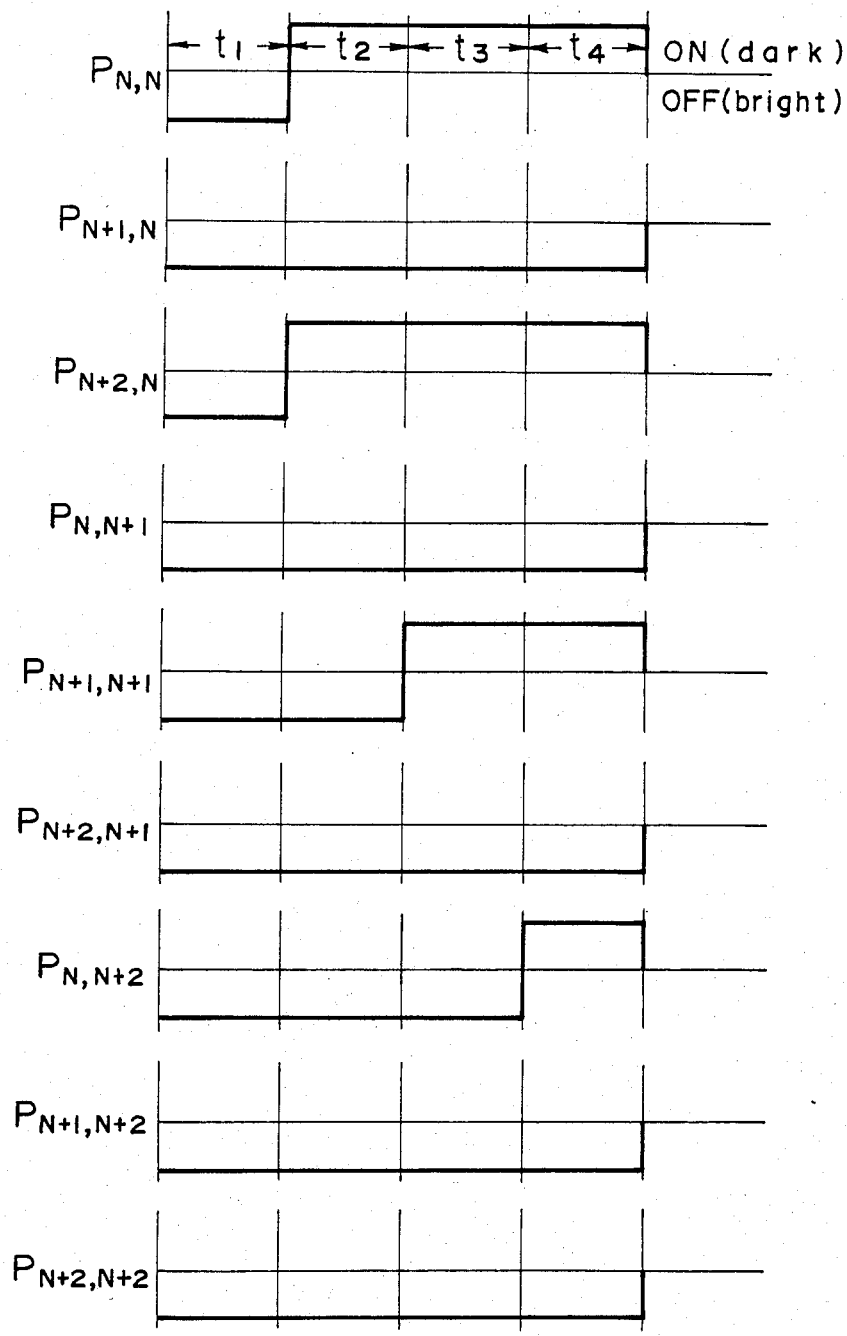

A writing operation for the picture elements shown in FIG. 4 by applying such electric signals is illustrated by FIG. 48. In FIG. 48, the respective abscissas represent time and the ordinates indicate the display states of ON (dark) on the upper sides and OFF (bright) on the lower sides. As apparent from FIGS. 47 and 48, a voltage $-V_S - V_C (< -V_{LC})$ exceeding the threshold voltage $-V_{LC}$ is applied to all the picture elements $P_{N,N}$ to $P_{N+2,N+2}$ on selected scanning lines and selected display lines at phase $t_1$, whereby all the picture elements $P_{N,N}$ to $P_{N+2,N+2}$ in FIG. 4 are refreshed to "bright". Then, at phase $t_2$, a voltage $V_S - V_C (> V_{LC})$ exceeding the threshold voltage $V_{LC}$ is applied to picture elements $P_{N,N}$, $P_{N+2,N}$ at intersections of selected scanning lines and display lines. Thus, the picture elements $P_{N,N}$, $P_{N+2}$ are switched to "dark". At phases $t_3$ and thereafter, as in phase $t_2$, "dark" is successively written in picture elements corresponding to selected scanning lines and display lines. As will be understood from the above operations, depending on whether a display electrode is selected or not on a selected scanning electrode line, liquid crystal molecules on the display electrode when it is selected are oriented to the first or second orientation state to give a picture element of ON (dark) or OFF (bright) state. On the nonselected scanning lines, voltages applied to all the picture elements do not exceed the threshold voltage. As a result, liquid crystal molecules at the respective picture elements on the nonselected scanning lines do not change their orientation states but retain their orientation states obtained corresponding to the signal state in the previous scanning step as shown in FIG. 7. Namely, when a certain scanning electrode line is selected, signals corresponding to the line are written. During a time interval from a time at which writing of signals corresponding to one frame is completed to a time at which the scanning line is selected next after one frame is completed, the signal state of each picture element is maintained. As a result, even if the number of scanning electrode lines is increased, the duty ratio does not automatically change, thus resulting in no decrease in contrast.

Thus, a display pattern as shown in FIG. 32, for example, can be completed through the operations at phases $t_1$-$t_4$.

Examples of specific preferable values for driving a ferroelectric liquid crystal DOBAMBC in the above explained embodiment are enumerated below:
Input frequency $f_0 = 1 \times 10^4 - 1 \times 10^6$ Hz
$10 < |V_G| < 60$ V (peak value)
$0.3 < |V_S| < 10$ V (peak value)

Figure 49A:
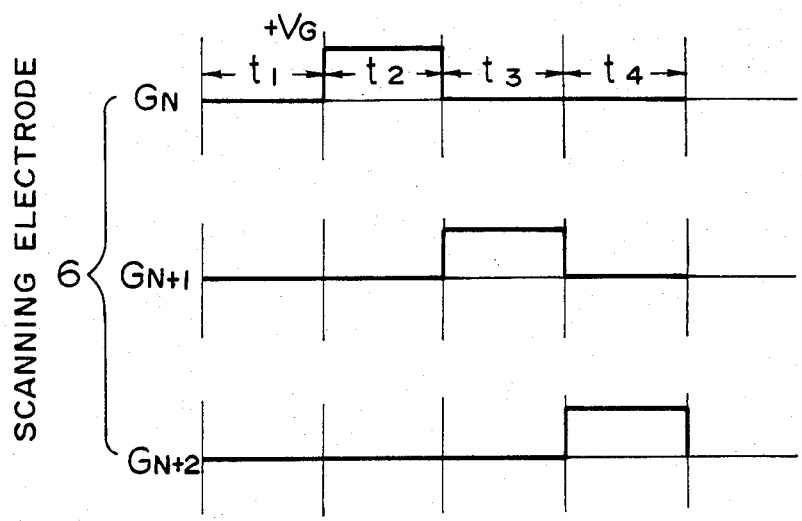
Figure 49B:
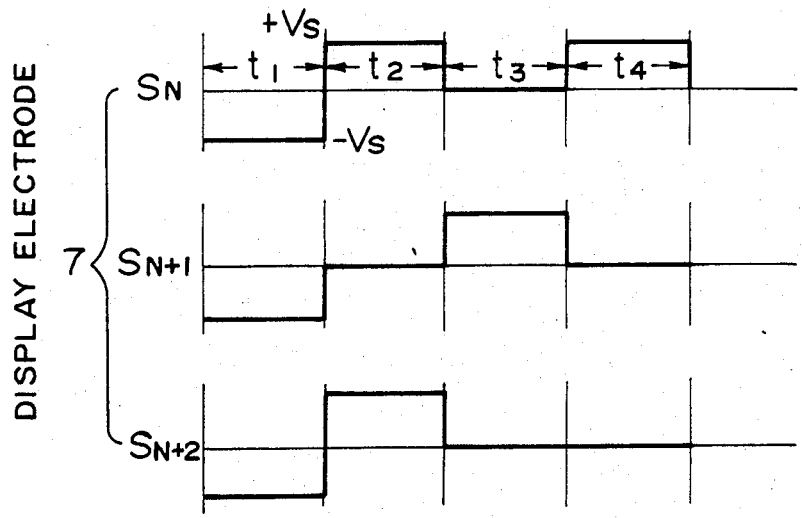

FIGS. 49A and 49B show another example of scanning signals and display signals in an embodiment using an active matrix circuit shown in FIG. 3. FIG. 49A shows electric signals applied to selected scanning electrodes and to the other scanning electrodes (nonselected scanning electrodes), respectively connected to gates of FET, at phases $t_1$, $t_2$, . . . . FIG. 49B shows display signals including electric signals applied to selected display electrodes and nonselected display electrodes at phases $t_1$, $t_2$, . . . .

In FIGS. 49A and 49B, the abscissas represent time and the ordinates represent voltages. For example, when a motion picture is displayed, scanning electrodes 6 connected to gates of FET are sequentially and periodically selected. The electric signal applied to selected scanning electrodes $G_N$, $G_{N+1}$, $G_{N+2}$ is 0 at phase (time) $t_1$ and $+V_G$ to the selected scanning electrode $G_N$ at phase (time) $t_2$ as shown in FIG. 49A.

On the other hand, an electric signal of 0 is applied to the other scanning electrodes $G_{N+1}$, $G_{N+2}$ at phase $t_2$ as shown in FIG. 49A. Further, the electric signal applied to selected display electrodes $S_N$, $S_{N+1}$, $S_{N+2}$ connected to sources or drains of FET is $-V_S$ as shown in FIG. 49B, and an electric signal of 0 is applied to the nonselected display electrode $S_{N+1}$ at phase $t_2$. In the above, respective voltages are set to desired values satisfying the following relationships.

In a case where the whole picture is refreshed to "bright" on scanning electrodes m=1 to N (N: number of scanning lines) and on display electrodes n=1 to M (M: number of display lines) and then "dark" is written on a scanning electrode m=q and on a display electrode n=1:

$$V_{Gm} = 0 \quad (m = 1 \text{ to } N, n = 1 \text{ to } M) (m \neq q)$$

$$V_C - V_{LC} > V_{Sn} \quad (m = 1 \text{ to } N, n = 1 \text{ to } M)$$

$$V_{Gm} V_P > V_{LC} + V_C \quad (m = q, n = 1)$$

$$V_C + V_{LC} < V_{Sn} \quad (n = 1)$$

$$V_{Sn} = 0 \quad (n \neq 1)$$

wherein the respective symbols represent the following:
- $V_{Gm}$: gate electrode (scanning signal) voltage,
- $V_{Sn}$: source or drain electrode (display signal) voltage,
- $V_C$: counter electrode (common terminal) voltage,
- $V_{LC}$: absolute value of threshold voltage of a ferroelectric liquid crystal, and
- $V_P$: gate-source threshold voltage.

The above operations are repeated to effect writing through cycles of q=1 to q=N.

Thus, a display can be effected according to image information signals by using a plurality of picture elements formed by a plurality of picture element electrodes and arranged in a plurality of rows and forming a matrix of a plurality of columns forming a matrix, and by using a time division driving mode which comprises a first step wherein the matrix picture elements are refreshed to a display state based on the first orientation state of a ferroelectric liquid crystal, and a second step wherein a selected picture element among the refreshed picture elements is brought to a display state based on the second orientation state of the ferroelectric liquid crystal.

A writing operation for the picture elements shown in FIG. 4 by applying such electric signals is illustrated by FIG. 48.

Thus, a display pattern as shown in FIG. 36, for example, can be completed through the operations at phases $t_1-t_4$.

Examples of specific preferable values for driving a ferroelectric liquid crystal DOBAMBC in the above explained embodiment are enumerated below:

Input frequency $f_0 = 1 \times 10^4 - 1 \times 10^6$ Hz
$10 < |V_G| < 60$ V (peak value)
$0.3 < |V_S| < 10$ V (peak value).

FIGS. 51A and 51B show another example of scanning signals and display signals in an embodiment using an active matrix circuit shown in FIG. 24. FIG. 51A shows electric signals applied to selected scanning electrodes and to the other scanning electrodes (nonselected scanning electrodes) at phases $t_1, t_2, \ldots$ . FIG. 51B shows display signals including electric signals applied to selected display electrodes and nonselected display electrodes, respectively at phases $t_1, t_2, \ldots$ .

In FIGS. 51A and 51B, the abscissas represent time and the ordinates represent voltages. For example, when a motion picture is displayed, scanning electrodes 14 of counter electrodes are sequentially and periodically selected. The electric signal applied to the selected scanning electrode $C_N, C_{N+1}, C_{N+2}$ is $-V_H$ at phase (time) $t_1$ and to the selected scanning electrode $C_N$, $+V_H$ at phase $t_2$ as shown in FIG. 51A.

On the other hand, an electric signal of 0 is applied to the other scanning electrodes $G_{N+1}, G_{N+2}$ at phase $t_2$ as shown in FIG. 51A. Further, the electric signal applied to selected display electrode $S_N, S_{N+1}, S_{N+2}$ connected to sources or drains of FET is 0 and an electric signal of $-V_L$ is applied to the selected display electrodes $S_N, S_{N+2}$ at phase $t_2$, as shown in FIG. 51B. Further, an electric signal of 0 is applied to the display electrode $S_{N+1}$ not selected at phase $t_2$. In the above, respective voltages are set to desired values satisfying the following relationships.

In a case where the whole picture is refreshed to "dark" on scanning electrodes $m = 1$ to N (N: number of scanning electrodes) and on display electrodes $n = 1$ to M (M: number of display lines), and then "bright" is written on a scanning electrode $m = q$ and on a display electrode $n = 1$:

$V_{LC} < |V_S| + V_D$    $(m = q, n = 1)$ $V_D = 0$    $(m \neq q)$ $V_S - V_{LC} > V_D$    $(m = 1$ to $N)$ $V_S = 0$    $(n = 1$ to $M) (m \neq q, n \neq 1)$ wherein the respective symbols represent the following:
$V_D$: stripe for counter electrode (scanning signal) voltage,
$V_S$: source or drain electrode (display signal) voltage,
$V_G$: gate electrode (common terminal) voltage,
$V_{LC}$: absolute value of threshold voltage of a ferroelectric liquid crystal, and
$V_P$: gate-source threshold voltage.

The above operations are repeated to effect writing through cycles of $q = 1$ to $q = N$.

Thus, a display can be effected according to image information signals by using a plurality of picture elements formed by a plurality of picture element electrodes and arranged in a plurality of rows and a plurality of columns forming a matrix, and by using a time division driving mode which comprises a first step wherein the matrix picture elements are refreshed to display state based on the first orientation state of a ferroelectric liquid crystal, and a second step wherein a selected picture element among the refreshed picture elements is brought to a display state based on the second orientation state of the ferroelectric liquid crystal.

A writing operation for the picture elements shown in FIG. 4 by applying such electric signals is illustrated by FIG. 48.

Figure 50:
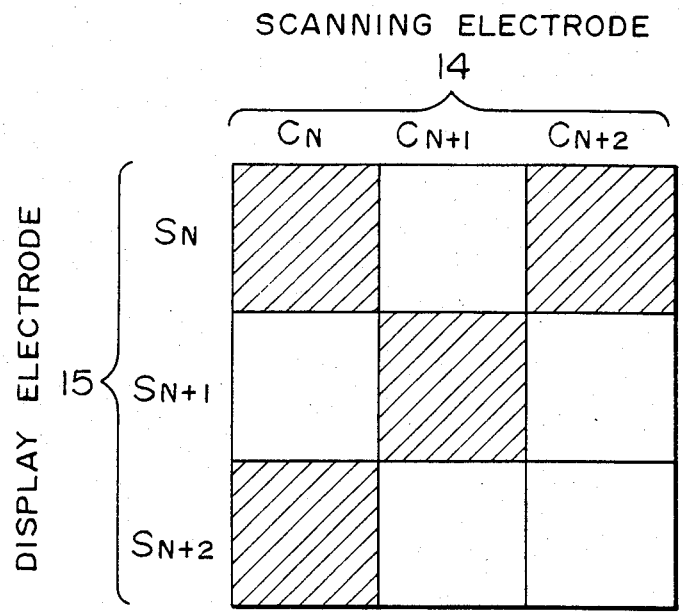

Referring to FIG. 50, among the picture elements formed by intersections of scanning electrodes $C_N, C_{N+1}, C_{N+2}, \ldots$ and display electrodes $S_N, S_{N+1}, S_{N+2} \ldots$, it is assumed that the hatched picture elements correspond to the "dark" state and the white picture elements correspond to the "bright" state. With respect to the picture elements on the display electrode $S_N$ in FIG. 50, the picture elements corresponding to the scanning electrodes $C_N, C_{N+2}$ are in the dark state and the other picture element is in the bright state. A display pattern of FIG. 50 is completed through the operations at phases $t_1-t_4$.

Examples of specific preferable values for driving a ferroelectric liquid crystal DOBAMBC in the above explained embodiment are enumerated below:

Input frequency $f_0 = 1 \times 10^4 - 1 \times 10^6$ Hz
$10 < |V_G| < 60$ V (peak value)
$0.3 < |V_S| < 10$ V (peak value).

Figure 53:
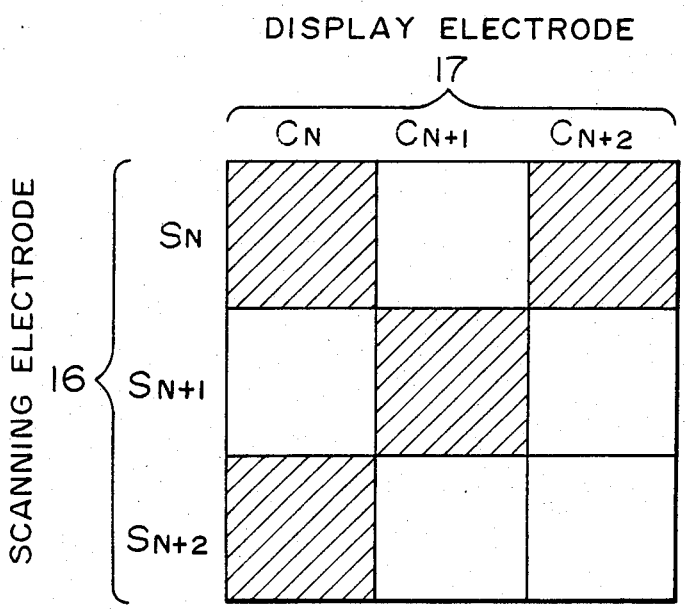

FIG. 52 shows a circuit diagram of another active matrix according to the present invention comprising scanning electrodes 16 and display electrodes 17, and FIG. 53 is an explanatory view illustrating an example of a display of corresponding picture elements.

FIG. 54A shows scanning signals including electric signals applied to selected scanning electrodes and the other scanning electrodes (nonselected scanning electrodes), respectively at phases $t_1, t_2, \ldots$ . FIG. 54B shows display signals applied to selected display electrodes and nonselected display electrodes, respectively at phases $t_1, t_2, \ldots$ .

In FIGS. 54A and 54B, the abscissas represent time and the ordinates represent voltages. For example, when a motion picture is displayed, scanning electrodes 16 connected to sources or drains of FET are sequentially and periodically selected. The electric signal applied to the selected scanning electrode $S_N, S_{N+1}, S_{N+2}$ is 0 at phase (time) $t_1$ and an electric signal of $-V_L$ is applied to the selected scanning electrode $S_N$ at phase (time) $t_2$ as shown in FIG. 54A.

On the other hand, an electric signal of 0 is applied to the other scanning electrodes $S_{N+1}, S_{N+2}$ at phase $t_2$ as shown in FIGS. 54A. Further, the electric signal applied to the selected display electrodes (counter electrodes) $C_N, C_{N+1}, C_{N+2}$ is $-V_H$ at phase $t_1$ and an electric signal of $+V_H$ is applied to the selected display electrodes (counter electrodes) $C_N, C_{N+2}$ at phase $t_2$ as shown in FIG. 54B. Further, an electric signal of 0 is applied to the display electrode (counter electrode) not selected at phase $t_2$. In the above, respective voltages are set to desired values satisfying the following relationships.

In a case where the whole picture is refreshed to "dark" on scanning electrodes m=1 to N (N: number of scanning lines) and on display electrodes n=1 to M (M: number of display lines), and then "bright" is written on a scanning electrode m=q and on a display electrode of n=1:

$$V_{LC} < |V_S| + V_D \quad (m=q, n=1)$$

$$V_S = 0 \quad (m \ne q)$$

$$V_S = 0 \quad (m = 1 \text{ to } N)$$

$$V_S = V_{LC} > V_D \quad (n=1 \text{ to } M)$$

wherein the respective symbols represent the following:

$V_S$: source electrode (scanning signal) voltage,
$V_D$: stripe form counter electrode (display signal) voltage,
$V_G$: gate electrode (common terminal) voltage,
$V_{LC}$: absolute value of threshold value of a ferroelectric liquid crystal, and
$V_P$: gate-source threshold voltage.

The above operations are repeated to effect writing through cycles of q=1 to q=N.

Thus, a display can be effected according to image information signals by using a plurality of picture elements formed by a plurality of picture element electrodes and arranged in a matrix comprising a plurality of rows and in a plurality of columns, and by using a time division driving mode which comprises a first step wherein the matrix picture elements are refreshed to a display state based on the first orientation state of a ferroelectric liquid crystal, and a second step wherein a selected picture element among the refreshed picture elements is brought to a display state based on the second orientation state of the ferroelectric liquid crystal.

A writing operation for the picture elements shown in FIG. 4 by applying such electric signals is illustrated by FIG. 48.

Referring to FIG. 5, among the picture elements formed by intersections of scanning electrodes $S_N$, $S_{N+1}$, $S_{N+2}$, ... and display electrodes $C_N$, $C_{N+1}$, $C_{N+2}$, ..., it is assumed that the hatched picture elements correspond to the "dark" state and the white picture elements correspond to the "bright" state. With respect to the picture elements on the display electrode $C_N$ in FIG. 53, the picture elements corresponding to the scanning electrodes $S_N$, $S_{N+2}$ are in the dark state and the other picture element is in the bright state. A display pattern of FIG. 53 is completed by the operations at phases $t_1$-$t_6$.

Examples of specific preferable values for driving a ferroelectric liquid crystal DOBAMBC in the above explained embodiment are enumerated below:

Input frequency $f_0 = 1 \times 10^4 - 1 \times 10^6$ Hz
$10 < |V_G| < 60$ V (peak value)
$0.3 < |V_S| < 10$ V (peak value).

FIGS. 55A and 55B show another example of scanning signals and display signals in an embodiment using an active matrix circuit shown in FIG. 21. FIG. 55A shows scanning signals including electric signals applied to selected scanning electrodes and the other scanning electrodes (nonselected scanning electrodes), respectively at phases $t_1$, $t_2$, .... FIG. 55B shows display signals applied to selected display electrodes and nonselected display electrodes, respectively at phases $t_1$, $t_2$, ...

In FIGS. 55A and 55B, the abscissas represent time and the ordinates represent voltages. For example, when a motion picture is displayed, scanning electrodes (counter electrodes) 12 are sequentially and periodically selected. The electric signal applied to the selected scanning electrode $C_N$, $C_{N+1}$, $C_{N+2}$ is $+V_C$ at phase (time) $t_1$ and an electric signal of $-V_C$ is applied to the selected scanning electrode $C_N$ at phase (time) $t_2$ as shown in FIG. 55A.

On the other hand, an electric signal of $V_C = 0$ is applied to the other scanning electrodes $C_{N+1}$, $C_{N+2}$ at phase $t_2$ as shown in FIG. 55A. Further, the electric signal applied to the selected display electrode $G_N$, $G_{N+1}$, $G_{N+2}$ connected to gates of FET is $+V_G$ at phase $t_1$ and an electric signals of $V_G = 0$ is applied to the selected display electrodes $G_N$, $G_{N+2}$ at phase $t_2$ as shown in FIG. 55B. Further, an electric signal of $-V_G$ is applied to the nonselected display electrode $G_{N+1}$ connected to a gate of FET at phase $t_2$. In the above, respective voltages are set to desired values satisfying the following relationships.

In a case where the whole picture is refreshed to "bright" on scanning electrodes m=1 to N (N: number of scanning lines) and on display electrodes n=1 to M (M: number of display lines), and then "dark" is written on a scanning electrode m=q and on a display electrode of n=1:

$$V_{Gn} - V_P > V_{LC} + V_S \quad (m=q)(m=1 \text{ to } N, n=1 \text{ to } M)$$

$$V_S + V_{LC} < V_{Cm} \quad (n=1 \text{ to } M)$$

$$V_S - V_{LC} > V_{Cm} \quad (m=q, n=1)$$

$$V_{Gn} - V_P < V_{Cm} \quad (m \ne q, n=1)(m \ne q, n \ne 1)$$
$$(m=q, n \ne 1)$$

wherein the respective symbols represent the following:

$V_{Gn}$: gate electrode (scanning signal) voltage,
$V_{Cm}$: counter electrode (display signal) voltage,
$V_S$: source or drain electrode (common terminal) voltage,
$V_{LC}$: absolute value of threshold voltage of a ferroelectric liquid crystal,
$V_P$: gate-source threshold voltage.

The above operations are repeated to effect writing through cycles of q=1 to q=N. In this instance, the counter electrodes may be formed in stripes as shown in FIG. 64.

Thus, a display can be effected according to image information signals by using a plurality of picture elements formed by a plurality of picture element electrodes and arranged in a matrix comprising a plurality of rows and a plurality of columns, and by using a time division driving mode which comprises a first step wherein the matrix picture elements are refreshed to a display state based on the first orientation state of a ferroelectric liquid crystal, and a second step wherein a selected picture element among the refreshed picture elements is brought to a display state based on the second orientation state of the ferroelectric liquid crystal.

A writing operation for the picture elements shown in FIG. 4 by applying such electric signals is illustrated by FIG. 48.

Thus, a display pattern as shown in FIG. 22, for example, is completed through the operations of phases $t_1$-$t_4$.

Examples of specific preferable values for driving a ferroelectric liquid crystal DOBAMBC in the above explained embodiment are enumerated below:

Input frequency $f_0 = 1 \times 10^4 - 1 \times 10^6$ Hz
$10 < |V_G| < 60$ V (peak value)
$0.3 < |V_S| < 10$ V (peak value).

Figure 56A:
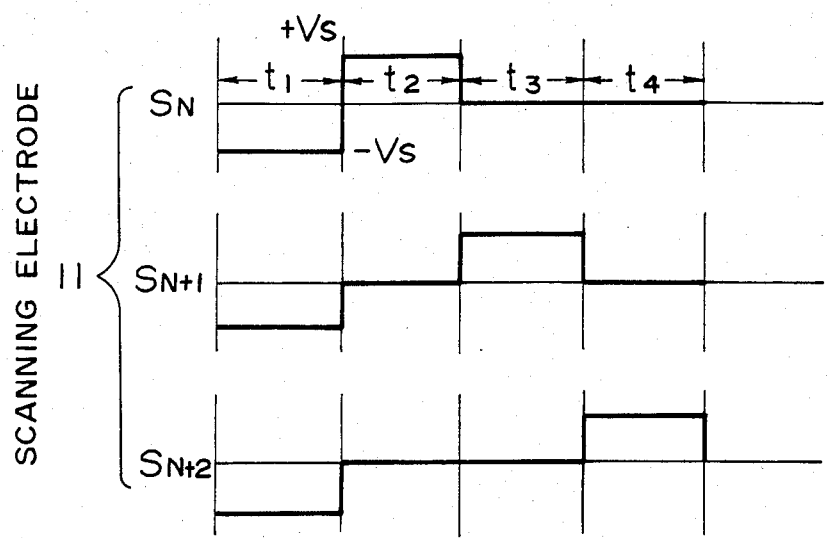
Figure 56B:
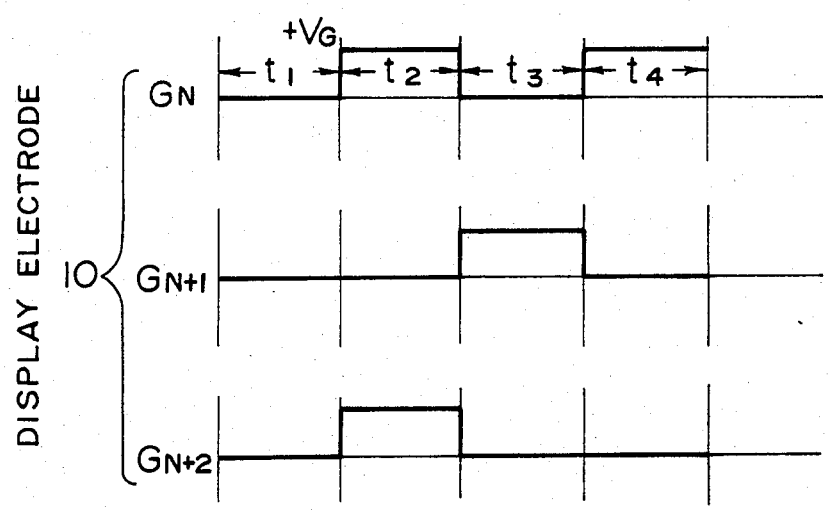

FIGS. 56A and 56B show another example of scanning signals and display signals in an embodiment using an acitve matrix circuit shown in FIG. 18. FIG. 56A shows scanning signals including electric signals applied to selected scanning electrodes and the other scanning electrodes (nonselected scanning electrodes), respectively at phases $t_1, t_2, \ldots$. FIG. 56B shows display signals applied to selected display electrodes and nonselected display electrodes, respectively at phases $t_1, t_2, \ldots$.

In FIGS. 56A and 56B, the abscissas represent time and the ordinates represent voltages. For example, when a motion picture is displayed, scanning electrodes 11 connected to sources or drains of FET are sequentially and periodically selected. The electric signal applied to the selected scanning electrode $S_N$, $S_{N+1}$, $S_{N+2}$ is $-V_S$ at phase (time) $t_1$ and an electric signal of $+V_S$ is applied to the selected scanning electrode $S_N$ at phase (time) $t_2$ as shown in FIG. 56A.

On the other hand, an electric signal of $V_S = 0$ is applied to the other scanning electrodes $S_{N+1}$, $S_{N+2}$ at phase $t_2$ as shown in FIG. 56A. Further, the electric signal applied to the selected display electrode $G_N$, $G_{N+1}$, $G_{N+2}$ is $V_2 = 0$ at phase $t_1$ and an electric signal of $+V_G$ is applied to the selected display electrodes $G_N$, $G_{N+2}$ connected to gates of FET at phase $t_2$ as shown in FIG. 56B. Further, an electric signal of $V_G = 0$ is applied to the nonselected display electrode $G_{N+1}$ connected to a gate of FET at phase $t_2$. In the above, respective voltages are set to desired values satisfying the following relationships.

In a case where the whole picture is refreshed to "bright" on scanning electrodes m=1 to N (N: number of scanning lines) and on display electrodes n=1 to M (M: number of display lines), and then "dark" is written on a scanning electrode m=q and on a display electrode of n=1:

$V_{Gn} - V_P > V_{LC} + V_C$    (m=q, n=1) (m=q, n≠1)
(m=1 to N, n=1 to M)

$V_C - V_{LC} > V_{Sm}$    (m≠q, n=1) (m=1 to N, n=1 to M)

$V_C + V_{LC} < V_{Sm}$    (m=q, n=1) (m=q, n≠1)

$V_{Sm} = 0$    (m≠q, n≠1) (m≠q, n=1)

wherein the respective symbols represent the following:
$V_{Sm}$: source or drain electrode (scanning signal) voltage,
$V_{Gn}$: gate electrode (display signal) voltage,
$V_C$: counter electrode voltage,
$V_{LC}$: absolute value of threshold voltage of a ferroelectric liquid crystal, and
$V_P$: gate-source threshold voltage.

The above operations are repeated to effect writing through cycles of q=1 to q=N.

Thus, a display can be effected according to image information signals by using a plurality of picture elements formed by a plurality of picture element electrodes and arranged in a matrix comprising a plurality of rows and a plurality of columns, and by using a time division driving mode which comprises a first step wherein the matrix picture elements are refreshed to a display state based on the first orientation state of a ferroelectric liquid crystal, and a second step wherein a selected picture element among the refreshed picture elements is brought to a display state based on the second orientation state of the ferroelectric liquid crystal.

A writing operation for the picture elements shown in FIG. 4 by applying such electric signals is illustrated in FIG. 48.

Thus, a display pattern as shown in FIG. 22, for example, can be completed by the operations through phases $t_1 - t_4$.

Examples of specific preferable values for driving a ferroelectric liquid crystal DOBAMBC in the above explained embodiment are enumerated below:

Input frequency $f_0 = 1 \times 10^4 - 1 \times 10^6$ Hz
$10 < |V_G| < 60$ V (peak value)
$0.3 < |V_S| < 10$ V (peak value).

Figure 57A:
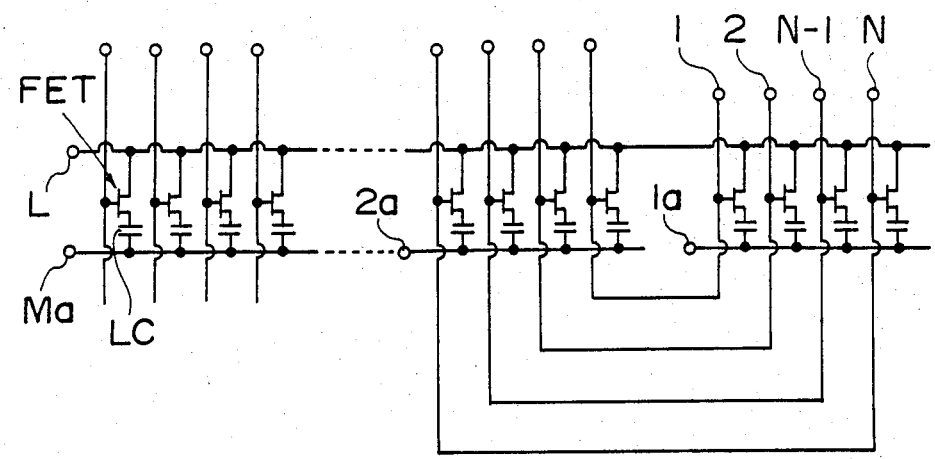
Figure 57B:
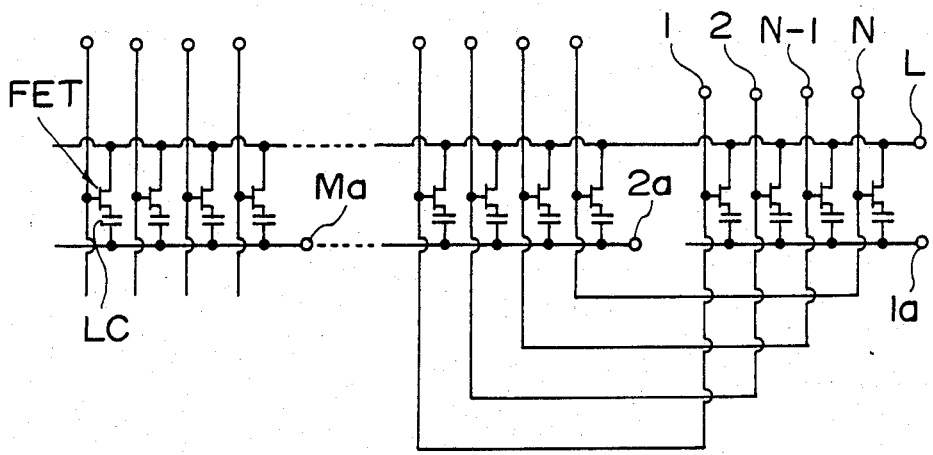
Figure 60A:
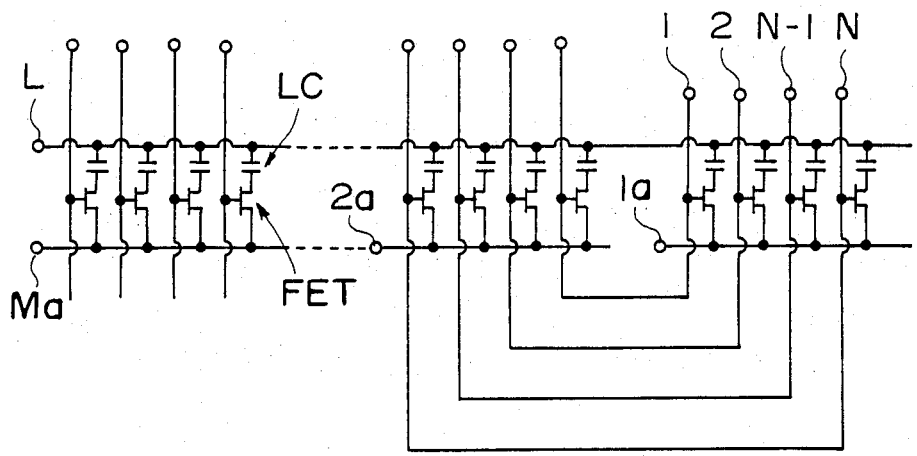
Figure 60B:
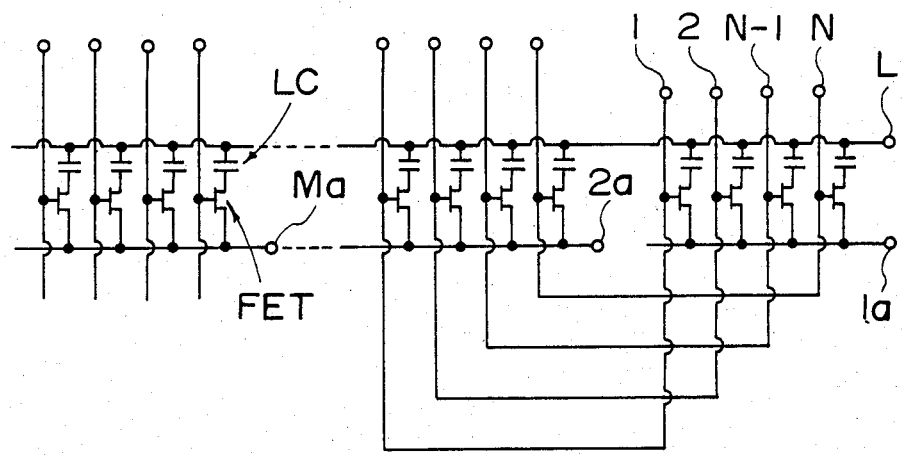
Figure 61A:
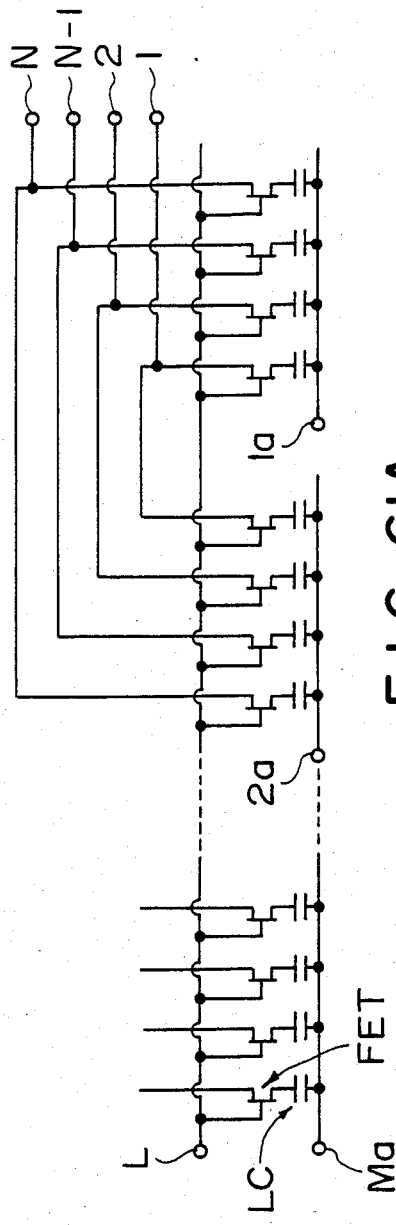
Figure 61B:
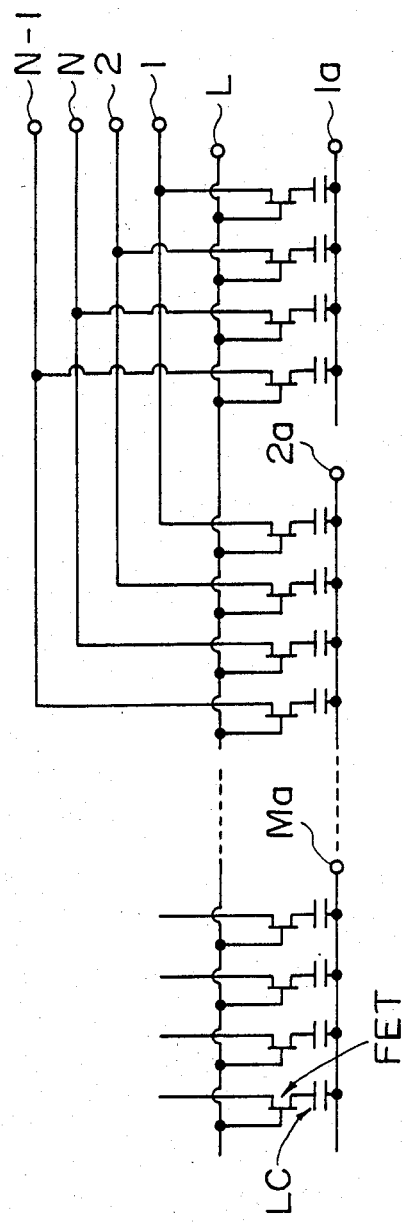

In the method for driving a ferroelectric liquid crystal, actual arrangement of the scanning electrodes and display electrodes can be freely selected. For example, the picture elements can be arranged in a single row as shown in FIGS. 57A, 57B, ... 62A, 62B. Such an arrangement can be used for a shutter array, etc.

Figure 63:
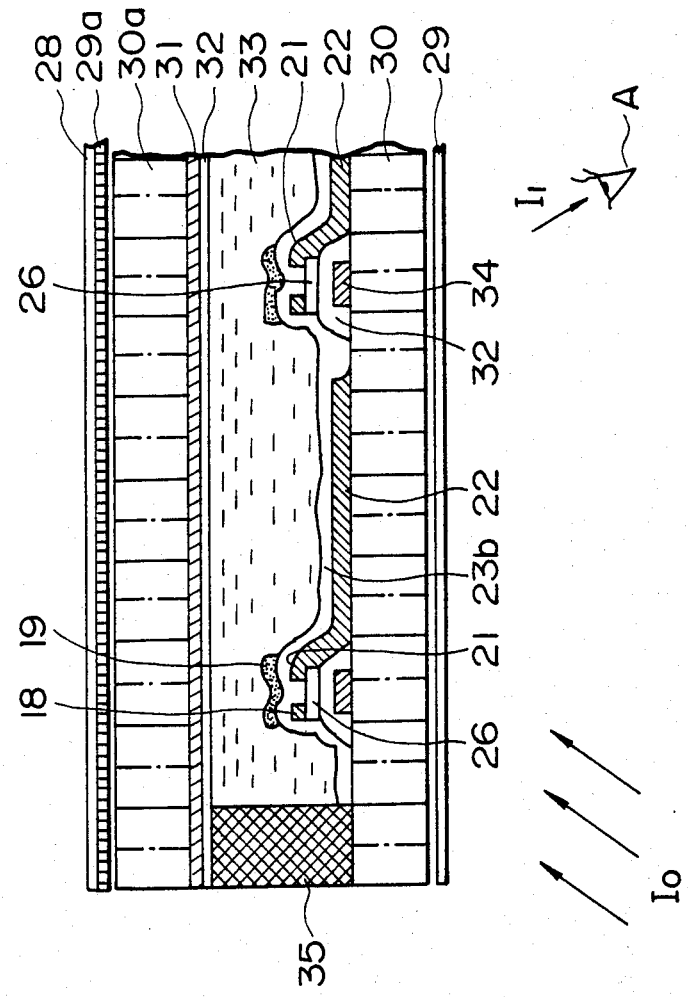
FIG. 63 is a sectional view of an embodiment of the liquid crystal device according to the present invention.

FIG. 63 is a partial sectional view of a ferroelectric liquid crystal cell using TFT's and FIG. 64 is a partial plan view of a FET base plate, respectively used in the present invention. These figures illustrate an embodiment of the present invention.

More specifically, FIGS. 63 and 64 show an embodiment of the liquid crystal device usable in the present invention. On a base plate 30 formed of glass, plastic, etc., are formed TFT's each comprising a gate electrode 34, a semiconductor film 26 of, e.g., amorphous silicon doped with hydrogen atoms formed by the medium of an insulating film 32 of, e.g., silicon nitride doped with hydrogen atoms and two terminals 18, 21 respectively connected to the semiconductor film 26, and a picture element forming electrodes 22 formed on ITO (indium film oxide) and connected to the terminals 21 of FET's. On the above members are further formed an insulating film of, e.g., polyimide, polyamide, polyvinyl alcohol, polyparaxylylene, SiO or $SiO_2$, and a light shielding film 19 of, e.g., aluminum or chromium. A base plate 30a forming a counter base plate has thereon a counter electrode of, e.g., ITO and an insulating film 32.

The above mentioned ferroelectric liquid crystal 33 is sandwiched between the base plates 30 and 30a. Further, a sealing member 35 for sealing the ferroelectric liquid crystal is provided at the periphery of the base plates 30 and 30a. On both sides of a cell structure of liquid crystal device thus formed, a pair of polarizers are disposed in a cross nicol arrangement, and, further a reflecting plate 28 of, e.g., an aluminum sheet or plate with a random reflection surface is disposed behind the polarizer 29a so that an observer A can observe a display state as a reflected light $I_1$ from an incident light $I_0$.

In the above description based on the respective figures, the terms "source (electrode)" and "drain (electrode)" corresponding to terminals 18 and 21 have been used by referring solely to a case where a current flows from a drain to a source. In view of the function of an FET, however, a terminal referred to as a source can function as a drain.

Figure 65:
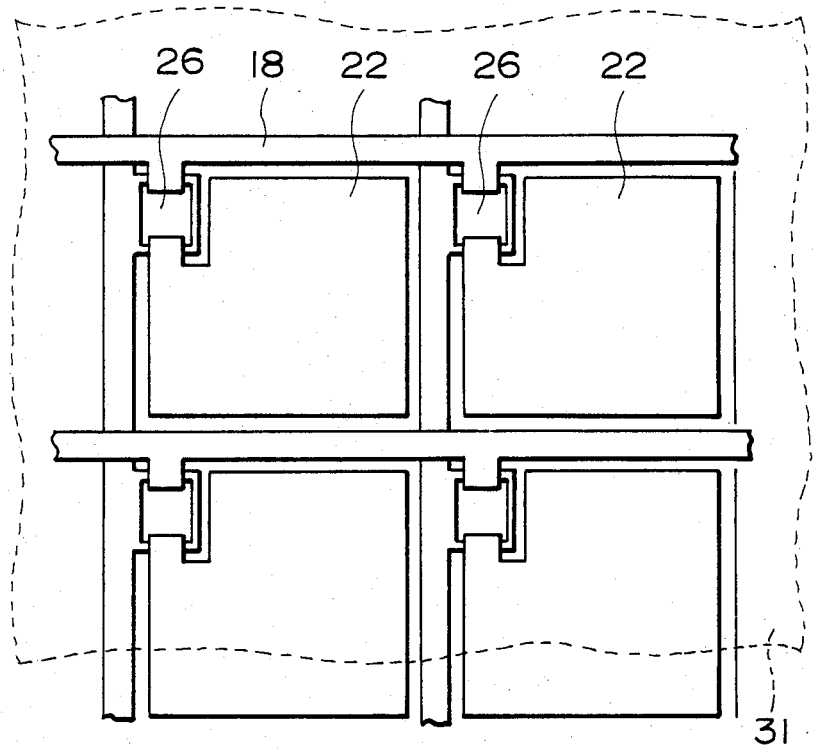

FIG. 65 shows a plan view of a case where the counter electrode is formed as a common electrode.

By using the liquid crystal device with the above structure and the method for driving the same according to the present invention, a large picture with a large number of picture elements can be displayed at a high speed and with a good clarity by an active matrix system.

What is claimed is:

1. A driving method for a liquid crystal device of the type comprising a plurality of FET's each having a gate and a first and a second terminal other than the gate, a first base plate having thereon a plurality of picture element electrodes each corresponding to an FET and connected to the first terminal of the FET, a second base plate having thereon counter electrodes opposite to the picture element electrodes, and a ferroelectric liquid crystal having first and second orientation states and sandwiched between the first and second base plates; said driving method comprising:
   a first phase of forming an electric field between a first terminal and a second terminal of an FET to result in the first orientation state of the ferroelectric liquid crystal, and
   a second phase of forming an electric field of the polarity opposite to that of the electric field applied in said first phase between a first terminal and a second terminal of an FET to result in the second orientation state of the ferroelectric liquid crystal; said first and second phases being respectively carried out in synchronism with the application of a signal for turning on the gates of the FET's respectively involved in the first and second phases.

2. The driving method according to claim 1, wherein picture elements corresponding to said plurality of picture element electrodes are arranged in a matrix comprising a plurality of rows and a plurality of columns, said first phase comprises forming a "bright" state at a first group of picture elements on a row, and said second phase comprises forming a "dark" state at a second group of picture elements on the row,
   said first and second phases being carried out simultaneously and repeated row by row.

3. The driving method according to claim 1, wherein said plurality of picture element electrodes are arranged in a matrix comprising a plurality of rows and a plurality of columns,
   said driving method being carried out in a time division manner by applying scanning signals to gates of the FET's corresponding to the picture element electrodes and applying display signals to sources or drains of the FET's.

4. The driving method according to claim 3, which comprises:
   a first phase wherein a scanning signal is applied to selected gates, and a first display signal is applied in synchronism with the scanning signal to the sources or drains of a first selected group of FET's among the FET's giving the selected gates, whereby the ferroelectric liquid crystal between the corresponding picture element electrodes and the counter electrodes forming a common electrode is oriented to the first orientation state, and
   a second phase wherein a second display signal is applied in synchronism with said scanning signal to the sources or drains of a second selected group of FET's among the FET's giving the selected gates, whereby the ferroelectric liquid crystal between the corresponding picture elements electrodes and the counter electrodes forming a common electrode is oriented to the second orientation state.

5. The driving method according to claim 1, wherein said plurality of picture element electrodes are arranged in a matrix comprising a plurality of rows and a plurality of columns, the sources or drains of the FET's corresponding to the picture element electrodes are connected in common, a scanning signal is applied to gates of the FET's, and a display signal is applied to the counter electrodes formed in stripes, said scanning signal and display signal being applied in a time division manner.

6. The driving method according to claim 5, which comprises:
   a first phase wherein a scanning signal is applied to selected gates, and a first display signal is applied in synchronism with the scanning signal to a selected first group of counter electrodes, whereby the ferroelectric liquid crystal between said first group of counter electrodes and the corresponding picture element electrodes is oriented to the first orientation state, and
   a second phase wherein a second display signal is applied in synchronism with said scanning signal to a selected second group of counter electrodes, whereby the ferroelectric liquid crystal between said second group of counter electrodes and the corresponding picture element electrodes is oriented to the second orientation state.

7. The driving method according to claim 1, wherein said plurality of picture element electrodes are arranged in a matrix comprising a plurality of rows and a plurality of columns, said driving method comprising:
   a first phase of orienting the ferroelectric liquid crystal at a selected first group of picture elements on a row to the first orientation state, and
   a second phase of orienting the ferroelectric liquid crystal at a selected second group of picture elements on the row to the second orientation state, the first and the second phases being carried out in the order named and repeated row by row.

8. The driving method according to claim 7, wherein scanning signals are applied to the counter electrodes as scanning lines, the sources or drains of the FET's corresponding to the respective picture elements are connected in common, a display signal is applied to a selected gate to write a display state based on the first orientation state, and then a predetermined display signal is applied to a separately selected gate to write a display state based on the second orientation state, whereby a time division driving is carried out.

9. The driving method according to claim 7, which is a time division driving method of the type comprising applying a display signal to the counter electrodes and applying a scanning signal to the gates of the FET's corresponding to the respective picture elements, with the sources or drains of the FET's being connected in common, wherein a predetermined signal is applied to scanning signal lines, a predetermined signal is applied to a selected display signal line to write a display state based on the first orientation state, and then a predetermined display signal is applied to separately selected signal line to write a display state based on the second orientation state.

10. The driving method according to claim 7, wherein the counter electrodes form a common electrode, scanning signals are applied to the drains or sources of the FET's corresponding to the respective picture elements, a dislay signal is applied to a selected gate to write a display state based on the first orientation state, and then a predetermined display signal is applied to a separately selected gate to write a display state based on the second orientation state, whereby a time division driving is effected.

11. The driving method according to claim 7, wherein the counter electrodes form a common electrode, scanning signals are applied to the gates of the FET's corresponding to the respective picture elements, a display signal is applied to a selected source or drain to write a display state based on the first orientation state, and then a predetermined display signal is applied to a separately selected source or drain to write a display state based on the second orientation state.

12. The driving method according to claim 1, wherein said plurality of picture elements are arranged in a matrix comprising a plurality of rows and a plurality of columns, the sources or drains of the FET's corresponding to the picture element electrodes are connected in common, a display signal is applied to gates of the FET's, and a scanning signal is applied to the counter electrodes formed in stripes and disposed opposite to the picture element electrodes,
said display signal and scanning signal being applied in a time division manner.

13. The driving method according to claim 1, wherein said plurality of picture element electrodes are arranged in a matrix comprising a plurality of rows and columns, scanning signals are applied to the sources or drains of the FET's corresponding to the picture element electrodes, and a display signal is applied in synchronism with the scanning signal to the gates of the FET's, whereby a time division driving is effected.

14. The driving method according to claim 1, wherein picture elements corresponding to said plurality of picture element electrodes are arranged in a matrix comprising a plurality of rows and plurality of columns, the driving method comprising a time division driving mode which comprises a first phase wherein a ferroelectric liquid crystal at selected picture elements on a row (q) is brought to the first alignment state and a second phase wherein a ferroelectric liquid crystal at picture elements on the row (q+1) subsequent to the above mentioned row (q) is refreshed to the second stable state, the first and second phases being effected simultaneously and repeated row by row.

15. The driving method according to claim 14, wherein scanning signals are applied to the counter electrodes as scanning lines, the sources or drains of the FET's corresponding to the respective picture elements are connected to a common terminal, a display signal is applied to a selected gate to write a display state based on the first orientation state on a writing line, and simultaneously therewith a line subsequent to the writing line is refreshed to a display state based on the second orientation state by applying an electric signal to the gates in synchronism with the scanning signal applied to the subsequent line.

16. The driving method according to claim 14, wherein the counter electrodes form a common electrode; scanning signals are applied to the sources or drains; and display signals are applied to the gates, respectively, of the FET's corresponding to the respective picture elements; the driving method comprising, along with the application of predetermined signal lines to the scanning signal lines, applying a predetermined display signal to a selected display signal line to write a display state based on the first orientation state and, simultaneously therewith, refreshing the picture elements corresponding to the subsequent scanning line to a display state based on the second orientation state.

17. The driving method according to claim 1, which comprises a time division driving mode, wherein said plurality of picture element electrodes are arranged in a matrix comprising a plurality of row and plurality of columns, the gates of the FET's corresponding to the picture element electrodes are electrically connected in common, display signals are applied to the sources or drains of the FET's and scanning signals are sequentially applied to the counter electrodes formed in stripes.

18. The driving method according to claim 14, which comprises a time division driving mode, wherein scanning signals are applied to the counter electrodes as scanning lines, the gates of the FET's are electrically connected in common, the sources or drains of the FET's are used as display signal lines, an electric signal is applied in synchronism with a scanning signal to a selected display line among the display signal lines to write a display state corresponding to the first orientation state and, simultaneously therewith, the picture elements on a scanning line subsequent to the writing line is refreshed to a display state corresponding to the second orientation state.

19. The driving method according to claim 1, wherein picture elements corresponding to said plurality of picture element electrodes are arranged in a matrix comprising a plurallity of rows and plurality of columns, the driving method comprising a first step wherein a selected first group of picture elements are successively brought to a display state based on the first orientation state of a ferroelectric liquid crystal at a predetermined picture area and a second step wherein a selected second group of picture elements are successively brought to a display state based on the second orientation state of a ferroelectric liquid crystal at the predetermined picture area, the first and the second steps being effected row by row.

20. The driving method according to claim 19, which comprises a time division driving mode wherein the counter electrodes form a common electrode, scanning signals are applied to the sources or drains and display signals are applied to the gates, respectively, of the FET's corresponding to the respective picture elements; the method comprising applying a predetermined display signal to a selected first display signal line, along with the sequential application of predetermined scanning signals to the scanning signal lines, to sequentially write a display state based on the first orientation state on a predetermined picture area, and then applying a predetermined display signal providing the second orientation state to a selected second display signal line along with the sequential application of predetermined signals again to the scanning signal lines.

21. The driving method according to claim 19, which comprises a time division driving mode wherein the counter electrodes form a common electrode, scanning signals are applied to the gates and display signals are applied to the sources or drains, respectively, of the FET's corresponding to the respective picture elements; the method comprising applying a predetermined display signal to a selected first display signal line, along with the sequential application of predetermined scanning signals to the scanning signal lines, to sequentially write a display state based on the first orientation state on a predetermined picture area, and then applying a predetermined display signal providing the second orientation state to a selected second display signal line along with the sequential application of predetermined signals again to the scanning signal lines.

22. The driving method according to claim 19, which comprises a time division driving mode wherein scanning signals are applied to the counter electrodes, to the sources or drains of the FET's are connected to a common electrode and display signals are applied to the gates, of the FET's corresponding to the respective picture elements; the method comprising applying a predetermined display signal to a selected first display signal line, along with the sequential application of predetermined scanning signals to the scanning signal lines, to sequentially write a display state based on the first orientation state on a predetermined picture area, and then applying a predetermined display signal providing the second orientation state to a selected second display signal line along with the sequential application of predetermined signals again to the scanning signal lines.

23. The driving method according to claim 19, which comprises a time division driving mode wherein display signals are applied to the counter electrodes, the sources or drains of the FET's are connected to a common electrode and scanning signals are applied to the gates, respectively, of the FET's corresponding to the respective picture elements; the method comprising applying a predetermined display signal to a selected first display signal line, along with the sequential application of predetermined scanning signals to the scanning signal lines, to sequentially write a display state based on the first orientation state on a predetermined picture area, and then applying a predetermined display signal providing the second orientation state to a second display signal line along with the sequential application of predetermined signals again to the scanning signal lines.

24. The driving method according to claim 1, wherein said plurality of picture element electrodes provide picture elements arranged in a matrix comprising a plurality of rows and a plurality of columns; the method comprising:
a first phase of refreshing predetermined picture elements on a row to a display state based on the first orientation state of a ferroelectric liquid crystal, and
a second phase of writing a selected picture element along the refreshed picture elements in a display state based on the second orientation state of the ferroelectric liquid crystal.

25. The driving method according to claim 24, which comprises a time division driving mode wherein the counter electrodes form a common electrode, scanning signals are applied to the sources or drains and display signals are applied to the gates, respectively, of the FET's corresponding to the respective picture elements; the driving method comprising applying a predetermined display signal to a display signal line along with the application of a predetermined scanning signal to a scanning signal line thereby to uniformly orient the display states of predetermined picture elements on a selected scanning signal line to a display state based on the first orientation state, and then applying a predetermined electric signal providing the second orientation state to a selected display signal line along with the application of a predetermined electric signal to said scanning signal line.

26. The driving method according to claim 24, which comprises a time division driving mode wherein the counter electrodes form a common electrode, scanning signals are applied to the gates and display signals are applied to the sources or drains, respectively, of the FET's corresponding to the respective picture elements; the method comprising applying a predetermined display signal to a display signal line, along with the application of predetermined scanning signals to the scanning signal lines, to uniformly write a display state based on the first orientation state at predetermined picture elements on a selected scanning signal line, and then applying a predetermined voltage signal providing the second orientation state to a selected display signal line along with the application of a predetermined voltage signal to the selected scanning signal line.

27. The driving method according to claim 24, which comprises a time division driving mode wherein scanning signals are applied to the counter electrodes the sources or drains of the FET's are connected to a common electrode and display signals are applied to the gates of the FET's corresponding to the respective picture elements; the method comprising applying a predetermined display signal to a display signal line, along with the sequential application of predetermined scanning signals to the scanning signal lines, to uniformly write a display state based on the first orientation state at predetermined picture elements on a selected scanning signal line, and then applying a predetermined voltage signal providing the second orientation state to a selected display signal line along with the application of a predetermined voltage signal to said scanning signal line.

28. The driving method according to claim 24, which comprises a time division driving mode wherein display signals are applied to the counter electrodes the sources or drains of the FET's are connected to a common electrode and scanning signals are applied to the gates of the FET's corresponding to the respective picture elements; the method comprising applying a predetermined display signal to a display signal line, along with the application of predetermined scanning signals to the scanning signal lines, to uniformly write a display state based on the first orientation state at predetermined picture elements on a selected scanning signal line, and then applying a predetermined display signal providing the second orientation state to a selected display signal line along with the application of a predetermined voltage signal to said scanning signal line.

29. The driving method according to claim 1, wherein picture elements corresponding to said plurality of picture element electrodes are arranged in a matrix comprising a plurality of rows and plurality of columns, the driving method comprising a time division driving mode which comprises a first step wherein the matrix picture elements are refreshed to a display state based on the first orientation state of a ferroelectric liquid crystal, and a second step wherein a selected picture element among the refreshed picture elements is brought to a display state based on the second orientation state of the ferroelectric liquid crystal.

30. The driving method according to claim 29, which comprises a time division driving mode wherein the counter electrodes form a common electrode, scanning signals are applied to the sources or drains and display signals are applied to the gates, respectively, of the FET's corresponding to the respective picture elements; a first step wherein refresh signals are applied to display signal lines along with the application of scanning signals to scanning signal lines, whereby the display states of predetermined picture area are uniformly brought to a display state based on the first, and a second step after the first step wherein a display image signal is applied to a selected display signal along with the sequential application of a scanning signal to scanning signal lines to write a display state based on the second orientation state.

31. The driving method according to claim 29, which comprises a time division driving mode wherein scanning signals are applied to the counter electrodes to the sources or drains of the FET's are electrically connected in common and display signals are applied to the gates of the FET's corresponding to the respective picture elements; a first step wherein refresh signals are applied to display signal lines along with the application of scanning signals to scanning signal lines, whereby the display states of predetermined picture area are uniformly brought to a display state based on the first, and a second state after the first step wherein a display image signal is applied to a selected display signal along with the sequential application of a scanning signal to scanning signal lines to write a display state based on the second orientation state.

32. The driving method according to claim 29, which comprises a time division driving mode wherein display signals are applied to the counter electrodes, the gates of the FET's are connected to a common electrode, and scanning signals are applied to the sources or drains of the FET's corresponding to the respective picture elements; a first step wherein refresh signals are applied to display signal lines along with the application of scanning signals to scanning signal lines, whereby the display states of predetermined picture area are uniformly brought to a display state based on the first, and a second step after the first step wherein an image signal providing the second orientation state is applied to a selected display signal along with the sequential application of a scanning signal to scanning signal lines.

33. The driving method according to claim 29, which comprises a time division driving mode wherein scanning signals are applied to the counter electrodes, the gates of the FET's are connected to a common electrode, and display signals are applied to the sources or drains of the FET's corresponding to the respective picture elements; a first step wherein refresh signals are applied to display signal lines along with the application of scanning signals to scanning signal lines, whereby the display states of predetermined picture area are uniformly brought to a display state based on the first, and a second step after the first step wherein an image signal providing the second orientation state is applied to a selected display signal along with the sequential application of a scanning signal to scanning signal lines.

34. The driving method according to claim 29, which comprises a time division driving mode therein the counter electrodes form a common electrode, scanning signals are applied to the gates and display signals are applied to the sources or drains, respectively, of the FET's corresponding to the respective picture elements; a first step wherein refresh signals are applied to display signal lines along with the application of scanning signals to scanning signal lines, whereby the display states of predetermined picture area are uniformly brought to a display state based on the first, and a second step after the first step wherein an image signal providing the second orientation state is applied to a selected display signal along with the sequential application of a scanning signal to scanning signal lines.

35. The driving method according to claim 29, which comprises a time division driving mode wherein display signals are applied to the counter electrodes, the sources or drains of the FET's are connected to a common electrode, and scanning signals are applied to the gates, respectively, of the FET's corresponding to the respective picture elements; a first step wherein refresh signals are applied to display signal lines along with the application of scanning signals to scanning signal lines, whereby the display states of predetermined picture area are uniformly brought to a display state based on the first, and a second step after the first step wherein an image signal providing the second orientation state is applied to a selected display signal along with the sequential application of a scanning signal to scanning signal lines.

36. The driving method according to claim 1, which comprises a time division driving mode, wherein said plurality of picture element electrodes are arranged in a matrix comprising a plurality of rows and plurality of columns, the gates of the FET's are connected electrically in common corresponding to the picture element electrodes, scanning signals are applied to the sources or drains of the FET's and display signals are applied to the counter electrodes formed in stripes.

37. The driving method according to claim 1, wherein said ferroelectric liquid crystal has bistability.

38. The driving method according to claim 1, wherein said ferroelectric liquid crystal is in a chiral smectic phase.

39. The driving method according to claim 38, wherein said chiral smectic phase is C phase, H phase, I phase, J phase, K phase, G phase or F phase.

40. The driving method according to claim 1, wherein said FET is a thin film transistor.

41. A liquid crystal device comprising a plurality of FET's each having a gate and a first and a second terminal other than the gate, a first base plate having thereon a plurality of picture element electrodes each corresponding to one of said plurality of FET's and connected to the first terminal thereof, a second base plate having thereon counter electrodes opposite to the picture element electrodes and a ferroelectric liquid crystal sandwiched between the first and second base plates.

42. The liquid crystal device according to claim 41, wherein said ferroelectric liquid crystal has bistability.

43. The liquid crystal device according to claim 41, wherein said ferroelectric liquid crystal is in a chiral smectic phase.

44. The liquid crystal device according to claim 41, wherein said FET is a thin film transistor.

45. The liquid crystal device according to claim 44, wherein said film transistor comprises a semiconductor film of amorphous silicon.

46. The liquid crystal device according to claim 41, wherein said plurality of FET's are arranged in a matrix and the gates of the FET's are electrically connected in common.

47. The liquid crystal device according to claim 41, wherein said plurality of FET's are arranged in a matrix and the sources or drains of the FET's are electrically connected in common.

48. A driving method for a liquid crystal device of the type comprising a plurality of picture elements arranged in a matrix comprising a plurality of rows and a plurality of columns; picture elements on each row being commonly connected and picture elements on each column being commonly connected; oppositely spaced electrodes and a ferroelectric liquid crystal disposed therebetween under bistable state showing either a first orientation state or a second orientation state; said driving method comprising:

a first step wherein a scanning signal is successively applied row by row and a first data signal is applied to selected columns in synchronism with the scanning signal, thereby to form a display state based on said first orientation state of the ferroelectric liquid crystal row by row in a first group of selected picture elements on each row being scanned; and a second step wherein a scanning signal is successively applied row by row and a second data signal is applied to selected columns in synchronism with the scanning signal thereby to form a display state based on said second orientation state of the ferroelectric liquid crystal row by row in a second group of selected picture elements on each row being scanned.

49. The driving method according to claim 48, wherein said ferroelectric liquid crystal under the bistable state is sufficiently thin as to have a non-spiral structure.

50. The driving method according to claim 49, wherein the ferroelectric liquid crystal has a thickness of from 1 to 5μ.

51. The driving method according to claim 48, wherein said display state base on the first orientation state of the ferroelectric liquid crystal is a bright state and said display state based on the second orientation state of the ferroelectric liquid crystal is a dark state.

* * * * *

UNITED STATES PATENT AND TRADEMARK OFFICE
CERTIFICATE OF CORRECTION

PATENT NO. : 4,697,887

DATED : October 6, 1987

INVENTOR(S) : SHINJIRO OKADA, ET AL.

It is certified that error appears in the above-identified patent and that said Letters Patent is hereby corrected as shown below:

COLUMN 7

Line 34, "are" should read --is--.
Line 45, "$10<|V_Gb|<60V$" should read --$10<|V_G|<60V$--.

COLUMN 9

Line 30, "are" should read --is--.
Line 51, "corresponding" should read --correspondingly--.
Line 55, "21A" should read --12A--.

COLUMN 10

Line 66, "sected" should read --selected--.

COLUMN 11

Line 31, "dispaly" should read --display--.
Line 35, "abscissa" should read --abscissas--.
Line 49, "electrode." should read --electrodes.--.

COLUMN 12

Line 6, "a=N" should read --q=N--.

COLUMN 14

Line 49, "sected" should read --selected--.

UNITED STATES PATENT AND TRADEMARK OFFICE
CERTIFICATE OF CORRECTION

PATENT NO. : 4,697,887

DATED : October 6, 1987

INVENTOR(S) : SHINJIRO OKADA, ET AL.

Page 2 of 7

It is certified that error appears in the above-identified patent and that said Letters Patent is hereby corrected as shown below:

COLUMN 15

Line 12, "are" should read --is--.

COLUMN 17

Line 37, "is" should be deleted.

COLUMN 20

Line 62, "$V_{Gn}-V_p<V_{LC}+V_S$" should read --$V_{Gn}-V_p>V_{LC}+V_S$--.

COLUMN 21

Line 36, "are" should read --is--.

COLUMN 22

Line 33, "FIG. 14" should read --FIG. 4--.
Line 35, "ordinates" should read --ordinates indicate--.
Line 50, "$-V_C-V_S\ 8<-V_{LC})$" should read ---$V_C-V_S\ (<-V_{LC})$--.
Line 51, "31 $V_{LC}$" should read ---$V_{LC}$--.

COLUMN 23

Line 31, "level" should read --state--.

UNITED STATES PATENT AND TRADEMARK OFFICE
CERTIFICATE OF CORRECTION

PATENT NO. : 4,697,887

DATED : October 6, 1987

INVENTOR(S) : SHINJIRO OKADA, ET AL.

It is certified that error appears in the above-identified patent and that said Letters Patent is hereby corrected as shown below:

COLUMN 26

Line 7, "is" should be deleted.
    Line 40, "writibg" should read --writing--.

COLUMN 27

Line 7, "levels" should read --signals--.
    Line 11, "level." should read --state.--.
    Line 34, "especially" should read --sequentially--.
    Line 56, "n=1 to M) m=q, n≠1)" should read --n=1 to M) (m=q, n≠1)--.
    Line 65, "$C_{Gm}$:" should read --$V_{Gm}$:--.

COLUMN 28

Line 53, "for" should read --from--.
    Line 55, "at" should read --to--.

COLUMN 29

Line 39, "$V_{Gn}-V_P<V_{LC}+V_C$" should read --$V_{Gn}-V_P>V_{LC}+V_C$--.

COLUMN 30

Line 30, "electrode" should read --electrodes--.
    Line 48, "(m=q, N=1)" should read --(m=q, n=1)--.

UNITED STATES PATENT AND TRADEMARK OFFICE
CERTIFICATE OF CORRECTION

PATENT NO. : 4,697,887

DATED : October 6, 1987

INVENTOR(S) : SHINJIRO OKADA, ET AL.

It is certified that error appears in the above-identified patent and that said Letters Patent is hereby corrected as shown below:

COLUMN 31

Line 46, "phase $t_2$ is 0." should read --phase $t_2$.--.
Line 54, "(m>q, n=1 to M)" should read --(m=q, n=1 to M)--.

COLUMN 32

Line 10, "display" should read --display state--.

COLUMN 33

Line 64, "automatically" should read --substantially--.

COLUMN 34

Lines 63-64, "forming a matrix of" should be deleted.

COLUMN 35

Line 38, "electrode" should read --electrodes--.

COLUMN 38

Line 6, "electrode" should read --electrodes--.
Line 13, "electrode" should read --electrodes--.
Line 15, "signals" should read --signal--.

UNITED STATES PATENT AND TRADEMARK OFFICE
CERTIFICATE OF CORRECTION

PATENT NO. : 4,697,887
DATED : October 6, 1987
INVENTOR(S) : SHINJIRO OKADA, ET AL.

It is certified that error appears in the above-identified patent and that said Letters Patent is hereby corrected as shown below:

COLUMN 39

Line 21, "electrode" should read --electrodes--.
Line 28, "electrode" should read --electrodes--.
Line 29, "$V_2=0$" should read --$V_G=0$--.

COLUMN 41

Line 68, "elements" should read --element--.

COLUMN 42

Line 62, "to separately" should read --to a separately--.

COLUMN 43

Line 38, "and plurality" should read --and a plurality--.

COLUMN 44

Line 8, "row" should read --rows--.
Line 31, "plurallity" should read --plurality--.
Line 31, "and plurality" should read --and a plurality--.

COLUMN 45

Line 8, delete "to" (second occurrence).
Line 49, "along" should read --among--.

UNITED STATES PATENT AND TRADEMARK OFFICE
CERTIFICATE OF CORRECTION

PATENT NO. : 4,697,887

DATED : October 6, 1987

INVENTOR(S) : SHINJIRO OKADA, ET AL.

It is certified that error appears in the above-identified patent and that said Letters Patent is hereby corrected as shown below:

COLUMN 46

Line 19, "electrodes the" should read --electrodes, the--.
Line 36, "electrodes the" should read --electrodes, the--.
Line 53, "and plurality" should read --and a plurality--.

COLUMN 47

Line 12, "electrodes to" should read --electrodes,--.
Line 21, "state" should read --step--.
Line 57, "therein" should read --wherein--.

COLUMN 48

Line 22, "and plurality" should read --and a plurality--.
Line 55, "said film" should read --said thin film--.

UNITED STATES PATENT AND TRADEMARK OFFICE
CERTIFICATE OF CORRECTION

PATENT NO. : 4,697,887

DATED : October 6, 1987

INVENTOR(S) : SHINJIRO OKADA, ET AL.

It is certified that error appears in the above-identified patent and that said Letters Patent is hereby corrected as shown below:

COLUMN 50

Line 13, "base" should read --based--.

Signed and Sealed this

Seventeenth Day of May, 1988

Attest:

DONALD J. QUIGG

*Attesting Officer*    *Commissioner of Patents and Trademarks*